(12) United States Patent
Madden et al.

(10) Patent No.: US 10,670,429 B2
(45) Date of Patent: Jun. 2, 2020

(54) CAPACITIVE BENDING SENSORS

(71) Applicant: The University of British Columbia, Vancouver (CA)

(72) Inventors: John D. W. Madden, Vancouver (CA); Mirza S. Sarwar, Vancouver (CA)

(73) Assignee: The University of British Columbia, Vancouver (CA)

( * ) Notice: Subject to any disclaimer, the term of this patent is extended or adjusted under 35 U.S.C. 154(b) by 183 days.

(21) Appl. No.: 15/893,508

(22) Filed: Feb. 9, 2018

(65) Prior Publication Data
US 2018/0238716 A1    Aug. 23, 2018

Related U.S. Application Data

(60) Provisional application No. 62/457,122, filed on Feb. 9, 2017.

(51) Int. Cl.
*G01D 5/241* (2006.01)
*G01L 1/14* (2006.01)
(Continued)

(52) U.S. Cl.
CPC ............ *G01D 5/2412* (2013.01); *G01B 7/22* (2013.01); *G01L 1/144* (2013.01); *G01L 1/146* (2013.01);
(Continued)

(58) Field of Classification Search
CPC .... G01R 1/07371; G01R 3/00; G01R 1/0491; G01R 1/07342
(Continued)

(56) References Cited

U.S. PATENT DOCUMENTS 4,293,734 A   10/1981  Pepper, Jr.
4,574,438 A   3/1986   Diepers et al.
(Continued)

FOREIGN PATENT DOCUMENTS

WO   2009144615   12/2009
WO   2012170399   12/2012
(Continued)

OTHER PUBLICATIONS

Noh et al. "Ferroelectret film-based patch-type sensor for continous blood pressure moitoring" Electron, Lett, 2014, vol. 50(3), pp. 143-144.
(Continued)

*Primary Examiner* — Giovanni Astacio-Oquendo
(74) *Attorney, Agent, or Firm* — Todd A. Rattray; Oyen Wiggs Green & Mutala LLP

(57) ABSTRACT

A sensor unit for detecting bending of the sensor unit comprises: a capacitive upper sensor having an upper capacitance and comprising first and second deformable upper electrodes spaced apart from one another in a Z direction, the first and second upper electrodes respectively having first and second upper shapes; and a capacitive lower sensor having a lower capacitance, spaced apart from the upper sensor in a Z direction and comprising first and second deformable lower electrodes spaced apart from one another in the Z direction, the first and second lower electrodes respectively having first and second lower shapes. For a bend of the sensor unit in a first direction, the first and second upper shapes change such that the upper capacitance decreases and the lower shapes change such that the lower capacitance increases. For a bend of the sensor unit in a second direction opposed to the first direction, the first and second upper shapes change such that the upper capacitance
(Continued)

increases and the lower shapes change such that the lower capacitance decreases.

22 Claims, 34 Drawing Sheets

(51) Int. Cl.
```
G01L 5/22      (2006.01)
G06F 3/044     (2006.01)
G01B 7/16      (2006.01)
G06F 3/041     (2006.01)
```
(52) U.S. Cl.
CPC .............. *G01L 5/228* (2013.01); *G06F 3/044* (2013.01); *G06F 3/0416* (2013.01); *G06F 2203/04103* (2013.01); *G06F 2203/04105* (2013.01)

(58) Field of Classification Search
USPC .................. 324/500, 537, 750.16, 750.25
See application file for complete search history.

(56) References Cited

U.S. PATENT DOCUMENTS

| | | | |
|---|---|---|---|
| 6,543,299 B2 | 4/2003 | Taylor | |
| 6,586,810 B2 | 7/2003 | Thakur | |
| 6,774,639 B1* | 8/2004 | Unsworth | G01R 31/1227 324/535 |
| 6,809,462 B2 | 10/2004 | Pelrine et al. | |
| 7,477,242 B2 | 1/2009 | Cross et al. | |
| 7,532,012 B2* | 5/2009 | Cern | G01R 31/1272 324/536 |
| 7,676,333 B2* | 3/2010 | Younsi | G01R 31/1227 324/458 |
| 7,719,027 B2* | 5/2010 | Chen | H01L 23/3107 257/177 |
| 8,612,856 B2 | 12/2013 | Hotelling et al. | |
| 8,726,908 B2 | 5/2014 | Squitieri | |
| 8,730,199 B2 | 5/2014 | Sleeman et al. | |
| 8,757,165 B2 | 6/2014 | Squitieri | |
| 8,920,174 B2 | 12/2014 | Tachi et al. | |
| 8,937,607 B2 | 1/2015 | Brown | |
| 9,582,124 B2 | 2/2017 | Han | |
| 9,766,757 B2 | 9/2017 | Keller | |
| 9,933,888 B2 | 4/2018 | Kim et al. | |
| 2004/0169262 A1* | 9/2004 | Oliver | H01L 23/49562 257/676 |
| 2005/0124864 A1 | 6/2005 | Mack et al. | |
| 2005/0190624 A1* | 9/2005 | Kasai | G11C 7/10 365/222 |
| 2006/0144154 A1 | 7/2006 | Ueno et al. | |
| 2006/0213275 A1 | 9/2006 | Cobianu et al. | |
| 2006/0266642 A1 | 11/2006 | Akle et al. | |
| 2008/0054875 A1 | 3/2008 | Saito | |
| 2008/0208063 A1 | 8/2008 | Brauers et al. | |
| 2009/0194344 A1 | 8/2009 | Harley et al. | |
| 2009/0301875 A1 | 12/2009 | Wu et al. | |
| 2010/0079401 A1 | 4/2010 | Staton | |
| 2010/0289503 A1 | 11/2010 | Reynolds et al. | |
| 2010/0309162 A1 | 12/2010 | Nakanishi et al. | |
| 2011/0007030 A1 | 1/2011 | Mo et al. | |
| 2011/0237921 A1 | 9/2011 | Askin, III et al. | |
| 2012/0277637 A1 | 11/2012 | Vahdatpour et al. | |
| 2013/0106244 A1 | 5/2013 | Liu et al. | |
| 2013/0257785 A1 | 10/2013 | Brown et al. | |
| 2014/0097857 A1 | 4/2014 | Hu | |
| 2014/0152621 A1 | 6/2014 | Okayama et al. | |
| 2014/0174189 A1 | 6/2014 | Pan et al. | |
| 2014/0327843 A1 | 11/2014 | Liu et al. | |
| 2016/0086306 A1 | 6/2016 | Madden et al. | |
| 2016/0258829 A1 | 9/2016 | Celik-Butler et al. | |
| 2016/0365198 A1 | 12/2016 | Pan et al. | |
| 2017/0059426 A1 | 3/2017 | Choi et al. | |
| 2017/0059434 A1 | 3/2017 | Li et al. | |
| 2017/0139527 A1 | 5/2017 | Nathan et al. | |
| 2017/0224280 A1 | 8/2017 | Bozkurt et al. | |
| 2017/0356812 A1 | 12/2017 | Madden et al. | |
| 2017/0356815 A1 | 12/2017 | Madden et al. | |
| 2018/0038745 A1 | 2/2018 | Madden et al. | |
| 2018/0095582 A1 | 4/2018 | Hwang et al. | |
| 2018/0246589 A1 | 8/2018 | So et al. | |

FOREIGN PATENT DOCUMENTS

| | | |
|---|---|---|
| WO | 2014169119 | 10/2014 |
| WO | 2015048530 | 4/2015 |
| WO | 2016141468 | 9/2016 |
| WO | 2017210795 | 12/2017 |

OTHER PUBLICATIONS

Karki et al. "Measurement of heart sounds with EMFi transducer" in Proc. Int. Conf. Eng. Med. Biol. Soc., Lyon, France, 2007, pp. 1683-1686.
Otsuki et al. "Characteristic evaluation of a solid polymer electrolyte sensor", Microsyst. Technol., 2011, vol. 17, pp. 1129-1133.
Mannsfeld, Stefan C B. "Highly sensitive flexible pressure sensors with microstructured rubber dielectric layers". Nature Materials, Oct. 2010, vol. 9: 859-864.
Sun et al. "Ionic skin". Adv Mater, Dec. 3, 2014, 26(45):7608-14.
Rossi. "Electronic textiles: A logical step". Nat Mater 6. (2007). pp. 328-329.
Xu et al. "Soft Microfluidic assemblies of Sensors, Circuits, and Radios for the Skin". Science (80-) 344. (2014).
Someya. "Building bionic skin". IEEE Spectr 50. (2013). pp. 50-56.
Wang et al. "Recent Progress in Electronic Skin". Adv Sci 2. (2015).
Someya et al. "A large-area, flexible pressure sensor matrix with organic field-effect transistors for artificial skin applications". Proc Natl Acad Sci 101. (2004). pp. 9966-9970.
Hu et al. "Elastomeric transparent capacitive sensors based on an interpenetrating composite of silver nanowires and polyurethane". Appl Phys Lett 102, 83303. (2013).
Xu et al. "Where the rubber meets the hand: Unlocking the sensing potential of dielectric elastomers". J Polym Sci Part B Polym Phys 54. (2016). pp. 465-472.
Choi et al. "Flexible and transparent touch sensor using single-wall carbon nanotube thin-films". Sensors Actuators, A Phys 6. (2014). pp. 859-864.
Sarwar et al. "In SPIE Smart Structures and Materials + Nondestructive Evaluation and Health Monitoring" , Y Bar-Cohen, Ed. International Society for Optics and Photonics. (2015). p. 943026.
Cohen et al. "A highly elastic, capacitive strain gauge based on percolating nanotube networks". Nano Lett 12. (2012). pp. 1821-1825.
Cai et al. Super-stretchable, transparent carbon nanotube-based capacitive strain sensors for human motion detection. Sci Rep 3, 3048 (2013).
Pang et al. "A flexible and highly sensitive strain-gauge sensor using reversible interlocking of nanofibres". Nat Mater 11. (2012). pp. 795-801.
Lipomi et al. "Skin-like pressure and strain sensors based on transparent elastic films of carbon nanotubes". Nat Nanotechnol 6. (2011). pp. 788-792.
Park et al. "Stretchable energy-harvesting tactile electronic skin capable of differentiating multiple mechanical stimuli modes". Adv Mater 26. (2014). pp. 7324-7332.
Zhang et al. "Dual functional transparent film for proximity and pressure sensing". Nano Res. 7. (2014). pp. 1488-1496.
Gu et al. "Transparent elastic capacitive pressure sensors based on silver nanowire electrodes". 8th Annu IEEE Int Conf Nano/Micro Eng Mol Syst 1. (2013). pp. 1183-1185.
Larson et al. "Highly stretchable electroluminescent skin for optical signaling and tactile sensing." Science (80-), 351. (2016).
Sekitani et al. "Stretchable active-matrix organic light-emitting diode display using printable elastic conductors". Nat Mater 8. (2009). pp. 494-499.

(56) References Cited

OTHER PUBLICATIONS

Chou et al. "A chameleon-inspired stretchable electronic skin with interactive colour changing controlled by tactile sensing". Nat Commun 6, 8011. (2015).
Wang et al. "Transparent, stretchable, carbon-nanotube-inlaid conductors enabled by standard replication technology for capacitive pressure, strain and touch sensors". J Mater Chem A 1, 3580. (2013).
Kim et al. "Stretchable silicon nanoribbon electronics for skin prosthesis". Nat Commun 5, 5747 (2014).
Li et al. "Mutual capacitance of liquid conductors in deformable tactile sensing arrays". Appl Phys Lett 108, 13502. (2016).
Walker. "A review of technologies for sensing contact location on the surface of a display". J Soc Inf Disp 20. (2012) pp. 413-440.
Keplinger et al. "Stretchable, transparent, ionic conductors". Science 341 No. 6149. (2013). pp. 984-987.
Kim et al. "Highly stretchable, transparent ionic touch panel". Science 353. (2016). pp. 682-687.
Schmeder et al. "Support Vector Machine Learning for Gesture Signal Estimation with a Piezo-Resistive Fabric Touch Surface". Proc 2010 Conf New Interfaces Music Expr (NIME 2010). (2010). pp. 244-249.
Flagg et al. "Affective touch gesture recognition for a furry zoomorphic machine". Proc 7th Int Conf Tangible, Embed Embodied Interact. TEI'13, 25. (2013).
Friend et al. "Fabrication of microfluidic devices using polydimethylsiloxane". Biomicrolluidics 4. (2010). doi: 10.1063/1.3259624.
Lake et al. "Microfluidic device design, fabrication, and testing protocols". Protoc Exch. (2015). doi: 10.1038/protex.2015.069.
Sia et al. "Microfluidic devices fabricated in poly(dimethlsiloxane) for biological studies". Electrophoresis 24. (2003). pp. 3563-3576.
Temiz et al. "Lab-on-a-chip devices: how to close and plug the lab?". Microelectron Eng 132. (2014). pp. 156-175.
Eddings et al. "Determining the optimal PDMS-PDMS bonding technique for microfluidic devices". J Micromechanics Microengineering 18, 67001. (2008).
Chow et al. "Microfluidic channel fabrication by PDMS-interface bonding". Smart Mater Struct 15. (2006). pp. S112-S116.
Bai et al. "Transparent hydrogel with enhanced water retention capacity by introducing highly hydratable salt". Appl Phys Lett 105, 151903. (2014).
Wu et al. "Deformable Antireflection Coatings from Polymer and Nonoparticle Multilayers". Adv Mater 18. (2006). pp. 2699-2702.
Wei et al. "A silicon MEMS structure for characterization of femto-farad-level capacitive sensors with lock-in architecture". J Micromechanics Microengineering 20, 64019. (2010).
Sun et al. "Highly stretchable and tough hydrogels". Nature, 2012, vol. 489, No. 7414, pp. 133-136.
Dobashi et al., Mechanoionic Transduction of Solid Polymer Electrolytes and Potential Applications—VER11, Biomaterials and Soft Materials, vol. 1, Issue 1, pp. 63-68, Jan. 26, 2016.
Liu et al., Self-Powered Piezoionic Strain Sensor Toward the Monitoring of Human Activities, Small 12 (36), 5074-5080, May 6, 2016.
Print-out of www.boditrak.com on May 23, 2015. Accessed on www.web.archive.org.
Print-out of www.themapsystem.com on Nov. 17, 2015. Accessed on www.web.archive.org.
Print-out of www.tekscan.com/product-group/medical/bedding-seating on Apr. 12, 2015. Accessed on www.web.archive.org.
United Nations Department of Economic and Social Affairs. "World Population Ageing 2013". United Nations, 2013. http://www.un.org/en/development/desa/poplulation/publications/pdf/ageing.
Brown, Brandon R "Temperature Response in Electrosensors and Thermal Voltages in Electrolytes." Journal of Biological Physics 36.2 (2010): 121-134.
Otsuki et al., "Characterization of a curvature sensor using a solid polymer electrolyte," ICMIT 2009: Mechatronics and Information Technology, 2009, pp. 75000L-75000L-8.
Shahinpoor et al. "A New Effect in Ionic Polymeric Gels: the Ionic Flexogelectric Effect," Proceedings of the SPIE—The International Society for Optical Engineering, (1995), vol. 2441, pp. 42-53.
Supplementary European Search Report of EP App. 15 86 5607, dated Jun. 28, 2018.
World Intellectual Property Organization, International Search Report (ISR) dated Jun. 8, 2016 in PCT/CA2016/050238.
World Intellectual Property Organization, Written Opinion (WO) dated Jun. 8, 2016 in PCT/CA2016/050238.
World Intellectual Property Organization, International Preliminary Report on Patentability (IPRP) dated Sep. 12, 2017 in PCT/CA2016/050238.
Extended European Search Report dated Sep. 26, 2018 in corresponding EP Patent Application No. 16760965.0.

\* cited by examiner

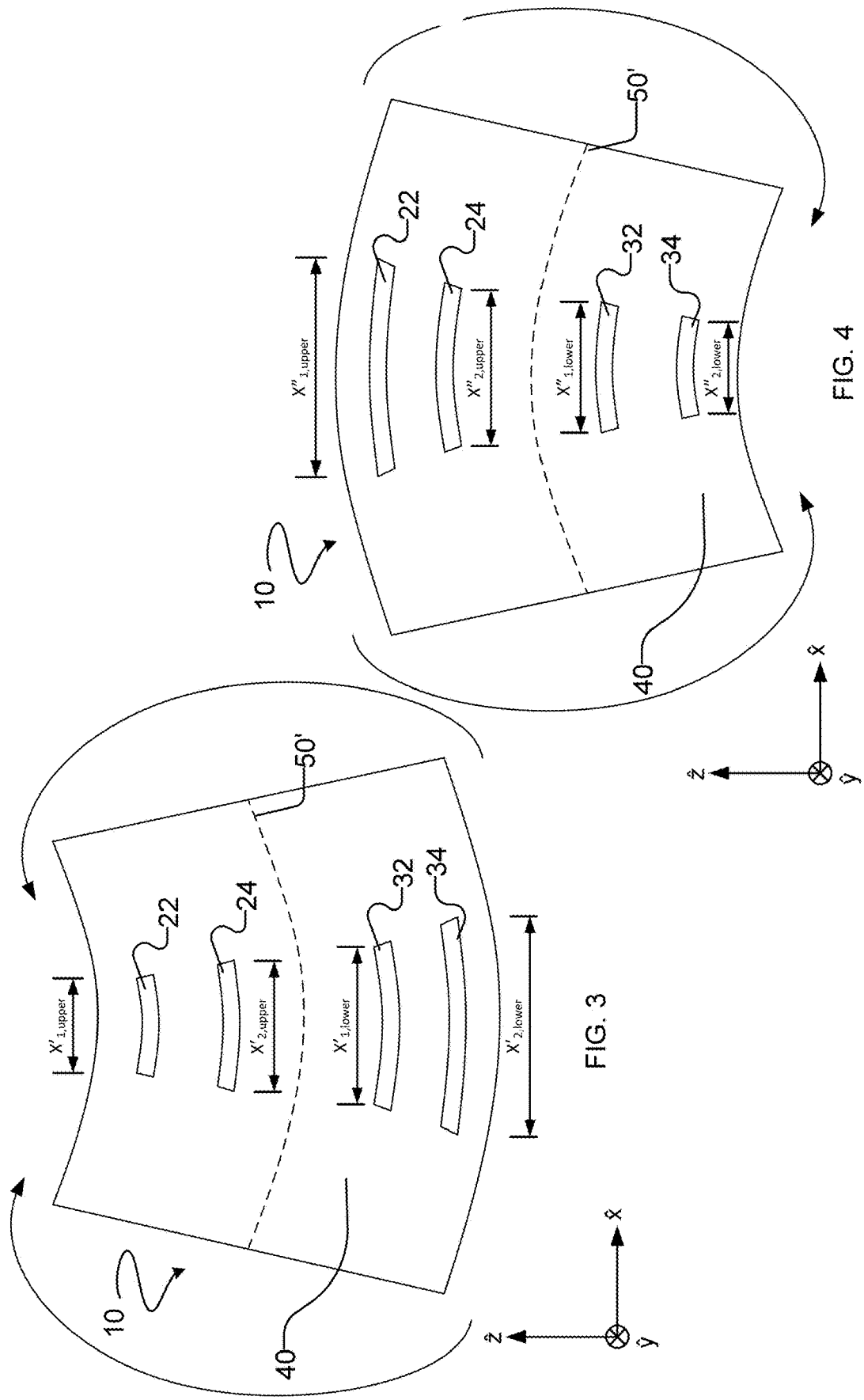

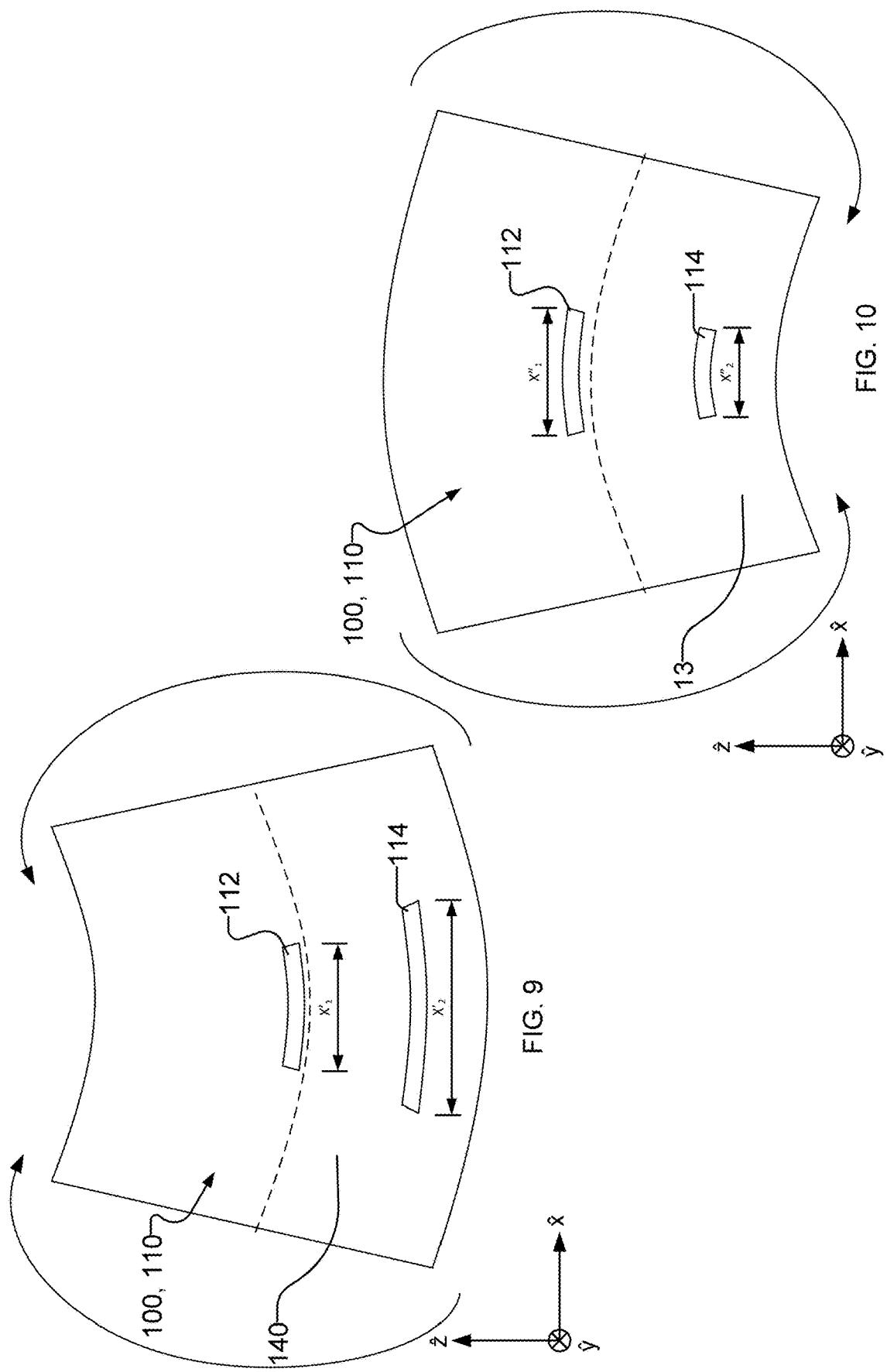

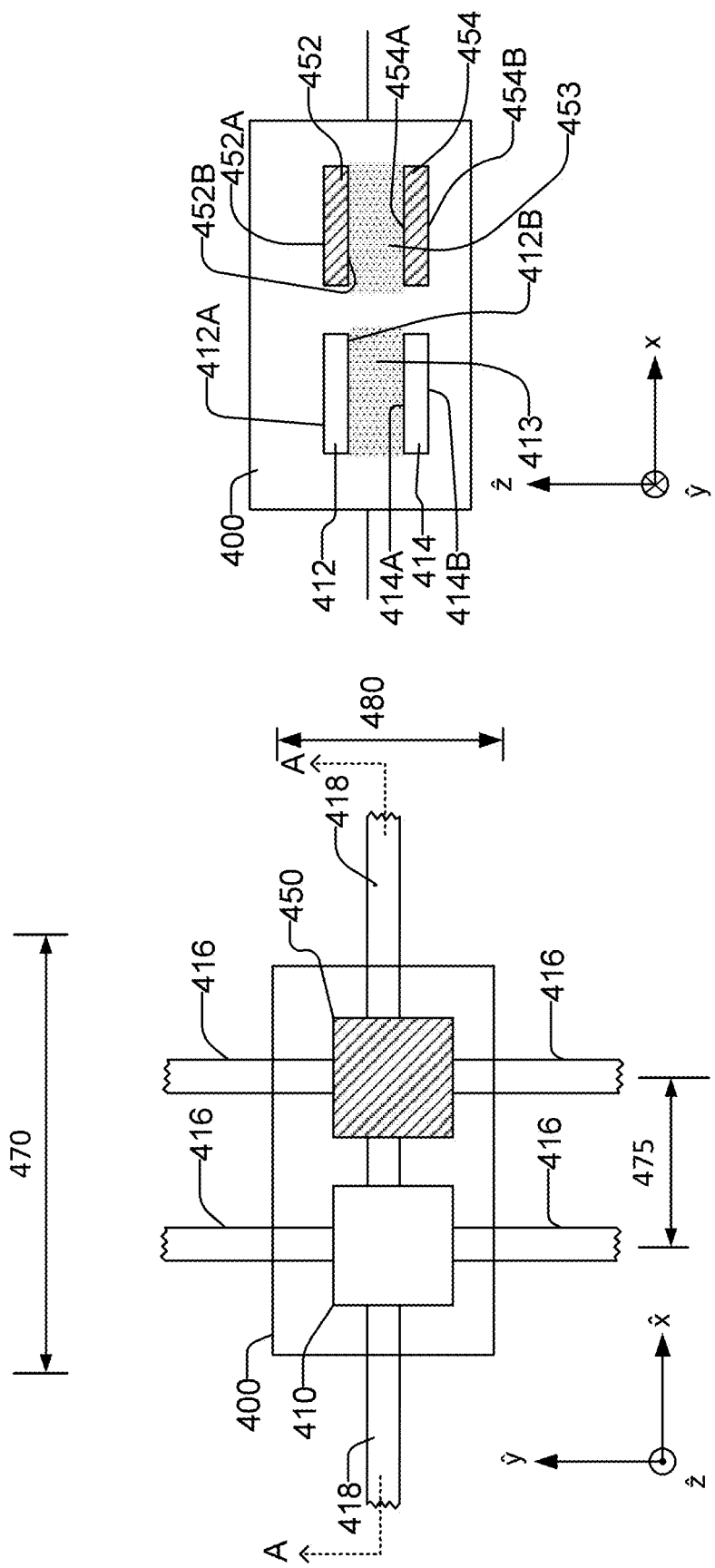

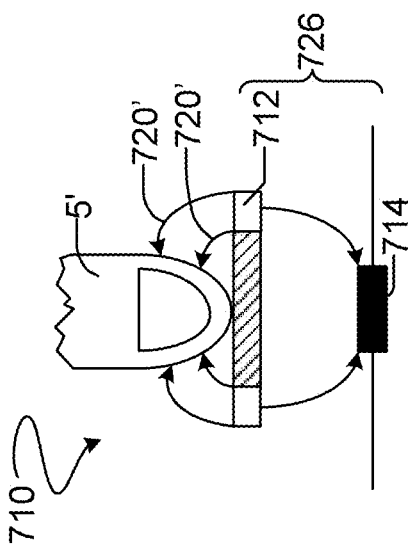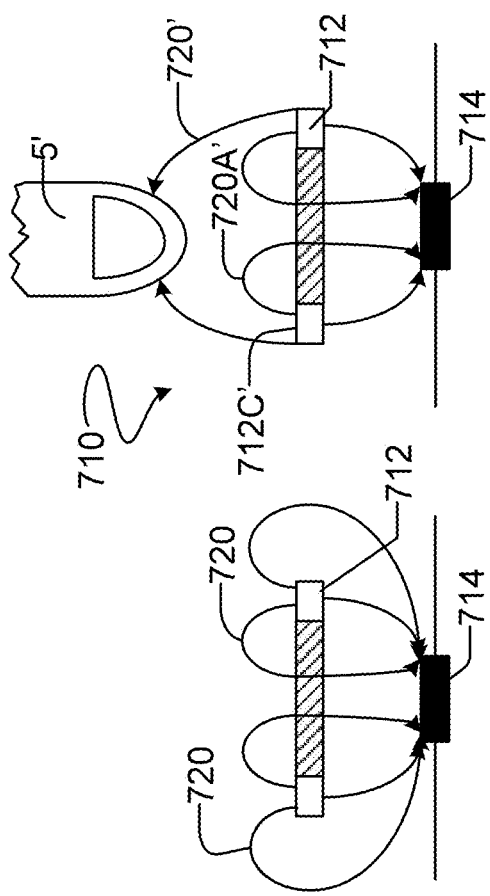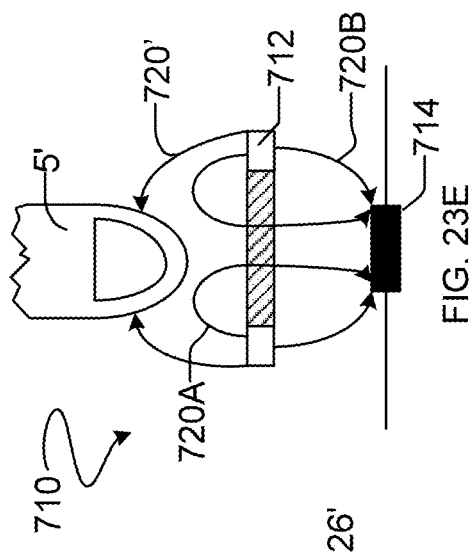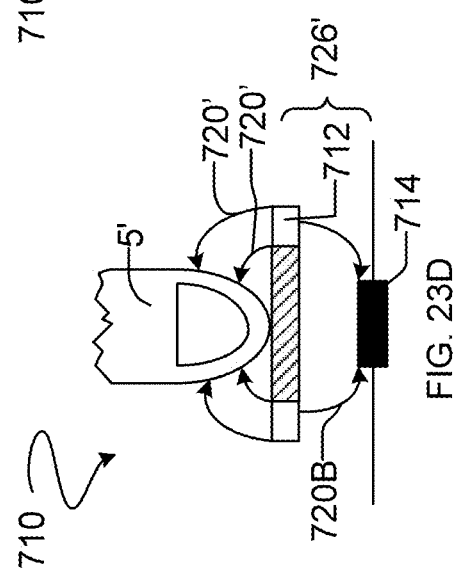

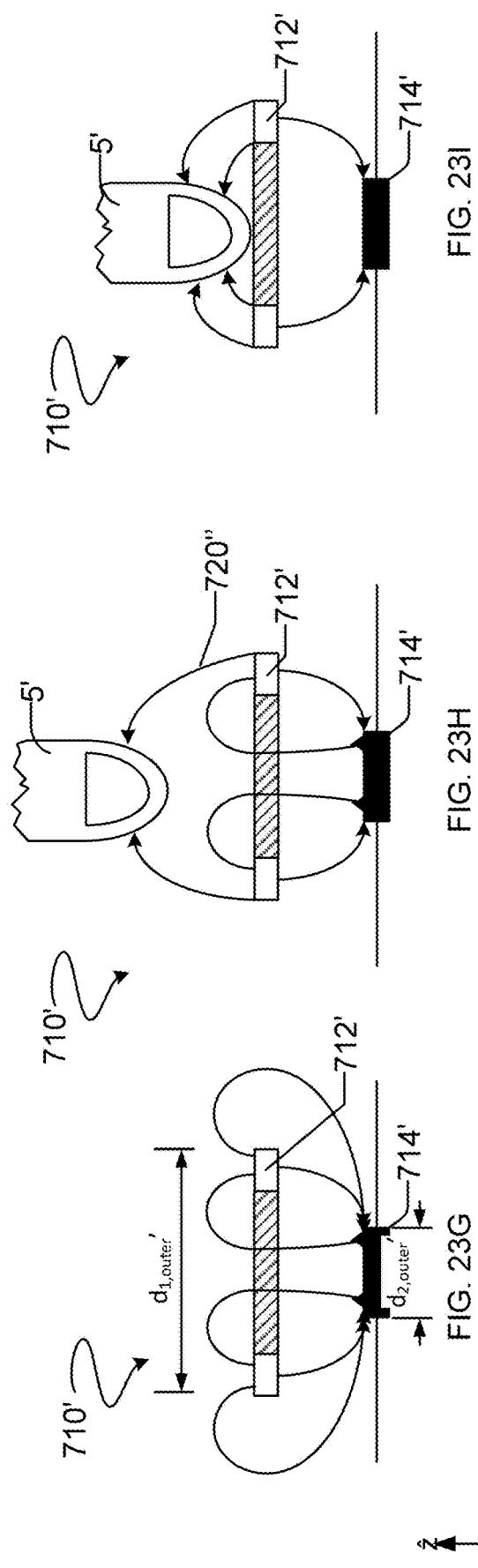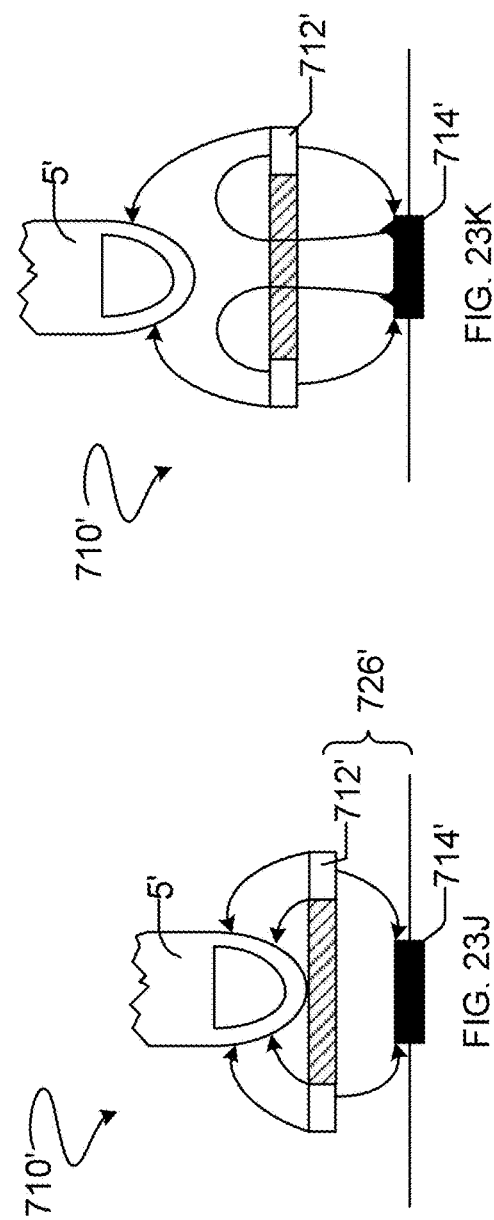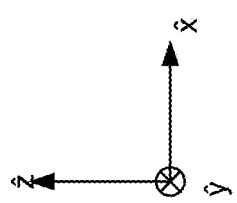

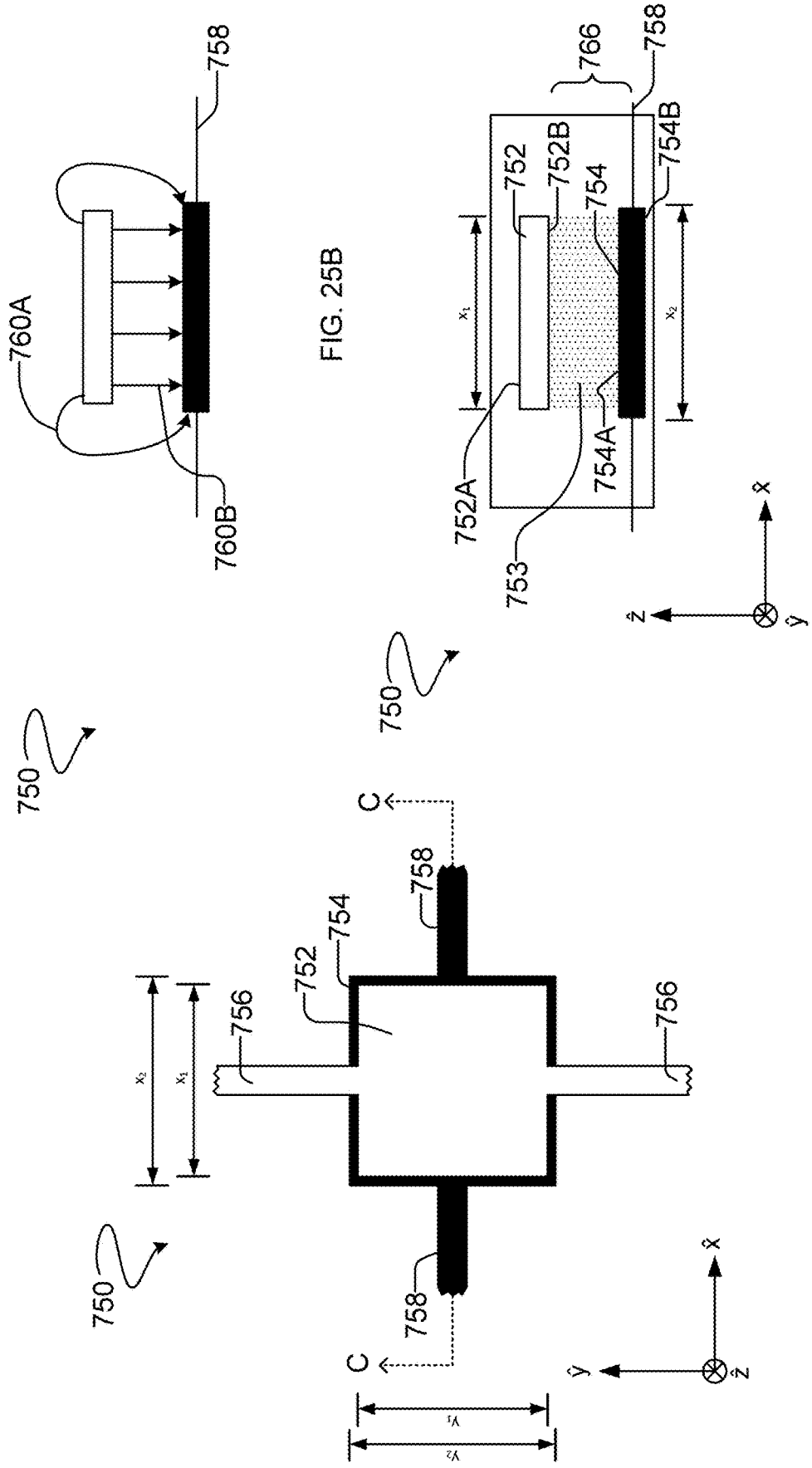

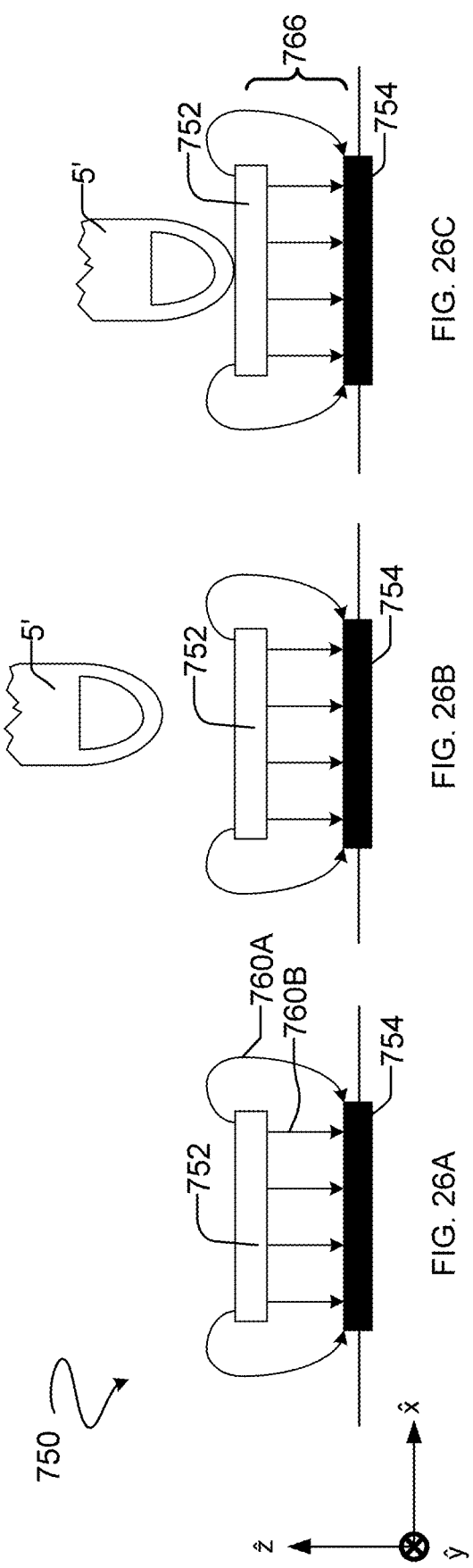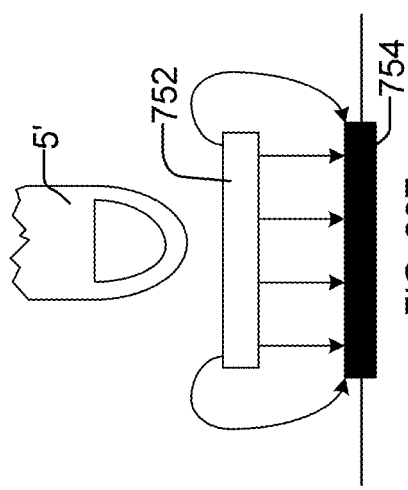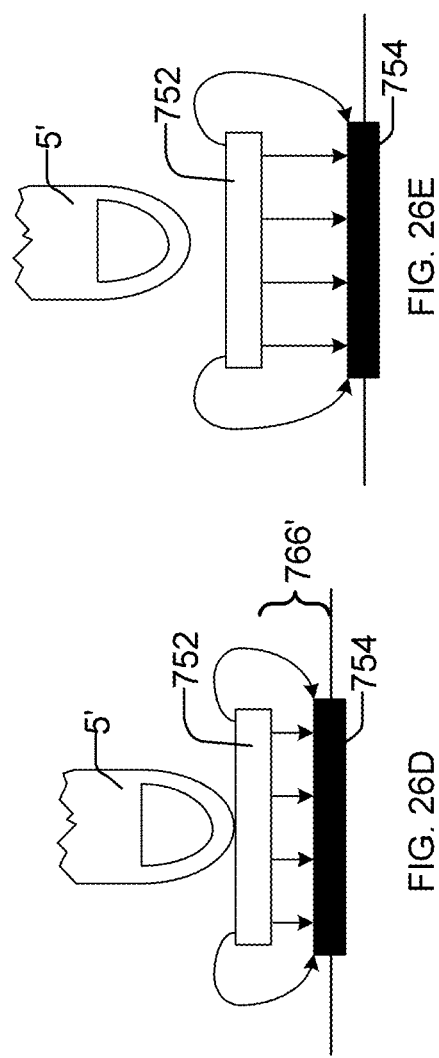

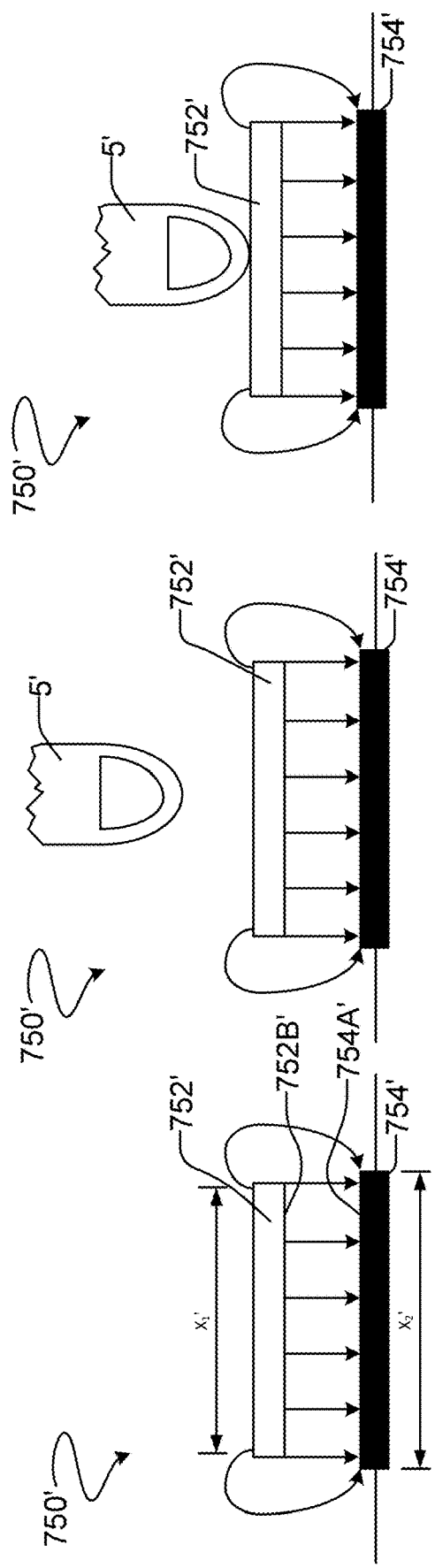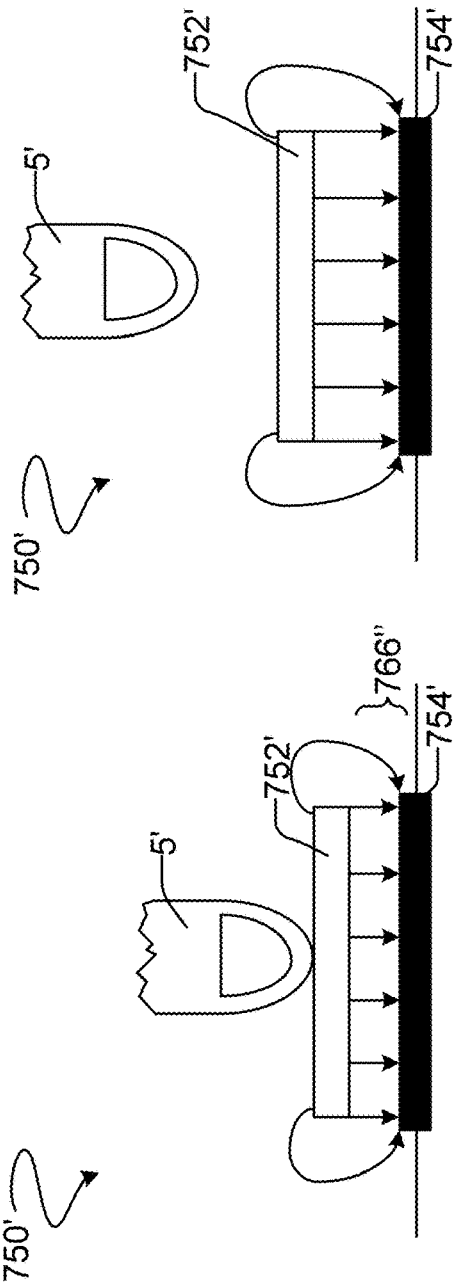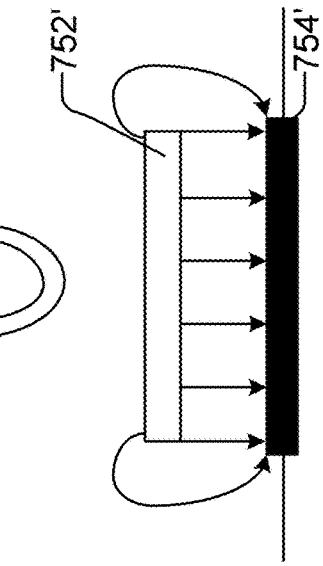

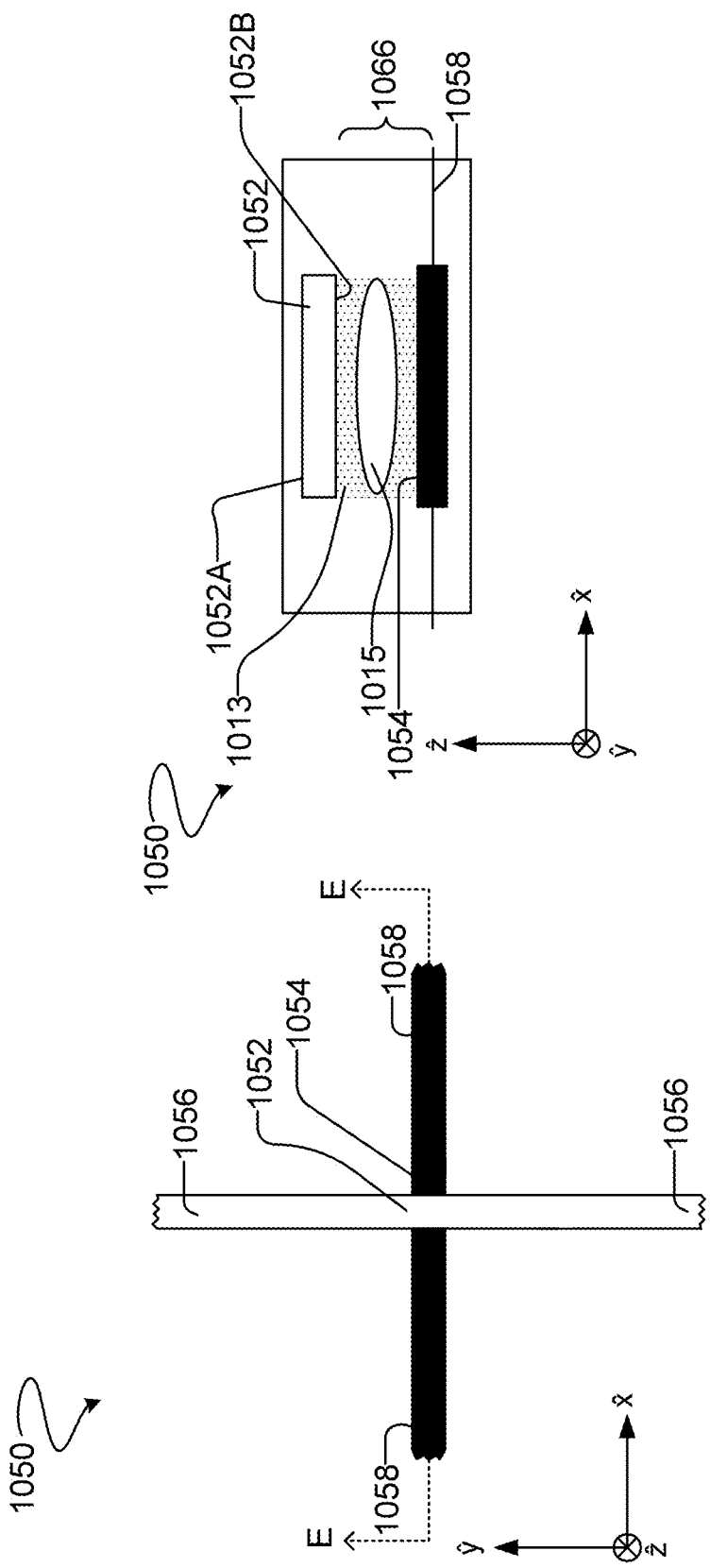

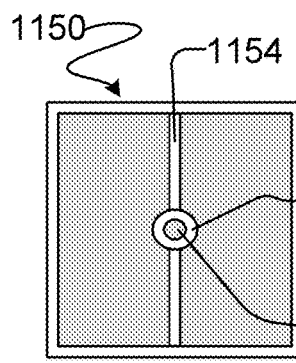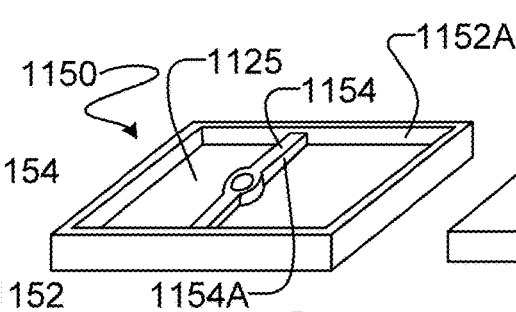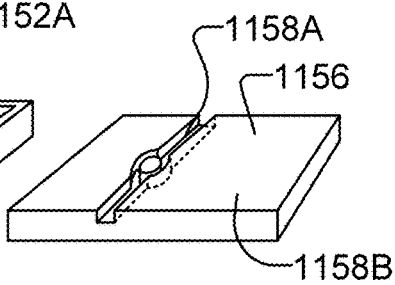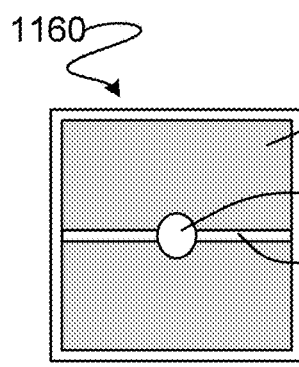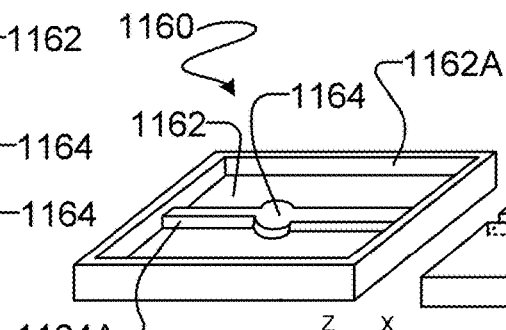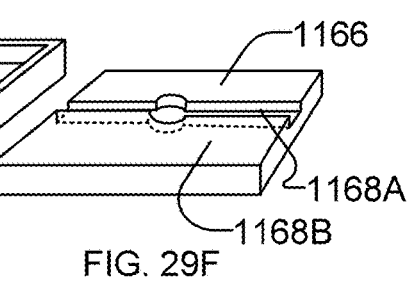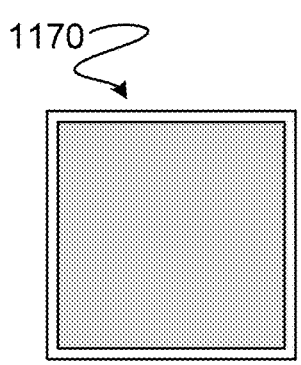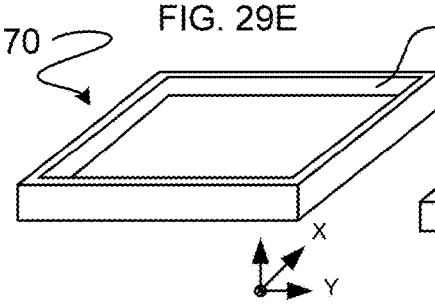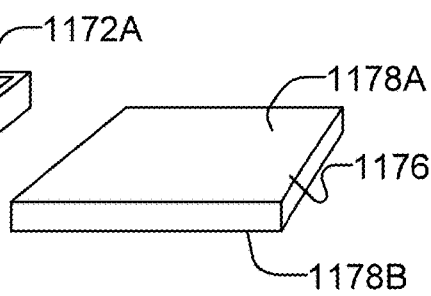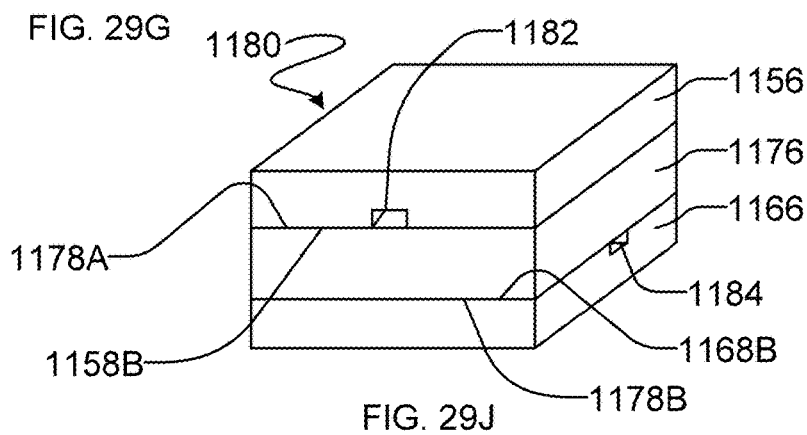

CAPACITIVE BENDING SENSORS

RELATED APPLICATIONS

This application claims the benefit of the priority of U.S. application No. 62/457,122 filed 9 Feb. 2017 which is hereby incorporated herein by reference.

TECHNICAL FIELD

The invention relates to capacitive bending sensor units for a variety of applications. Particular embodiments, may comprise bendable proximity and pressure sensor units capable of distinguishing between bending in one or more directions, proximity and pressure.

BACKGROUND

As electronic devices become smaller, lighter and include more functionality, there is a drive to integrate such electronics into clothes and apply them to skin to unobtrusively monitor health and track movements. Such applications benefit from bendable and transparent touch sensors that enable the underlying surface to remain visible during use. A wide variety of other applications may benefit from touch and/or proximity sensors which may be transparent and which may be stretchable and/or otherwise deformable.

Various tactile sensors based on metal mesh, carbon nanotubes and silver nanowires demonstrate operation in bent configurations. However, such previous devices only show the ability to either detect touch, bending, or touch and bending without the ability to distinguish between the two.

Touch sensitivity has been achieved in gel electrodes by detecting physical deformation of the electrodes. This requirement of physical deformation also means that such gel electrode sensors are sensitive to bending and have not proved capable of detecting touch during bending.

There is a general desire for sensors capable of detecting touch and/or proximity during bending and/or other forms of deformation and capable of distinguishing between touch, proximity, and bending and/or other forms of deformation.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a sensor unit for detecting bending of the sensor unit. The sensor unit comprises a capacitive upper sensor having an upper capacitance ($C_{upper}$) and comprising first and second deformable upper electrodes spaced apart from one another in a Z direction. The first and second upper electrodes respectively have first and second upper shapes. The sensor unit comprises a capacitive lower sensor having a lower capacitance ($C_{lower}$), spaced apart from the upper sensor in a Z direction. The capacitive lower sensor comprises first and second deformable lower electrodes spaced apart from one another in the Z direction. The first and second lower electrodes respectively have first and second lower shapes. For a bend of the sensor unit in a first direction about a Y-axis orthogonal to the Z direction, the first and second upper shapes change such that the upper capacitance ($C_{upper}$) decreases and the lower shapes change such that the lower capacitance ($C_{lower}$) increases. For a bend of the sensor unit in a second direction about the Y-axis and opposed to the first direction, the first and second upper shapes change such that the upper capacitance ($C_{upper}$) increases and the lower shapes change such that the lower capacitance ($C_{lower}$) decreases.

In some embodiments, a circuit is connected to apply an upper voltage between the first and second upper electrodes to thereby cause an upper electric field ($E_{upper}$) in a vicinity of the upper sensor and is connected to apply a lower voltage between the first and second lower electrodes to thereby cause a lower electric field ($E_{lower}$) in a vicinity of the lower sensor. In some embodiments, a capacitance-measurement circuit is connected to generate an upper sensor signal representative of the upper sensor capacitance ($C_{upper}$) and a lower sensor signal representative of the lower sensor capacitance ($C_{lower}$). In some embodiments, a processor is connected to receive the upper sensor signal and the lower sensor signal and is configured to determine estimated values for the upper sensor capacitance ($C_{upper}$) and the lower sensor capacitance ($C_{lower}$) therefrom.

In some embodiments, the circuit is connected to apply the upper voltage and the lower voltage at nominal voltage levels and the processor is configured to determine the estimated values for the upper sensor capacitance ($C_{upper}$) and the lower capacitance ($C_{lower}$) to be a nominal upper sensor capacitance level ($C_{u,nom}$) and a nominal lower sensor capacitance level ($C_{l,nom}$) respectively when the sensor unit is not bent.

In some embodiments, the processor is configured to at least one of generate and output one or more signals indicating a bend of the sensor unit in the first direction about the Y-axis when the estimated value of the upper sensor capacitance ($C_{upper}$) decreases below a threshold range around the nominal upper sensor capacitance level ($C_{u,nom}$) and the estimated value of the lower sensor capacitance ($C_{lower}$) increases above a threshold range around the nominal lower sensor capacitance level ($C_{l,nom}$). In some embodiments, the processor is configured to at least one of generate and output one or more signals indicating a bend of the sensor unit in the second direction about the Y-axis when the estimated value of the upper sensor capacitance ($C_{upper}$) increases above a threshold range around the nominal upper sensor capacitance level ($C_{u,nom}$) and the estimated value of the lower sensor capacitance ($C_{lower}$) decreases below a threshold range around the nominal lower sensor capacitance level ($C_{l,nom}$).

In some embodiments, the sensor unit comprises a neutral bending plane and the upper sensor and the lower sensor are on opposite sides of the neutral bending plane. In some embodiments, the upper sensor is spaced apart from the neutral bending plane in the Z direction by an upper sensor neutral spacing and the lower sensor is spaced apart from the neutral bending plane in the Z direction by a lower sensor neutral spacing and the upper sensor neutral spacing is substantially equal to the lower sensor neutral spacing. In some embodiments, the upper sensor is spaced apart from the neutral bending plane in the Z direction by an upper sensor neutral spacing and the lower sensor is spaced apart from the neutral bending plane in the Z direction by a lower sensor neutral spacing and the upper sensor neutral spacing is substantially unequal to the lower sensor neutral spacing.

In some embodiments, the first and second upper electrodes and the first and lower electrodes are substantially transparent at visible light wavelengths. In some embodiments, the first and second upper electrodes and the first and lower electrodes have transmissivities of over 90% at visible light wavelengths.

In some embodiments, the first and second upper electrodes and the first and second lower electrodes are fabricated from ionically conductive hydrogel. In some embodiments, the first and second upper electrodes and the first and second lower electrodes are fabricated from at least one of: a metal mesh; silver nanowires, carbon nanotubes and one or more conducting polymers. In some embodiments, at least one of the first and second lower electrodes is elastically deformable. In some embodiments, at least one of the first and second upper electrodes is elastically deformable.

In some embodiments, the first and second upper shapes changing comprises the first and second upper electrodes changing in cross-sectional area in a plane orthogonal to the Z direction. In some embodiments, the first and second lower shapes changing comprises the first and second lower electrodes changing in size in a plane orthogonal to the Z direction.

Another aspect of the invention provides a sensor unit for detecting bending of the sensor unit. The sensor unit comprises a capacitive sensor having a capacitance (C) and comprises first and second deformable electrodes spaced apart from one another in a Z direction. The first and second upper electrodes respectively have first and second shapes. For a bend of the sensor unit in a first direction about a Y-axis orthogonal to the Z direction, at least one of the first and second shapes change such that the capacitance (C) increases. For a bend of the sensor unit in a second direction about the Y-axis and opposed to the first direction, at least one of the first and second shapes change such that the capacitance (C) decreases.

In some embodiments, the sensor unit comprises a neutral bending plane and the first electrode is spaced apart from the neutral bending plane in the Z direction by a first electrode neutral spacing and the second electrode is spaced apart from the neutral bending plane in the Z direction by a second electrode neutral spacing wherein the second neutral spacing is greater than the first neutral spacing. In some embodiments, the first neutral spacing is zero.

In some embodiments, a circuit is connected to apply a voltage between the first and second electrodes to thereby cause an electric field (E) in a vicinity of the sensor unit. In some embodiments, a capacitance-measurement circuit is connected to generate a sensor signal representative of the capacitance (C). In some embodiments, a processor is connected to receive the sensor signal and is configured to determine an estimated value for the capacitance (C) therefrom. In some embodiments, the circuit is connected to apply the voltage at a nominal voltage level and the processor is configured to determine the estimated value for the sensor capacitance (C) to be a nominal sensor capacitance level ($C_{nom}$) when the sensor unit is not bending.

In some embodiments, the processor is configured to at least one of generate and output one or more signals indicating a bend of the sensor unit in the first direction about the Y-axis when the estimated value of the capacitance (C) increases above a threshold range around the nominal sensor capacitance level ($C_{nom}$). In some embodiments, the processor is configured to at least one of generate and output one or more signals indicating a bend of the sensor unit in the second direction about the Y-axis when the estimated value of the capacitance (C) decreases below a threshold range around the nominal sensor capacitance level ($C_{nom}$).

In some embodiments, the first electrode and the second electrode are on opposite sides of the neutral bending plane.

Another aspect of the invention provides a sensor array comprising a plurality of Y direction oriented sensor unit columns, each sensor unit column comprising a plurality of sensor units generally aligned with one another in the Y direction and each sensor unit column oriented such that the plurality of sensor units form a plurality of X direction oriented sensor unit rows, each sensor unit row comprising a subset of the plurality of sensor units generally aligned with one another in an X direction. Each of the plurality of sensor unit comprises a sensor unit according to any one of the sensor units described herein.

In some embodiments, the sensor array comprises a processor connected to each of the plurality of sensor units and configured to estimate the capacitance of each of the plurality of sensor units. In some embodiments, the processor is configured to at least one of generate and output one or more signals indicating that the sensor array is being bent about an axis when at least two sensor units, located along the axis, of the plurality of sensor units exhibit a substantially equal change in estimated capacitance.

Another aspect of the invention provides a method for fabricating a sensor unit. The method comprises embedding a first electrode within a dielectric material of the sensor unit at a first location spaced apart in a Z direction from a neutral bending plane of the sensor unit by a first neutral spacing. The method comprises embedding a second electrode within the dielectric material of the sensor unit at a second location spaced apart in the Z direction from a neutral bending plane of the sensor unit by a second neutral spacing. In some embodiments, the first neutral spacing is less than the second neutral spacing. In some embodiments, the first neutral spacing is zero.

In some embodiments, the first location and the second location are on opposite sides of the neutral bending plane.

Another aspect of the invention provides a method for fabricating a sensor unit. The method comprises embedding a capacitive upper sensor within a dielectric material of the sensor unit at a first location spaced apart from a neutral bending plane of the sensor unit in a positive-Z direction and embedding a capacitive lower sensor within the dielectric material of the sensor unit at a second location spaced apart from the neutral bending plane of the sensor unit in a negative-Z direction.

In some embodiments, the capacitive upper sensor comprises first and second deformable upper electrodes spaced apart from one another in the Z direction and the capacitive lower sensor comprises first and second deformable lower electrodes spaced apart from one another in the Z direction.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 3 depicts the FIG. 1 sensor undergoing bending in a first direction.

FIG. 4 depicts the FIG. 1 sensor undergoing bending in a second direction.

FIG. 9 depicts the FIG. 7 sensor undergoing bending in a first direction.

FIG. 10 depicts the FIG. 7 sensor undergoing bending in a second direction.

FIG. 16A depicts a schematic plan view of a sensor according to one embodiment of the invention.

FIG. 16B depicts a schematic cross-section of the FIG. 16A sensor along line A-A of FIG. 16A.

FIGS. 23A to 23E and 23G to 23K depict a sensor interacting with a pointing element according to one embodiment of the invention.

FIG. 24 depicts a schematic plan view of a sensor according to one embodiment of the invention.

FIGS. 25A and 25B depict schematic cross sections of the FIG. 24 sensor along the line C-C of FIG. 24.

FIGS. 26A to 26E and 26G to 26K depict a sensor interacting with a pointing element according to one embodiment of the invention.

FIG. 28A depicts a schematic plan view of a sensor according to one embodiment of the invention.

FIG. 28B depicts a schematic cross-section of the FIG. 28A sensor along the line E-E of FIG. 28A.

FIGS. 29A and 29B depict top plan and perspective views of a first electrode mold according to one aspect of the invention. FIG. 29C depicts a first electrode layer according to one embodiment of the invention. FIGS. 29D and 29E depict top plan and perspective views of a second electrode mold according to one aspect of the invention. FIG. 29F depicts a second electrode layer according to one embodiment of the invention. FIGS. 29G and 29H depict top plan and perspective views of a spacer mold according to one aspect of the invention. FIG. 29I depicts a spacer layer according to one embodiment of the invention. FIG. 29J depicts a sensor body according to one embodiment of the invention.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

This disclosure includes an Appendix with disclosure related to various embodiments of a so-called "Cluster Sensor" (referred to herein as the "Cluster Sensor Appendix"). Any of the sensor units disclosed in the main body of this disclosure (which may include one or more capacitors) may be used as any of the fringe sensors and/or overlap sensors described in the Cluster Sensor Appendix (or vice versa) and may be used to sense bending, stretching, pointing element proximity and/or pointing element contact. The capacitance of any of the sensor units disclosed in the main body of this disclosure may be sensed using circuits, processors and/or techniques similar to the capacitance measurement circuits, processors and/or techniques disclosed in the Cluster Sensor Appendix. The capacitance of any of the sensor units disclosed in the main body of this disclosure may be sensed using circuits, processors and/or techniques similar to the capacitance measurement circuits, processors and/or techniques disclosed in the Cluster Sensor Appendix.

Figure 2:
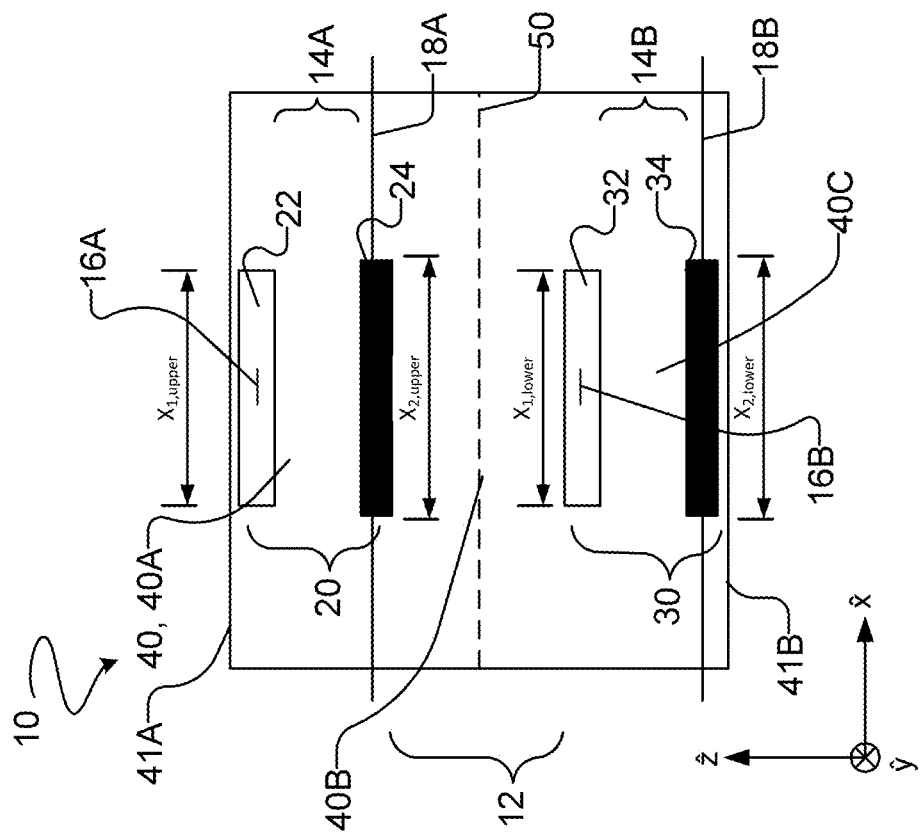
FIG. 2 depicts a schematic cross-section of the FIG. 1 sensor along line A-A of FIG. 1.
Figure 1:
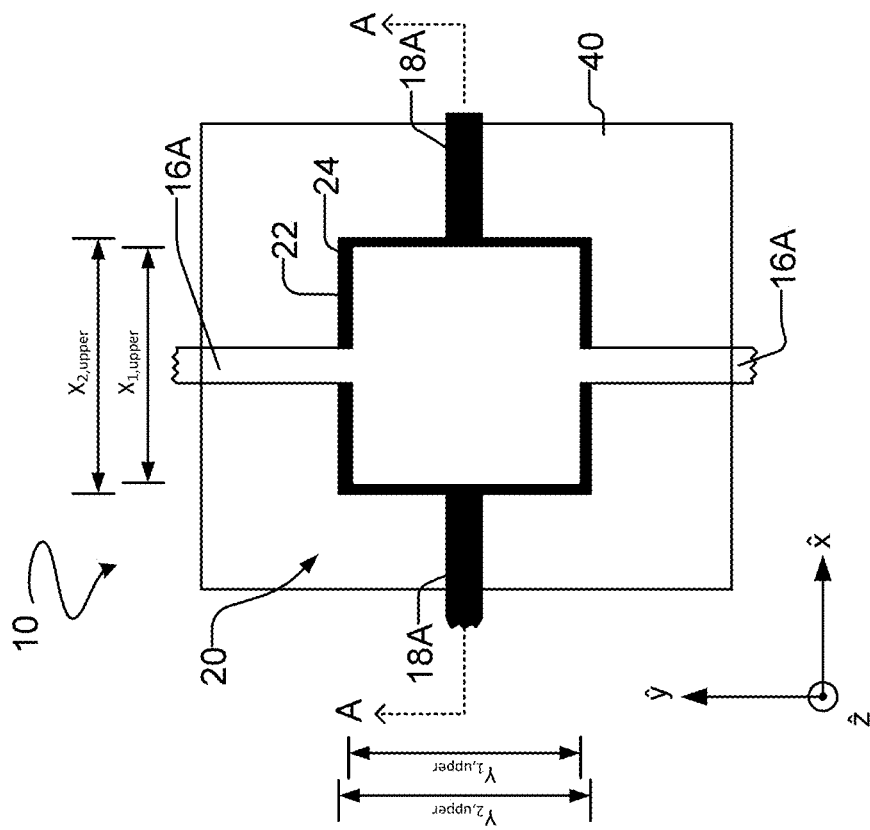
FIG. 1 depicts a schematic plan view of a sensor according to one embodiment of the invention.

One aspect of the invention provides a sensor unit 10 for detecting bending of the sensor unit. FIGS. 1 and 2 depict a sensor unit 10 for detecting bending according to an example embodiment. Sensor unit 10 may comprise an upper capacitive sensor 20 and a lower capacitive sensor 30 spaced apart from one another in a Z direction by a sensor spacing 12, such as is depicted in FIG. 2.

Upper sensor 20 may comprise first and second upper electrodes 22, 24 spaced apart from one another in the Z direction by an upper sensor spacing 14A. As can be seen from FIG. 1, first upper electrode 22 of the illustrated embodiment has an XY-plane (i.e. a plane extending in the X and Y directions) cross-sectional shape like a rectangle (or more particularly, a square) having an X direction dimension $X_{1,upper}$ and a Y direction dimension $Y_{1,upper}$. $X_{1,upper}$ may be equal to $Y_{1,upper}$, although this is not necessary. Similarly, second upper electrode 24 of the illustrated embodiment has an XY-plane cross-sectional shape like a rectangle (or more particularly, a square) having an X direction dimension $X_{2,upper}$ and a Y direction dimension $Y_{2,upper}$. $X_{2,upper}$ may be equal to $Y_{2,upper}$, although this is not necessary. In some embodiments, $X_{1,upper}$ is equal to $X_{2,upper}$ and/or $Y_{1,upper}$ is equal to $Y_{2,upper}$. This is not necessary. Although spaced apart in the Z direction, first upper electrode 22 may be concentric with second upper electrode 24 (i.e. a Z direction line may pass through an XY-plane center of first upper electrode 22 and an XY-plane center of second upper electrode 24. This is not mandatory. In some embodiments, the XY-plane cross-sectional shapes of first and second upper electrodes 22, 24 need not be rectangular or square and may have other XY-plane cross-sectional shapes. For example, in some embodiments, the XY-plane cross-sectional shapes of first and second upper electrodes 22, 24 may comprise a circular shape, an elliptical shape, a polygonal shape and/or the like. Further, it is not necessary that the shape of second upper electrode 24 match the shape of first upper electrode 22. For example, first upper electrode 22 may have a rectangular shape in XY-plane cross-section and second upper electrode 24 may have a circular shape in XY-plane cross-section.

Lower sensor 30 may comprise first and second lower electrodes 32, 34 spaced apart from one another in the Z direction by a lower sensor spacing 14B. As can be seen from FIG. 1, first lower electrode 32 of the illustrated embodiment has an XY-plane cross-sectional shape like a rectangle (or more particularly, a square) having an X direction dimension $X_{1,lower}$ and a Y direction dimension $X_{1,lower}$. $X_{1,lower}$ may be equal to $X_{1,lower}$, although this is not necessary. Similarly, second lower electrode 34 of the illustrated embodiment has an XY-plane cross-sectional shape like a rectangle (or more particularly, a square) having an X direction dimension $X_{2,lower}$ and a Y direction dimension $Y_{2,lower}$. $X_{2,lower}$ may be equal to $Y_{2,lower}$, although this is not necessary. In some embodiments, $X_{1,lower}$ is equal to $X_{2,lower}$ and/or $X_{1,lower}$ is equal to $Y_{2,lower}$. This is not necessary. Although spaced apart in the Z direction, first lower electrode 32 may be concentric with second lower electrode 34 (i.e. a Z direction line may pass through an XY-plane center of first upper electrode 32 and an XY-plane center of second lower electrode 34. This is not mandatory. In some embodiments, the XY-plane cross-sectional shapes of first and second lower electrodes 32, 34 need not be rectangular or square and may have other XY-plane cross-sectional shapes. For example, in some embodiments, the XY-plane cross-sectional shapes of first and second lower electrodes 32, 34 may comprise a circular shape, an elliptical shape, a polygonal shape and/or the like. Further, it is not necessary that the shape of second lower electrode 34 match the shape of first lower electrode 32. For example, first lower electrode 32 may have a rectangular shape in XY-plane cross-section and second lower electrode 24 may have a circular shape in XY-plane cross-section.

Although upper and lower sensors 20, 30 depicted and discussed herein are of the same sizes and shapes, this is not necessary, and upper and lower sensors 20, 30 may be of different sizes and/or shapes. In some embodiments, upper and lower sensors 20, 30 may comprise fringe sensors, overlap sensors, cluster sensors or any other sensors described in the Cluster Sensor Appendix.

In some embodiments, first and second upper electrodes 22, 24 and first and second lower electrodes 32, 34 are made of a deformable and transparent material, such as an ionically conductive gel. One particular non-limiting example of a deformable and transparent ionically conductive gel from which electrodes 22, 24, 32, 34 could be fabricated is polyacrylamide. Accordingly, sensor unit 10 may be deformable (i.e. stretchable, bendable and/or the like) and/or may be optically transparent. In other embodiments, first and second upper electrodes 22, 24 and first and second lower electrodes 32, 34 may be fabricated from metal mesh, silver nanowires, carbon nanotubes, conducting polymers (e.g. PEDOT:PSS), other ionically conducting hydrogels and/or the like.

First and second upper electrodes 22, 24 may be spaced apart from one another in the Z direction by a dielectric 40A. Upper and lower sensors 20, 30 may be spaced apart from one another in the Z direction by a dielectric 40B. First and second lower electrodes 32, 34 may be spaced apart from one another in the Z direction by a dielectric 40C. In some embodiments, dielectrics 40A, 40B, 40C are fabricated from the same material while in others, different dielectric materials may be employed for one or more of dielectrics 40A, 40B, 40C. For convenience, dielectrics 40A, 40B, 40C may be referred to herein collectively and/or individually as dielectric(s) 40. In the illustrated embodiment, with the possible exception of vias for electrical traces, dielectric 40 surrounds sensors 20, 30. Dielectric 40 may comprise any suitable dielectric material. For example, dielectric material 40 may comprise a silicone material (examples include PDMS, Ecoflex™, Dragon Skin™, etc.) any suitable form of rubbery material with optical properties considered to be desirable for an application (e.g. in case of a touch screen, it may be desirable for dielectric 40 to be transparent) and mechanical properties considered to be desirable for a particular application (e.g. low elastic modulus or stretchable may be desirable for wearable applications).

Upper and lower sensors 20, 30 may be connected to one or more circuits such that an upper voltage may be applied across first and second upper electrodes 22, 24 and a lower voltage may be applied across first and second lower electrodes 32, 34. For example, first upper electrode 22 may be connected via traces 16A, second upper electrode 24 may be connected via traces 18A, first lower electrode 32 may be connected via traces 16B and second lower electrode 34 may be connected via traces 18B.

Sensor unit 10 comprises a neutral plane 50 extending in the X and Y directions. Neutral plane 50 may exhibit the property that, under bending about the X and/or Y directions, neutral plane 50 is not under either tension or compression. Since there is no stress force on neutral plane 50, there is no strain or extension either. Accordingly, the X and Y direction dimensions of neutral plane 50 remain constant during bending about the X and/or Y directions. The location and orientation of neutral plane 50 may be determined based on the material properties and geometry of sensor unit 10. For example, where electrodes 22, 24 and 32, 34 have approximately the same size and deformability as one another and the spacings 14A, 14B between upper electrodes 22, 24 and lower electrodes 32, 34 are approximately equal (in the absence of external forces), neutral plane 50 may be located approximately at a mid-plane between upper and lower sensors 20, 30 by respectively locating upper and lower sensors 20, 30 at locations approximately equidistant (in the Z direction) from the upper and lower dielectric surfaces 41A, 41B (FIG. 2). With this configuration, upper and lower sensors 20, 30 will be approximately symmetric about neutral plane 50 and neutral plane 50 will be located approximately at a mid-plane between upper and lower sensors 20, 30, as shown in FIG. 2. For electrodes having other shapes or characteristics, electrodes can be suitably located within dielectric 40 (e.g. between the upper and lower dielectric surfaces 41A, 41B) to locate neutral plane 50 in a desired location. Such electrode locations within dielectric 40 can be determined experimentally or may be calculated using known methods.

FIG. 3 schematically depicts sensor unit 10 being bent in a first direction about an axis oriented in the Y direction. As can be seen from the schematic illustration of FIG. 3, any portion of sensor unit 10 that is above (in the FIG. 3 view) neutral plane 50, such as upper sensor 20, is under compression such that its X direction dimension is reduced (relative to a non-bent state). Conversely, any portion of sensor unit 10 below (in the FIG. 3 view) neutral plane 50, such as lower sensor 30, is under tension such that its X direction dimension is increased (relative to a non-bent state). In other words, as sensor unit 10 is bent in the first direction about the Y direction axis, $X_{1,upper}$ and $X_{2,upper}$ decrease to $X'_{1,upper}$ and $X'_{2,upper}$ and $X_{1,lower}$ and $X_{2,lower}$ increase to $X'_{1,lower}$ and $X'_{2,lower}$.

This change in the dimensions of first and second upper electrodes 22, 24 and first and second lower electrodes 32, 34 has a resulting impact on upper sensor capacitance, $C_{upper}$, and lower sensor capacitance, $C_{lower}$, since these capacitances are related to the areas of the electrode surfaces.

Figure 5:
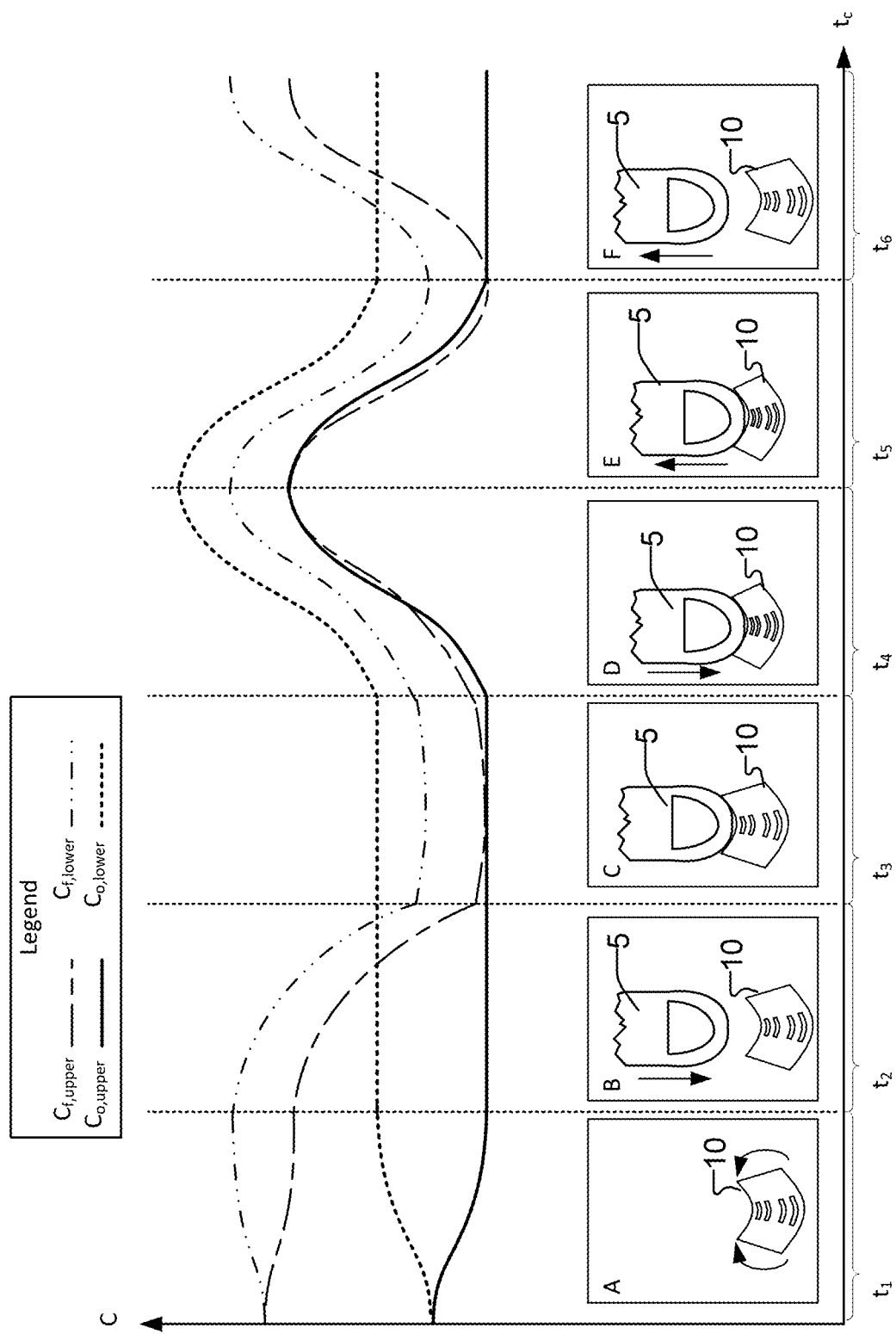
FIGS. 5 and 6 depict graphs of capacitance over time for the FIG. 1 sensor in various scenarios according to one embodiment of the invention.

FIG. 5 depicts a graph of capacitance of upper and lower sensors 20, 30 over time for Scenarios A through F, where each scenario represents a particular interaction between a pointing element 5 (in the illustrated embodiment a finger) and sensor unit 10. Bending sensor unit 10 in the first direction about the Y direction axis (as shown in FIG. 3) is represented by Scenario A and takes place during time, $t_1$, in FIG. 5. As can be seen from FIG. 5, upper sensor capacitance, $C_{upper}$, (represented by either of $C_{o,upper}$ or $C_{f,upper}$, as will be discussed further herein) decreases as bending in the first direction about the Y direction axis increases and lower sensor capacitance, $C_{lower}$, (represented by either of $C_{o,lower}$ or $C_{f,lower}$, as will be discussed further herein) increases as bending in the first direction about the Y direction axis increases. This decrease in upper sensor capacitance, $C_{upper}$, may be attributable to the decrease in the X direction dimensions of first and second upper electrodes 22, 24. Conversely, the increase in lower sensor capacitance, $C_{lower}$, may be attributable to the increase in the X direction dimensions of first and second lower electrodes 32, 44.

FIG. 4 schematically depicts sensor unit 10 being bent in a second direction (opposite to the first direction) about a Y direction axis. As can be seen from the schematic illustration of FIG. 4, any portion of sensor unit 10 above (in the FIG. 4 view) neutral plane 50, such as upper sensor 20, is under tension such that its X direction dimension is increased (relative to a non-bent state). Conversely, any portion of sensor unit 10 below (in the FIG. 4 view) neutral plane 50, such as lower sensor 30, is under compression such that its X direction dimension is decreased (relative to a non-bent state). In other words, as sensor unit 10 is bent in the second direction about the Y direction axis, $X_{1,upper}$ and $X_{2,upper}$ increase to $X''_{1,upper}$ and $X''_{2,upper}$ and $X_{1,lower}$ and $X_{2,lower}$ decrease to $X''_{1,lower}$ and $X''_{2,lower}$.

This change in the dimensions of the first and second upper electrodes 22, 24 and first and second lower electrodes 32, 34 has a resulting impact on upper sensor capacitance, $C_{upper}$, and lower sensor capacitance, $C_{lower}$ since these capacitances are related to the areas of the electrode surfaces.

Figure 6:
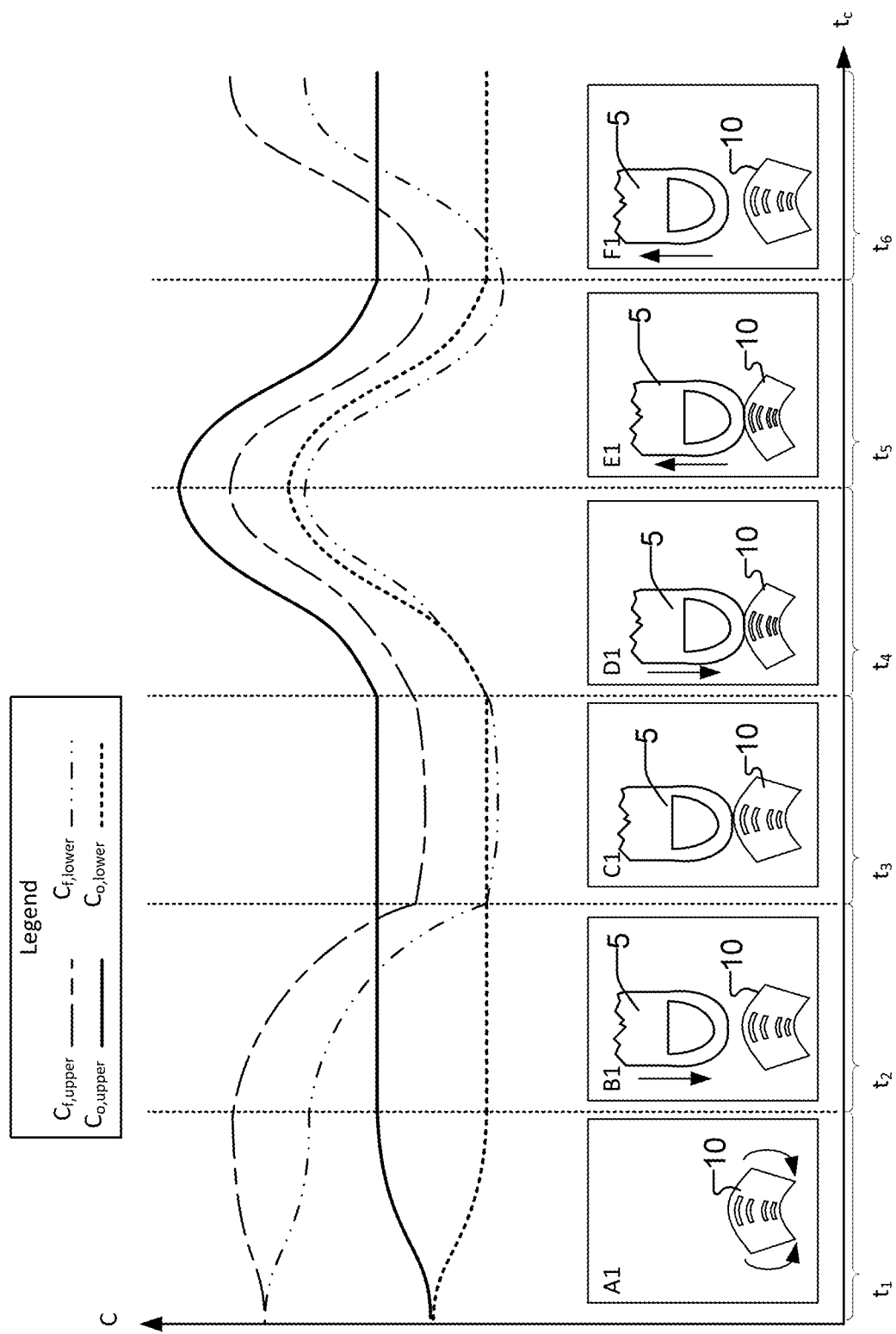

FIG. 6 depicts a graph of capacitance over time for Scenarios A1 through F1 where each scenario represents a particular interaction between a pointing element 5 (in the illustrated embodiment a finger) and sensor unit 10. Bending sensor unit 10 in the second direction about the Y direction axis (as shown in FIG. 4) is represented by Scenario A1 and takes place during time, $t_1$, in FIG. 6. As can be seen from FIG. 6, upper sensor capacitance, $C_{upper}$, (represented by either of $C_{o,upper}$ or $C_{f,upper}$, as will be discussed further herein) increases as bending in the second direction about the Y direction axis increases and the lower sensor capacitance, $C_{lower}$, (represented by either of $C_{o,lower}$ or $C_{f,lower}$, as will be discussed further herein) decreases as bending in the first direction about the Y direction axis increases. This increase in upper sensor capacitance, $C_{upper}$, may be attributable to the increase in the X direction dimensions of first and second upper electrodes 22, 24. Conversely, the decrease in lower sensor capacitance, $C_{lower}$, may be attributable to the decrease in the X direction dimensions of first and second lower electrodes 32, 44.

By monitoring $C_{upper}$ and $C_{lower}$, it may be possible to determine if sensor unit 10 is bending, whether sensor unit 10 is bending in the first direction or the second direction and what the magnitude of the bend is.

Sensor unit 10 may undergo bending about more than one axis simultaneously, such as bending about X and Y directions axes simultaneously. In this case, both of the X and Y direction dimensions of upper and lower sensors 20, 30 will change according to the principals described herein. Since both the X and Y dimensions of upper and lower sensors 20, 30 change, it may be expected that the increase in surface area of the electrodes would be larger as compared to if bending of the same magnitude were only occurring about a single axis. It follows that the capacitances of upper and lower sensors 20, 30 would undergo larger increases/decreases as compared to bending of the same magnitude about a single axis.

As discussed in the Cluster Sensor Appendix, proximity, touch and pressure applied by a pointing element 5 may have predictable effects on the capacitance of the sensors described in the Cluster Sensor Appendix. By employing bending sensor unit 110 as one or more of the fringe and/or overlap sensors of a cluster sensor unit described in the Cluster Sensor Appendix (or vice versa), it may be possible to detect proximity, touch or pressure applied by a pointing element 5 (such as a finger) to the combined sensor unit, even while the combined sensor unit is undergoing bending.

For example, either or both of upper and lower sensors 20, 30 could fabricated as a fringe sensor or an overlap sensor (as described in the Cluster Sensor Appendix), where a fringe sensor is characterized as having a higher (relative to an overlap sensor) ratio of distal flux to proximate flux and an overlap sensor is characterized as having a lower (relative to a fringe sensor) ratio of distal flux to proximate flux.

FIG. 5 illustrates the change of capacitance of upper and lower sensors 20, 30 implemented as both fringe and overlap sensors, during Scenarios A through F, whether employed as upper or lower sensors 20, 30. In particular, FIG. 5 depicts $C_{f,upper}$, which represents the capacitance of upper sensor 20 fabricated as a fringe sensor, $C_{f,lower}$, which represents lower sensor 30 fabricated as a fringe sensor, $C_{o,upper}$, which represents the capacitance of upper sensor 20 fabricated as an overlap sensor, and $C_{o,lower}$, which represents the capacitance of lower sensor 30 fabricated as an overlap sensor.

As discussed above, Scenario A represents bending sensor unit 10 in the first direction about the Y direction axis (as shown in FIG. 3) during time, $t_1$. As can be seen from FIG. 5, $C_{f,upper}$ and $C_{o,upper}$ decrease as sensor unit 10 is bent. Notably, $C_{f,upper}$ undergoes a smaller decrease as compared to $C_{o,upper}$, since a fringe sensor has less overlap between its first and second electrodes and the change in areas of its first and second electrodes has a correspondingly small effect on its capacitance as compared to the overlap electrode, which has relatively more overlap between its first and second electrodes. Conversely, as can be seen from FIG. 5, $C_{f,lower}$ and $C_{o,lower}$ increase as sensor unit 10 is bent in the second direction about the Y direction axis. Notably, $C_{f,lower}$ undergoes a smaller increase as compared to $C_{o,lower}$, since the fringe sensor has less overlap between its first and second electrodes and the change in areas of its first and second electrodes has a correspondingly small effect on its capacitance as compared to the overlap electrode, which has relatively more overlap between its first and second electrodes.

Scenario B represents pointing element 5 approaching bent sensor unit 10 during time, $t_2$. Even though sensor unit 10 is bent, the capacitances of the fringe and overlap sensors are affected by interactions with pointing element 5 in the same way as discussed in the Cluster Sensor Appendix. For example, each of $C_{f,upper}$ and $C_{f,lower}$, decreases significantly as pointing element 5 approaches, while each of $C_{o,upper}$ and $C_{o,lower}$ experiences minimal change as pointing element 5 approaches bent sensor unit 10. Similarly, as can be seen from FIG. 5, during Scenarios C, D, E and F, $C_{f,upper}$, $C_{f,lower}$, $C_{o,upper}$ and $C_{o,lower}$ are each affected by the respective interactions with pointing element 5 (e.g. touch with no pressure, increasing pressure, decreasing pressure and withdrawal of pointing element 5) in the same way as the fringe and overlap sensors described in the Cluster Sensor Appendix. For brevity, the effects of pointing element 5 on bent sensor unit 10 represented by Scenarios C to F will not be discussed in detail herein, as they would be evident to a person skilled in the art based on the disclosure herein in combination with the disclosure of the Cluster Sensor Appendix.

FIG. 6 illustrates the change of capacitance of both fringe and overlap sensors, during Scenarios A1 through F1, whether employed as upper or lower sensors 20, 30. In particular, FIG. 6 depicts $C_{f,upper}$, which represents the capacitance of a fringe sensor fabricated as upper sensor 20, $C_{f,lower}$, which represents a fringe sensor fabricated as lower sensor 30, $C_{o,upper}$, which represents the capacitance of an overlap sensor fabricated as upper sensor 20, and $C_{o,lower}$, which represents an overlap sensor fabricated as lower sensor 30.

As discussed above, Scenario A1 represents bending sensor unit 10 in the second direction about the Y direction axis (as shown in FIG. 4) during time, $t_1$. As can be seen from FIG. 6, $C_{f,upper}$ and $C_{o,upper}$ increase as sensor unit 10 is bent. Notably, $C_{f,upper}$ undergoes a smaller increase as compared to $C_{o,upper}$ since the fringe sensor has less overlap between its first and second electrodes and the change in areas of its first and second electrodes has a correspondingly small effect on its capacitance as compared to the overlap electrode which has relatively more overlap between its first and second electrodes. Conversely, as can be seen from FIG. 6, $C_{f,lower}$ and $C_{o,lower}$ decrease as sensor unit 10 is bent. Notably, $C_{f,lower}$ undergoes a smaller decrease as compared to $C_{o,lower}$ since the fringe sensor has less overlap between its first and second electrodes and the change in areas of its first and second electrodes has a correspondingly small effect on its capacitance as compared to the overlap electrode which has relatively more overlap between its first and second electrodes.

As can be seen from FIG. 6, during Scenarios B1, C1, D1, E1 and F1, $C_{f,upper}$, $C_{f,lower}$, $C_{o,upper}$ and $C_{o,lower}$ are each affected by the respective interactions with pointing element 5 (e.g. approaching pointing element 5, touch with no pressure, increasing pressure, decreasing pressure and withdrawal of pointing element 5) in the same was as fringe and overlap sensors described in the Cluster Sensor Appendix. For brevity, the effects of pointing element 5 on bent sensor unit 10 as represented by Scenarios B1 to F1 will not be discussed in detail herein as they would be evident to a person skilled in the art based on the disclosure herein in combination with the disclosure of the Cluster Sensor Appendix.

Figure 8:
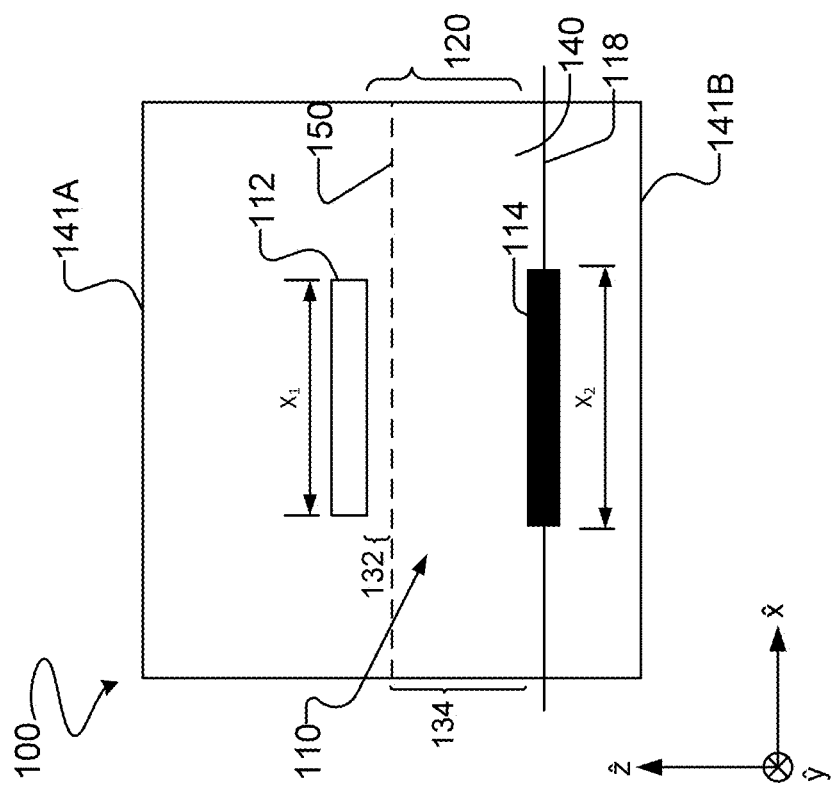
FIG. 8 depicts a schematic cross-section of the FIG. 7 sensor along line B-B of FIG. 1.
Figure 7:
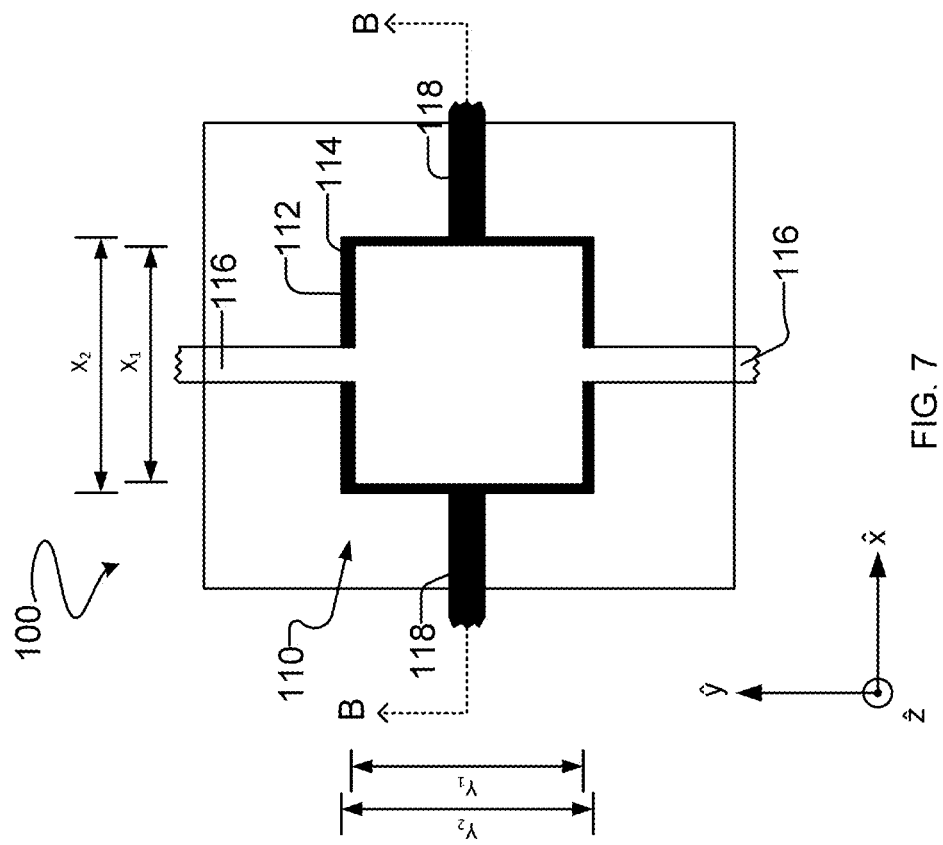
FIG. 7 depicts a schematic plan view of a sensor according to another embodiment of the invention.

Another aspect of the invention provides a sensor unit 100 for detecting bending of the sensor unit. Sensor unit 100 may comprise a capacitive sensor 110, such as is depicted in FIGS. 7 and 8.

Sensor 110 of sensor unit 100 may comprise first and second electrodes 112, 114 spaced apart from one another in the Z direction by an electrode spacing 120. As can be seen from FIG. 7, first electrode 112 of the illustrated embodiment has an XY-plane (i.e. a plane extending in the X and Y directions) cross-sectional shape like a rectangle (or more particularly, a square) having an X direction dimension $X_1$ and a Y direction dimension $Y_1$. $X_1$ may be equal to $Y_1$, although this is not necessary. Similarly, second electrode 114 of the illustrated embodiment has an XY-plane cross-sectional shape like a rectangle (or more particularly, a square) having an X direction dimension $X_2$ and a Y direction dimension $Y_2$. $X_2$ may be equal to $Y_2$, although this is not necessary. In some embodiments, $X_1$ is equal to $X_2$ and/or $Y_1$ is equal to $Y_2$. This is not necessary. Although spaced apart in the Z direction, first electrode 112 may be concentric with second electrode 114 (i.e. a Z direction line may pass through an XY-plane center of first electrode 112 and an XY-plane center of second electrode 114. This is not mandatory. In some embodiments, the XY-plane cross-sectional shapes of first and second electrodes 112, 114 need not be rectangular or square and may have other XY-plane cross-sectional shapes. For example, in some embodiments, the XY-plane cross-sectional shapes of first and second electrodes 112, 114 may comprise a circular shape, an elliptical shape, a polygonal shape and/or the like. Further, it is not necessary that the shape of second electrode 114 match the shape of first electrode 112. For example, first electrode 112 may have a rectangular shape in XY-plane cross-section and second electrode 114 may have a circular shape in XY-plane cross-section. In some embodiments, sensor 110 may have electrodes 112, 114 shaped to provide fringe sensors, overlap sensors, cluster sensors or any other sensors described in the Cluster Sensor Appendix.

First and second electrodes 112, 114 may be spaced apart from one another in the Z direction by a dielectric 140. In the illustrated embodiment, with the possible exception of vias for electrical traces, dielectric 140 surrounds electrodes 112, 114. Dielectric 140 may comprise any suitable dielectric material and may be similar to and have characteristics and features similar to dielectric 40.

Sensor unit 100 comprises a neutral plane 150 extending in the X and Y directions. Neutral plane 150 may exhibit the property that, under bending about the X and/or Y directions, neutral plane 150 is not under either tension or compression. As there is no stress force on neutral plane 150, there is no strain or extension either. Accordingly, the X and Y direction dimensions of neutral plane 150 remains constant during bending about the X and/or Y directions. The location and orientation of neutral plane 150 may be determined based on the material properties and geometry of sensor unit 100. For example, in the FIG. 8 embodiment, neutral plane 150 is located between electrodes 112, 114, but is relatively more proximate to upper electrode 112 than lower electrode 114. Where electrodes 112, 114 34 have approximately the same size and deformability as one another, neutral plane 150 may be located relatively close to upper electrode 112 by locating upper electrode 112 relatively far from upper dielectric surface 141A and locating lower electrode 114 relatively close to lower dielectric surface 141B (as shown in FIG. 8). With this configuration, upper and lower electrodes 112, 114 will be asymmetric about neutral plane 50 (which may be located at or near a mid-plane between upper and lower dielectric surfaces 141A, 141B). Conversely, neutral plane 150 may be located relatively close to lower electrode 114 by locating lower electrode 114 relatively far from lower dielectric surface 141B and locating upper electrode 112 relatively close to upper dielectric surface 141A. For electrodes having other shapes or characteristics, electrodes can be suitably located within dielectric 140 (e.g. between the upper and lower dielectric surfaces 141A, 141B) to locate neutral plane 150 in a desired location. Such electrode locations within dielectric 140 can be determined experimentally or may be calculated using known methods. In some embodiments, the young's modulus of one or both of upper and lower electrodes 112, 114 may be modified to locate neutral plane 150 in a desired location.

First electrode 112 may be spaced apart from neutral axis 150 in the Z direction by a first electrode neutral spacing 132 while second electrode 114 may be spaced apart from neutral axis 150 in the Z direction by a second electrode neutral spacing 134. First and second electrode neutral spacings 132, 134 are different from one another. As depicted in the FIG. 8 embodiment, first electrode neutral spacing 132 is less than second electrode spacing 134. This difference in first and second electrode neutral spacings 132, 134 may be accomplished in various ways. For example, first electrode 112 may be positioned above neutral plane 150 (i.e. in the positive Z direction from neutral plane 150) while second electrode 114 is below neutral plane 150 (i.e. in the negative Z direction from neutral plane 150) while maintaining that first electrode neutral spacing 132 is less than second electrode neutral spacing 134 (see, for example, FIG. 8). In some embodiments (not depicted), a portion of first electrode 112 may be located on neutral plane 150 such that first electrode neutral spacing 132 is equal to zero, while second electrode 114 is located either above or below neutral plane 150. In some other embodiments (not depicted), both of first and second electrodes 112, 114 are located above or below (in the Z direction) neutral plane 150, while second electrode neutral spacing 134 is greater than first electrode neutral spacing 132.

Sensor 110 may be connected to one or more circuits such that a voltage may be applied across first and second electrodes 112, 114. For example, first electrode 112 may be connected via traces 116 and second electrode 114 may be connected via traces 118.

FIG. 9 schematically depicts sensor unit 100 being bent in a first direction about an axis oriented in the Y direction. As can be seen from the schematic illustration of FIG. 9, any portion of sensor unit 100 above (in the FIG. 9 view) neutral plane 150, such as upper electrode 112, is under compression, such that its X direction dimension is reduced (relative to a non-bent state). Conversely, any portion of sensor unit 100 below (in the FIG. 9 view) neutral plane 150, such as lower electrode 114, is under tension, such that its X direction dimension is increased (relative to a non-bent state). In other words, as sensor unit 100 is bent in the first direction about the Y direction axis, $X_1$ decreases to $X'_1$ and $X_2$ increases to $X'_2$.

The extent of the increase or decrease in the X direction dimensions of portions of sensor unit 100 that are above or below neutral plane 150 may be proportional to (or otherwise positively correlated with) the Z direction distance of such portions from neutral axis 150. For example, second electrode 114, which is spaced apart from neutral axis 150 by a greater amount than first electrode 112 as discussed above, will experience a greater increase ($|X'_2-X_2|$) in its X direction dimension than the decrease ($|X'_1-X_1|$) in X direction dimension of first electrode 112. These changes in the X direction dimensions of the first and second electrodes 112, 114 have a resulting impact on the capacitance, C, of sensor 110, since this capacitance is related to the surface areas of first and second electrodes 112, 114. In particular, in the circumstance shown in FIG. 9 where the increase in the X-direction dimension of second electrode 114 is greater than the decrease in the X-direction dimension of first electrode 112, the capacitance, C, sensor 110 increases.

In an embodiment where first electrode 112 was located on (or approximately on) neutral plane 150 (as discussed above), the X dimension, $X_1$, of first electrode 112 would not increase or decrease and would instead remain approximately constant. Such a location of first electrode 112 would tend to increase the magnitude of the increase in the capacitance, C, of sensor 110 during bending of sensor unit 100 in the first direction about the Y axis. In an embodiment where first electrode 112 was located slightly below neutral plane 150 (as discussed above), the X direction dimension, $X_1$, of first electrode 112 would also increase. Such a location of first electrode 112 would tend to increase the magnitude of the increase in the capacitance, C, of sensor 110 during bending of sensor unit 100 in the first direction about the Y axis.

Figure 11:
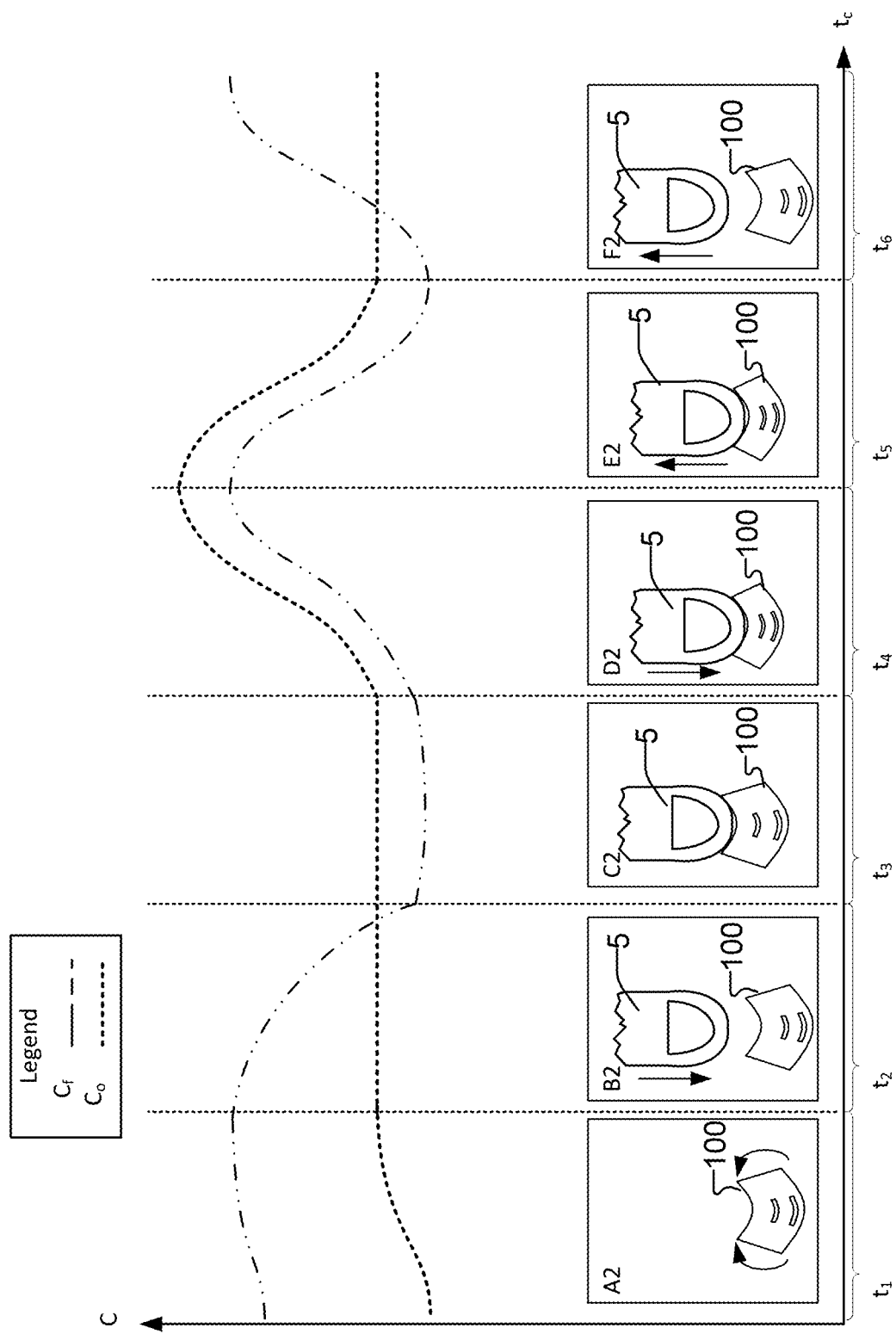
FIGS. 11 and 12 depict graphs of capacitance over time for the FIG. 7 sensor in various scenarios according to one embodiment of the invention.

FIG. 11 depicts a graph of capacitance over time for Scenarios A2 through F2, where each scenario represents a particular interaction between pointing element 5 (in the illustrated embodiment, a finger) and sensor unit 100. Bending sensor unit 100 in the first direction about the Y direction axis (as shown in FIG. 9) is represented by Scenario A2 and takes place during time, $t_1$, in FIG. 11. As can be seen from FIG. 11, capacitance, C, (represented by either of $C_o$ or $C_f$, as will be discussed further herein) increases as bending in the first direction about the Y direction axis increases. This increase in capacitance can be attributed to the changes in the X-direction dimensions of the first and second electrodes 112, 114, as discussed above.

FIG. 10 schematically depicts sensor unit 100 being bent in a second direction about an axis oriented in the Y direction, the second direction opposite the first direction. As can be seen from the schematic illustration of FIG. 10, any portion of sensor unit 100 above (in the FIG. 10 view) neutral plane 150, such as upper electrode 112, is under tension, such that its X direction dimension is increased (relative to a non-bent state). Conversely, any portion of sensor unit 100 below (in the FIG. 4 view) neutral plane 150, such as lower electrode 114, is under compression, such that its X direction dimension is decreased (relative to a non-bent state). In other words, as sensor unit 100 is bent in the second direction about the Y direction axis, $X_1$ increases to $X''_1$ and $X_2$ decreases to $X''_2$.

The extent of the increase or decrease in the X-direction dimensions of portions of sensor unit 100 that are above or below neutral plane 150 may be proportional to (or otherwise positively correlated with) the Z direction distance of such portions from neutral axis 150. For example, second electrode 114, which is spaced apart from neutral axis 150 by a greater amount than first electrode 112 as discussed above, will experience a greater decrease ($|X''_2-X_2|$) in X direction dimension than the increase ($|X''_1-X_1|$) in X direction dimension of first electrode 112. These changes in the X direction dimensions of the first and second electrodes 112, 114 have a resulting impact on the capacitance, C, of sensor 110, since this capacitance is related to the surface areas of first and second electrodes 112, 114. In particular, in the circumstance shown in FIG. 11 where the decrease in the X-direction dimension of second electrode 114 is greater than the increase in the X-direction dimension of first electrode 112, the capacitance, C, of sensor 110 decreases.

In an embodiment where first electrode 112 was located on (or approximately on) neutral plane 150 (as discussed above), the X dimension, $X_1$, of first electrode 112 would not increase or decrease and would instead remain approximately constant. Such a location of first electrode 112 would tend to increase the magnitude of the decrease in the capacitance, C, of sensor 110 during bending of sensor unit 100 in the second direction about the Y axis. In an embodiment where first electrode 112 was located slightly below neutral plane 150 (as discussed above), the X direction dimension, $X_1$, of first electrode 112 would also. Such a location of first electrode 112 would tend to increase the magnitude of the decrease in the capacitance, C, of sensor 110 during bending of sensor unit 100 in the second direction about the Y axis.

Figure 12:
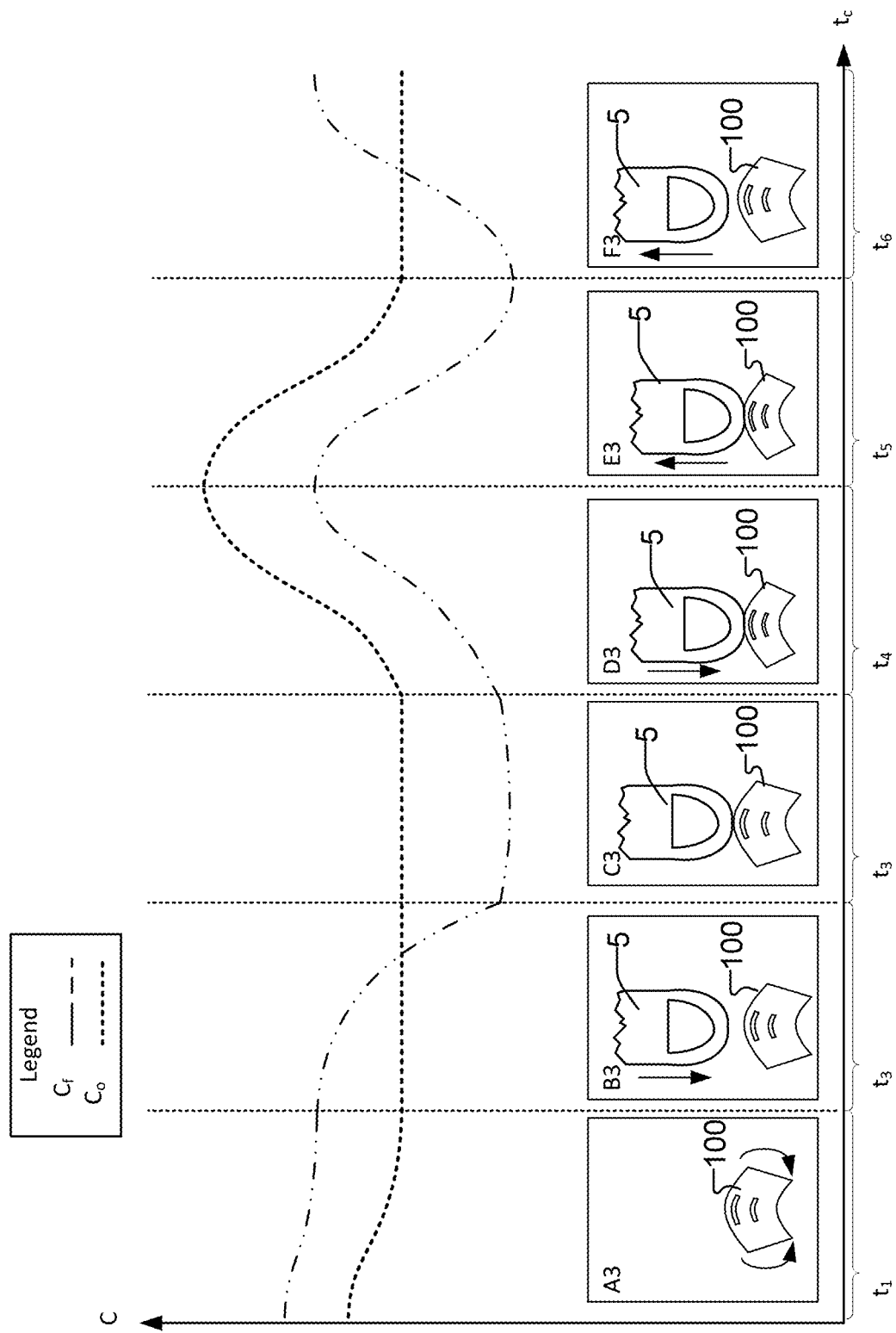

FIG. 12 depicts a graph of capacitance over time for Scenarios A3 through F3, where each scenario represents a particular interaction between pointing element 5 (in the illustrated embodiment, a finger) and sensor unit 100. Bending sensor unit 100 in the second direction about the Y direction axis (as shown in FIG. 10) is represented by Scenario A3 and takes place during time, $t_1$, in FIG. 12. As can be seen from FIG. 12, capacitance, C, (represented by either of $C_o$ or $C_f$, as will be discussed further herein) decreases as bending in the second direction about the Y direction axis increases.

As discussed in the Cluster Sensor Appendix, proximity, touch and pressure applied by a pointing element may have predictable effects on the capacitance of the sensors described in the Cluster Sensor Appendix. By employing one or more of bending sensor units 100 as the fringe and/or overlap sensors of the cluster sensor units described in the Cluster Sensor Appendix (or vice versa), it may be possible to detect proximity, touch or pressure applied by a pointing element 5 (such as a finger) to sensor unit 100, even while sensor unit 100 is undergoing bending. This decrease in capacitance can be attributed to the changes in the X-direction dimensions of the first and second electrodes 112, 114, as discussed above.

As discussed herein, sensor 110 could be fabricated as a fringe sensor and/or an overlap sensor (as described in the Cluster Sensor Appendix), where a fringe sensor is characterized as having a higher (relative to an overlap sensor) ratio of distal flux to proximate flux and an overlap sensor is characterized as having a lower (relative to a fringe sensor) ratio of distal flux to proximate flux. FIGS. 11 and 12 illustrate the change of capacitance of sensor 110 implemented as both fringe and overlap sensors, during Scenarios A2 through F2 and Scenarios A3 through F3 respectively. In particular, FIGS. 11 and 12 depict $C_f$, which represents the capacitance of sensor 110 fabricated as a fringe sensor, and $C_o$, which represents the capacitance of sensor 110 fabricated as an overlap sensor employed as sensor 110.

As discussed above, Scenario A2 represents bending sensor unit 100 in the first direction about the Y direction axis (as shown in FIG. 9) during time, $t_1$. As can be seen from FIG. 11, $C_f$ and $C_o$ increase as sensor unit 100 is bent. Notably, $C_f$ undergoes a smaller increase as compared to $C_o$ since the fringe sensor has less overlap between its first and second electrodes and the change in areas of its first and second electrodes has a correspondingly small effect on its capacitance as compared to the overlap electrode which has relatively more overlap between its first and second electrodes. Conversely, as can be seen from FIG. 12, $C_f$ and $C_o$ decrease as sensor unit 100 is bent in the second direction about the Y direction axis in Scenario A3. Again, $C_f$ undergoes a smaller decrease as compared to $C_o$ since the fringe sensor has less overlap between its first and second electrodes and the change in areas of its first and second electrodes has a correspondingly small effect on its capacitance as compared to the overlap electrode which has relatively more overlap between its first and second electrodes.

As can be seen from FIGS. 11 and 12, during Scenarios B2 to F2 and B3 to F3, $C_f$ and $C_o$ are each affected by the respective interactions with pointing element 5 (e.g. approaching pointing element 5, touch with no pressure, increasing pressure, decreasing pressure and withdrawal of pointing element 5) in the same way as fringe and overlap sensors described in the Cluster Sensor Appendix. For brevity, the effects of pointing element 5 on bent sensor unit 100 as represented by Scenarios B2-F2 and B3-F3 will not be discussed in detail herein as they would be evident to a person skilled in the art based on the disclosure herein in combination with the disclosure of the Cluster Sensor Appendix.

Figure 13:
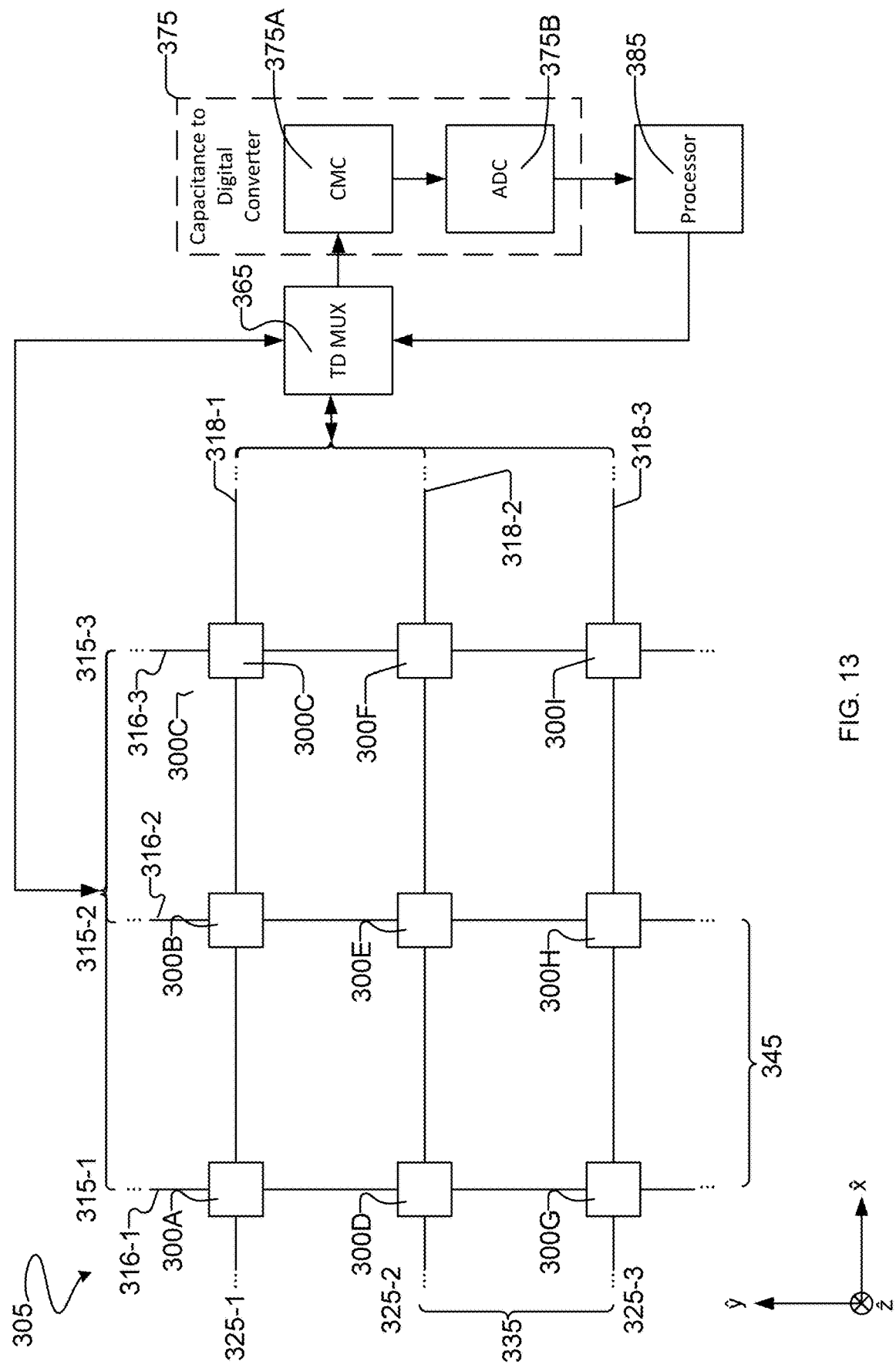
FIG. 13 depicts a schematic plan view of a sensor array according to one embodiment of the invention.

Another aspect of the invention provides a sensor array distributed over a surface for detecting a location or region of bending of the surface. FIG. 13 depicts a sensor unit array 305 according to a particular embodiment comprising a plurality of sensor units 300A to 300I (collectively referred to as sensor units 300) organized in sensor columns 315-1 to 315-3 (collectively referred to as sensor columns 315) and sensor rows 325-1 to 325-3 (collectively referred to as sensor rows 325). In the illustrated embodiment, each one of sensor units 300 is located at an intersection of one of sensor columns 315 and one of sensor rows 325. Each of sensor units 300 may comprise a sensor unit 10, sensor unit 100 or any other sensor unit described herein. For convenience, FIG. 13 only depicts three sensor columns 315 and three sensor rows 325, but it should be understood that sensor unit array 305 may comprise any suitable number of sensor columns 315 and sensor rows 325 for a surface to be sensed.

The FIG. 13 embodiment illustrates a trace array suitable for use where sensor units 300 have the form of sensor units 100 of FIGS. 7 and 8 (i.e. where only a pair of traces is used to address a sensor unit 300). As depicted in the FIG. 13 embodiment, the sensor units 300 of a particular sensor row 325 (or, more particularly in the illustrated embodiment, the lower electrodes 114 of the sensor units 300 of a particular sensor row 325) are connected by a row trace 318. For example, in sensor row 325-1, the lower electrodes 114 of sensor units 300A, 300B, 300C are ionically or electrically connected by row trace 318-1. As depicted in the FIG. 13 embodiment, the sensor units 300 of a particular sensor column 315 (or, more particularly in the illustrated embodiment, the upper electrodes 112 of the sensor units 300 of a particular sensor column 315) are connected by a column trace 316. For example, the upper electrodes 112 of sensor units 300A, 300D, and 300G of sensor column 315-1 are ionically or electrically connected by column trace 316-1.

Additional column traces 316 and row traces 318 may be used where sensor units 300 comprise sensor units 10 of FIGS. 1 and 2, since each sensor unit 10 comprises an upper sensor 20 and a lower sensor 30. Accordingly, to accommodate sensor units 10, the sensor array embodiment of FIG. 13 could be duplicated such that an additional array of column traces 316 and row traces 316 are provided for the additional sensors of sensor units 10.

In the illustrated FIG. 13 embodiment, each sensor unit 300 is spaced apart from adjacent sensor units by a Y direction spacing 335 and/or an X direction spacing 345. For example, sensor unit 300A is spaced apart from sensor unit 300D by a Y direction spacing 335, is spaced apart from sensor unit 300B by an X direction spacing 345 and is spaced apart from sensor unit 300E by an X direction spacing 345 and a Y direction spacing 335. In some embodiments, X direction spacing 345 and Y direction spacing 335 are equal. For example, X direction spacing 345 and Y direction spacing may be between 3 and 8 mm (e.g. 5 mm). In some embodiments, X direction spacing 345 and Y direction spacing 335 are not equal and/or X direction spacing and Y direction spacing 335 are not constant across array 305.

In the illustrated FIG. 13 embodiment, sensor units 300 of sensor unit array 305 are spaced apart by a dielectric material. The dielectric material may comprise any suitable dielectric material as discussed herein. In some embodiments the dielectric material is deformable. For example, the dielectric may comprise a silicone material such as a silicon elastomer matrix or another material discussed herein. In some embodiments, each sensor unit 300 of sensor unit array 305 is surrounded by the dielectric material.

Each column trace 316 is connected to transmit to and/or receive signals from a processor 385. Each individual column trace 316 may be connected directly to processor 385 or may be connected via one or more time-division multiplexers 365. Similarly, each row trace 318 is connected to transmit to and/or receive signals from a processor 385. Each individual row trace 318 may be connected directly to processor 385 or may be connected via one or more time-division multiplexers 365. Column traces 316 and row traces 318 may be connected via the same or different time-division multiplexers 365. As will be appreciated from the discussion herein, suitable signal conditioning circuitry may be interposed between column traces 316 and procession 385 and/or between row traces 318 and processor 385. For clarity and simplicity of the drawing, such circuitry, which will be understood to those skilled in the art, is not shown in FIG. 13.

In the illustrated embodiment, signals from column traces 316 and row traces 318 are directed to capacitance measurement circuit (CMC) 375A prior to being received at processor 385. As will be described in more detail below, CMC 375A may be employed to determine a capacitance value for each of the capacitors in sensor units 300 based on the signals from column traces 316 and row traces 318. CMC 375A may be employed in conjunction with an analog to digital converter (ADC) 375B. ADC 375B and CMC 375A may be integrated in the form of a capacitance to digital converter 375 or ADC 375B may be implemented separately from CMC 375A. In some embodiments, a Delta-Sigma ADC is employed to convert a changing analog voltage signal in traces 316, 318 into a quantized digital signal by sampling the signal at a very high frequency and feeding the sampled data into a comparator. In some embodiments, the output of the Delta-Sigma ADC is then integrated to obtain a digital signal. Where ADC 375B and CMC 375A are combined, a constant voltage input may be employed while the feedback capacitor of the integrator is employed as the sense capacitor. Changes in the feedback capacitor of the integrator may cause the digital output to change while the input voltage is kept constant and/or changes in the input voltage may cause the digital output to change. Processor 385 may be connected and configured to control multiplexer 365 while capacitance to digital converter 375 transmits final data to processor 385, where digital values of the capacitance can be acquired and/or displayed.

In some embodiments, processor 385 is configured to individually sample each sensor unit 300. Individual sampling of sensor units 300 may occur sequentially. Sampling may occur at any desired rate. For example, for near real-time results, sampling may occur at between 2 to 4 times per second. A form of running averaging of the signal may be employed by processor 385 or some other suitable conditioning circuit to reduce effects of noise and drift in signals from sensor units 300.

Processor 385 may be configured to sample an individual sensor unit 300 in various ways. Processor 385 may be configured to sample each sensor unit 300 in series. For example, processor 385 may be configured to apply a voltage across column trace 316-1 and row trace 318-1 while either: allowing the remaining columns traces 316 (i.e. column traces 316-2 to 316-3) and the remaining row traces 318 (i.e. row traces 318-2 and 318-3) to float (i.e. not applying a voltage to the remaining columns and rows or not grounding the remaining columns and rows); or grounding the remaining column traces 316 and the remaining row traces 318. After the voltage is applied across column trace 316-1 and row trace 318-1, the capacitance of sensor unit 300A can be distinguished from the capacitance of any other sensor unit 300 at a particular time. Subsequently, each remaining sensor unit 300 (i.e. sensor units 300B to 300I) may each be sampled in a similar way, as is discussed in more detail in the Cluster Sensor Appendix.

In some embodiments, processor 385 or an external computer may be configured to recognize Scenarios A to F (or A1 to F1, or A2 to F2, or A3 to F3) for each sensor unit 300 of sensor unit array 305. Scenarios A to F may be recognized as described herein by monitoring the capacitance of each sensor that make up sensor units 300. In some embodiments, it is possible to determine the direction and location of the axis or axes about which sensor unit array 305 is being bent. For example, if each of sensor units 300B, 300E, and 300H exhibited changes of capacitance indicative of Scenario A2, it could be determined that sensor unit array 305 is being bent in a first direction about a Y direction axis that is approximately aligned with sensor column 315-2. As another example, if each of sensor units 300A, 300E, and 300I exhibited changes of capacitance indicative of Scenario A3, it could be determined that sensor unit array 305 is being bent in a second direction about an axis that is angled between the X and Y directions (i.e. an axis at 45° to the X and Y directions in the case that spacing 335 is equal to spacing 345).

Figures 14, 15:
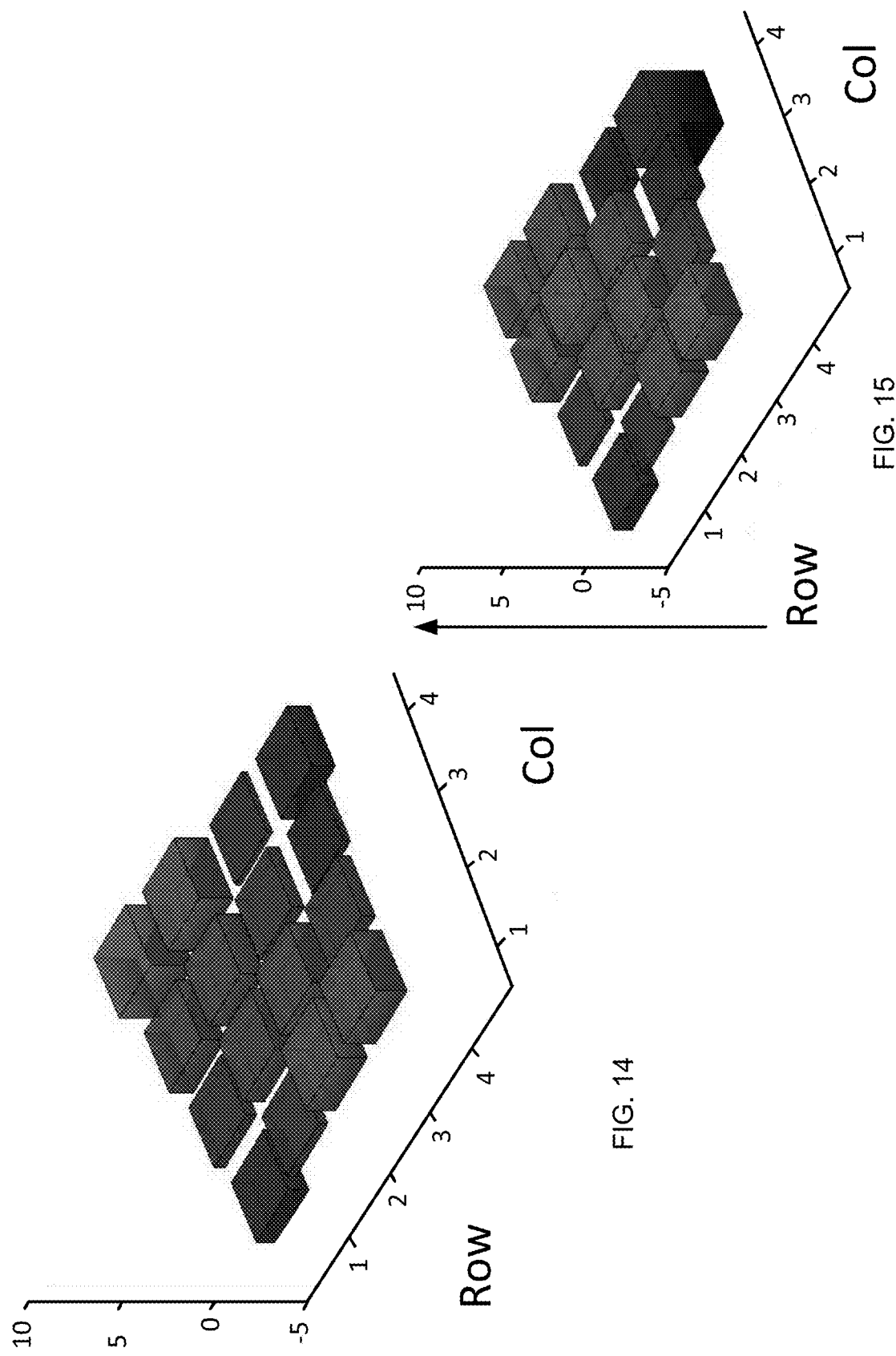
FIGS. 14 and 15 depict maps of change of capacitances of a sensor array according to particular embodiments of the invention.

In some embodiments, each combination of row and column electrodes is scanned and the capacitances of all sensor units 300 are determined to create a two-dimensional map (or array) of capacitances indexed by sensor row and sensor column such as is depicted in FIG. 14. Processor 385 may be configured to monitor such a map (e.g. to monitor the capacitance of each sensor unit 300) for changes in capacitance. In this way, processor 385 can detect the location bending of sensor unit array 305. For example, FIG. 14 may represent a change in capacitance of sensor units 300 indicating bending about an axis angled between the X and Y directions. In some embodiments, lateral position of a pointing element can be detected based on the capacitance changes observed. For example, FIG. 15 may represent a change in capacitance of sensors bending about an axis angled between the X and Y directions together with touch or contact force applied by pointing element 5 on a sensor located at the intersection of row 4 and column 4.

The sensor units and sensor arrays described herein may be fabricated using any suitable method. Exemplary methods applicable for fabricating the sensors and sensor arrays described herein are disclosed in the Cluster Sensor Appendix.

Any of the sensor units disclosed in the main body of this disclosure (which may include one or more capacitors) may be used as any of the fringe sensors and/or overlap sensors described in the Cluster Sensor Appendix (or vice versa) and may be used to sense bending, stretching, pointing element proximity and/or pointing element contact. For example, a bending sensor unit 10 (FIG. 1) or bending sensor unit 100 (FIG. 7) of the main body of this disclosure could be used to provide any one of the fringe sensors and/or overlap sensors described in the Cluster Sensor Appendix. The capacitance of any of the sensor units disclosed in the main body of this disclosure may be sensed using circuits, processors and/or techniques similar to the capacitance measurement circuits, processors and/or techniques disclosed in the Cluster Sensor Appendix. For example, the capacitances of any of any of the sensor units disclosed in the main body of this disclosure could be sensed using measurement circuits, processors and/or techniques similar to the measurement circuits, processors and/or techniques described in FIGS. 3 and 3A and/or at other locations in the Cluster Sensor Appendix.

Cluster Sensor Appendix

One aspect of the invention provides a sensor for detecting and distinguishing between increasing and decreasing proximity of a pointing element, touch by a pointing element, pressure applied by a pointing element, stretching (and/or other deformation) of the sensor, and any of the above while stretching and/or otherwise deforming the sensor. This sensor may comprise a cluster sensor unit having a first sensor and a second sensor wherein the first sensor has a higher ratio of distal flux to proximate flux as compared to the second sensor. With this flux characteristic, the first sensor is relatively more sensitive (as compared to the second sensor) to proximity of a pointing element, while the second sensor is relatively more sensitive (as compared to the first sensor) to force and/or pressure applied by the pointing element.

FIGS. 16A and 16B depict a cluster sensor unit 400 according to a particular embodiment. Cluster sensor unit 400 comprises fringe sensor 410 having a fringe capacitance, $C_{fringe}$, and an overlap sensor 450 having an overlap capacitance, $C_{overlap}$. Fringe sensor 410 comprises first and second fringe electrodes 412, 414 spaced apart from one another in the Z direction. First fringe electrode 412 comprises a first distal fringe surface 412A facing in a positive-Z direction generally away from second fringe electrode 414 and a first proximate fringe surface 412B facing in a negative-Z direction generally toward second fringe electrode 414. Second fringe electrode 414 comprises a second proximate fringe surface 414A facing in a positive-Z direction generally toward first fringe electrode 412 and a second distal fringe surface 414B facing in a negative-Z direction generally away from first fringe electrode 412.

Overlap sensor 450 comprises first and second overlap electrodes 452, 454 spaced apart from one another in the Z direction. First overlap electrode 452 comprises a first distal overlap surface 452A facing in the positive-Z direction generally away from second overlap electrode 454 and a first proximate overlap surface 452B facing generally in the negative-Z direction toward second overlap electrode 454. Second overlap electrode 454 comprises a second proximate overlap surface 454A facing in a positive-Z direction generally toward first overlap electrode 452 and a second distal overlap surface 454B facing in a negative-Z direction generally away from first overlap electrode 452.

Clusters sensor unit 400 has an X direction dimension 470 and a Y direction dimension 480. In some embodiments, cluster sensor unit 400 is smaller than the tip of a pointing element (e.g. a finger). In particular embodiments, X direction dimension 470 may be in the range of 3 to 6 mm while Y direction dimension 480 may be in the range of 1 to 3 mm. In an exemplary embodiment, X direction dimension 470 is 5 mm and Y direction dimension is 2 mm. Notably, as the size of fringe sensor 410 increases, the Z direction range of sensitivity to proximity of a pointing element may increase. However, as the size of cluster sensor unit 100 as a whole increases, cluster sensor unit 400 may be less effective for accurate small scale sensing. Accordingly, the relative size of fringe sensor 410, overlap sensor 450 and cluster sensor unit 400 may be adjusted to achieve a desired sensitivity resolution and sensing range for specific applications.

First and second fringe electrodes 412, 414 may be of any suitable dimensions in the Z direction. For example, in some embodiments, first and second fringe electrodes 412, 414 are between 200 µm and 600 µm in the Z direction. Similarly, first and second overlap electrodes 452, 454 may be of any suitable dimensions in the Z direction. For example, in some embodiments, first and second fringe electrodes 452, 454 are between 200 µm and 600 µm in the Z direction.

Fringe sensor 410 and overlap sensor 450 are spaced apart by an X direction center-to-center spacing 475. X direction spacing 475 may be any suitable spacing. In some embodiments, X direction spacing 475 is chosen based on the size of the pointing element used in a particular application. In particular applications, such as where a fingertip is used as a pointing element, X direction spacing may be between 0.5 and 2 mm (e.g. 1 mm), for example.

First fringe electrode 412 may be spaced apart from second fringe electrode 414 in the Z direction by a dielectric 413. Dielectric 413 may contact both of proximate fringe surface 412B and proximate fringe surface 414A and may occupy the volume therebetween. Dielectric 413 may comprise any suitable dielectric material. For example, dielectric material may comprise a silicone material (examples include PDMS, Ecoflex™, Dragon Skin™, etc.), any suitable form of rubbery material with optical properties considered to be desirable for a particular application (e.g. in case of a touch screen, it may be desirable for dielectric 413 to be transparent) and mechanical properties considered to be desirable for a particular application (e.g. low elastic modulus or stretchable materials may be desirable for wearable applications). In some embodiments, dielectric 413 surrounds first and second fringe electrodes 412, 414, as will be discussed further herein.

Similarly, first overlap electrode 452 may be spaced apart from second overlap electrode 454 by a dielectric 453. Dielectric 453 may contact both of proximate overlap surface 452B and proximate overlap surface 454A and may occupy the volume therebetween. In some embodiments, dielectric 453 surrounds first and second overlap electrodes 452, 454, as will be discussed further herein. Dielectric 453 may comprise the same material as dielectric 413 and, for a given cluster sensor unit 400, dielectric 453 and dielectric 413 may be fabricated from a contiguous layer or layers of dielectric material. This is not necessary, dielectric material 453 could be distinct from dielectric material 413.

In some embodiments, first and second fringe electrodes 412, 414 and first and second overlap electrodes 452, 454 are made of a deformable and transparent material, such as an ionically conductive gel. One particular non-limiting example of a deformable and transparent ionically conductive gel from which electrodes 412, 414, 452, 454 could be fabricated is polyacrylamide. Accordingly, cluster sensor 400 may be deformable (e.g. stretchable, bendable and/or the like) and/or may be optically transparent. In other embodiments, first and second fringe electrodes 412, 414 and first and second overlap electrodes 452, 454 may be fabricated from metal mesh, silver nanowires, carbon nanotubes, conducting polymers (e.g. PEDOT:PSS), other ionically conducting hydrogels and/or the like.

A circuit (e.g. represented by conductive traces 416 and 418 respectively connected to first fringe and overlap electrodes 412, 452 and second fringe and overlap electrodes 414, 454 in FIG. 16A) may be connected to apply a fringe voltage between first and second fringe electrodes 412, 414 to thereby cause a fringe electric field, $\vec{E}_{fringe}$, in a vicinity of fringe sensor 410 and connected to apply an overlap voltage between first and second overlap electrodes 452, 454 to thereby cause an overlap electric field, $\vec{E}_{overlap}$, in a vicinity of overlap sensor 450.

In some embodiment, traces 416 of first fringe electrode 412 are made of the same conductive (e.g. electrically conductive or ionically conductive) material as first fringe electrode 412 and first fringe electrode 412 and its respective traces 416 may be molded as one single contiguous unit as discussed further herein. In other embodiments, traces 416 are made of a different conductive (e.g. electrically conductive or ionically conductive) material than first fringe electrode 412. Traces 416 of first overlap electrode, traces 418 of second fringe electrode and traces 418 of second overlap electrode may be made of the same material and/or in the same ways as discussed in relation to traces 416 of first fringe electrode 412 or may be made of different materials and/or be or in different ways as discussed in relation to traces 416 of first fringe electrode. Although traces 416, 418 are depicted in FIG. 16A as having smaller X-dimension widths and smaller Y-dimension widths than first fringe and overlap electrodes 412, 452 and second fringe and overlap electrodes 414, 454 respectively, this is not necessary. For example, traces 416, 418 could have the same X-dimension widths and Y-dimension widths as first fringe and overlap electrodes 412, 452 and second fringe and overlap electrodes 414, 454 respectively (similar to first and second electrodes 1052, 1054 and traces 1056, 1058 of sensor 1050 depicted in FIG. 28A), or traces 416, 418 could have the greater X-dimension widths and Y-dimension widths than first fringe and overlap electrodes 412, 452 and second fringe and overlap electrodes 414, 454 respectively.

First and second fringe electrodes 412, 414 may be shaped (including sized) and/or located (relative to one another) to cause fringe electric field, $\vec{E}_{fringe}$, to have a distal fringe flux, $\Phi_{distal,fringe}$ and a proximate fringe flux, $\Phi_{prox,fringe}$, where the distal fringe flux, $\Phi_{distal,fringe}$ and the proximate fringe flux, $\Phi_{prox,fringe}$ are terms used in this application for brevity and convenience of explanation to describe characteristics of the electric field $\vec{E}_{fringe}$ of fringe sensor 410 and are defined in more detail below.

The electric field $\vec{E}_{fringe}$ associated with any fringe voltage applied between first and second fringe electrodes 412, 414 comprises a flux characteristic referred to herein as the distal fringe flux, $\Phi_{distal,fringe}$ which comprises the flux of the fringe electric field $\vec{E}_{fringe}$ into (or out of depending on polarity) first distal fringe surface 412A and/or into (or out of) a notional plane spaced infinitesimally apart from first distal fringe surface 412A in a direction away from second fringe electrode 414 (e.g. spaced infinitesimally apart from first distal fringe surface 412A in a positive Z direction). The electric field $\vec{E}_{fringe}$ associated with any fringe voltage applied between first and second fringe electrodes 412, 414 also comprises a flux characteristic referred to herein as the proximate fringe flux, $\Phi_{prox,fringe}$ which comprises the flux of the fringe electric field $\vec{E}_{fringe}$ into (or out of depending on polarity) first proximate fringe surface 412B and/or a notional plane spaced infinitesimally apart from first proximate fringe surface 412B in a direction toward second fringe electrode 414 (e.g. spaced infinitesimally apart from first proximate fringe surface 412B in a negative Z direction).

Similarly, first and second overlap electrodes 452, 454 may be shaped (including sized) and/or located (relative to one another) to cause overlap electric field, $\vec{E}_{overlap}$, to have a distal overlap flux, $\Phi_{distal,overlap}$ and a proximate overlap flux, $\Phi_{prox,overlap}$, where the distal overlap flux, $\Phi_{distal,overlap}$ and the proximate overlap flux, $\Phi_{prox,overlap}$ are terms used in this application for brevity and convenience of explanation to describe characteristics of the electric field of overlap sensor 450 and are defined in more detail below.

The electric field $\vec{E}_{overlap}$ associated with any overlap voltage applied between first and second overlap electrodes 452, 454 comprises a flux characteristic referred to herein as the distal overlap flux, $\Phi_{distal,overlap}$ which comprises the flux of the overlap electric field $\vec{E}_{overlap}$ into (or out of depending on polarity) first distal overlap surface 452A and/or into (or out of) a notional plane spaced infinitesimally apart from first distal overlap surface 452A in a direction away from second overlap electrode 454 (e.g. spaced infinitesimally apart from first distal overlap surface 452A in a positive Z direction). The electric field $\vec{E}_{overlap}$ associated with any overlap voltage applied between first and second overlap electrodes 452, 454 also comprises a flux characteristic referred to herein as the proximate overlap flux, $\Phi_{prox,overlap}$ which comprises the flux of the overlap electric field $\vec{E}_{overlap}$ into (or out of depending on polarity) first proximate overlap surface 452B and/or a notional plane spaced infinitesimally apart from first proximate overlap surface 452B in a direction toward second overlap electrode 454 (e.g. spaced infinitesimally apart from first proximate overlap surface 452B in a negative Z direction).

To describe the shape of overlap sensor electric field, $\vec{E}_{fringe}$, the distal overlap flux, $\Phi_{distal,fringe}$, can be compared to the proximate overlap flux, $\Phi_{prox,fringe}$ to achieve a fringe sensor flux ratio ("FSFR"). The fringe sensor flux ratio may be defined by:

$$FSFR = \frac{\Phi_{distal,fringe}}{\Phi_{prox,fringe}}$$

The FSFR may be altered by changing the shapes (including the sizes) and/or the relative locations of first and second fringe electrodes 412, 414. For example, the FSFR can be increased by increasing the amount of perimeter edge on first fringe electrode 412 (e.g. by increasing the number of sides of the XY-plane cross-sectional shape of first fringe electrode 412 and/or by including one or more cut-outs in the XY-plane cross-sectional shape of first fringe electrode 412) to increase the $\Phi_{distal,fringe}$. Conversely, the FSFR can be decreased by decreasing the amount of perimeter edge on first fringe electrode 412 to decrease the $\Phi_{distal,fringe}$. The FSFR can also be decreased by increasing the Z direction thickness of first fringe electrode 412 which has the effect of increasing the $\Phi_{prox,fringe}$. The FSFR can also be increased by decreasing the Z direction thickness of first fringe electrode 412 which has the effect of decreasing the $\Phi_{prox,fringe}$.

The FSFR may be altered by changing the relative locations of first and second fringe electrodes 412, 414. For example, the FSFR can be increased by decreasing the overlap in the Z direction of first fringe electrode 412 with second fringe electrode 414. In this description and any accompanying claims and/or aspects, two objects or portions of objects may be said to be overlapping in a particular direction or to overlap one another in a particular direction, when a line oriented in the particular direction (at least locally) could be drawn to intersect the two objects or portions of objects. In this context, overlapping in the Z direction means that a straight line can extend in the Z direction and intersect both the overlapping portions of the first and second fringe electrodes 412, 414. By decreasing the overlap of first and second fringe electrodes 412, 414, the $\Phi_{prox,fringe}$ is reduced.

Similarly, to describe the shape of overlap sensor electric field, $\vec{E}_{overlap}$, the distal overlap flux, $\Phi_{distal,overlap}$, can be compared to the proximate overlap flux, $\Phi_{distal,overlap}$ to achieve an overlap sensor flux ratio ("OSFR"). The overlap sensor flux ratio may be defined by:

$$OSFR = \frac{\Phi_{distal,overlap}}{\Phi_{prox,overlap}}$$

The OSFR may be altered by changing the shape (including size) and/or relative locations of the first and second overlap electrodes 452, 454 in a similar manner as described above in relation to fringe sensor 410 and its FSFR. For example, the OSFR can be decreased by increasing the amount of overlap between first overlap electrode 452 to increase the $\Phi_{distal,overlap}$. Conversely, the OSFR can be decreased by decreasing the amount of perimeter edge on first overlap electrode 452 to decrease the $\Phi_{distal,overlap}$. The OSFR can also be decreased by increasing the Z direction thickness of first overlap electrode 452 which has the effect of increasing the $\Phi_{prox,overlap}$.

In the FIGS. 16A and 16B embodiment, the FSFR of fringe sensor 410 is greater than the OSFR of overlap sensor 450. As will be explained in more detail below, this characteristic of the electric fields $\vec{E}_{fringe}$ and $\vec{E}_{overlap}$ of fringe sensor 410 and overlap sensor 450 results in the fringe capacitance, $C_{fringe}$, being relatively more sensitive to proximity of a pointing element near cluster sensor 400 than the overlap capacitance, $C_{overlap}$, and the overlap capacitance, $C_{overlap}$, being relatively more sensitive to contact force applied to cluster sensor 400 by a pointing element than is the fringe capacitance, $C_{fringe}$.

In some embodiments, cluster sensor 400 is connected to a capacitance-measurement circuit that generates a fringe-sensor signal representative of the fringe capacitance, $C_{fringe}$, and an overlap sensor signal representative of the overlap capacitance, $C_{overlap}$. The capacitance measurement circuit ("CMC") may optionally contain or be connected to an analog to digital converter. A processor may be connected to receive the fringe sensor signal and the overlap sensor signal to determine estimated values for $C_{fringe}$ and $C_{overlap}$.

Figure 17:
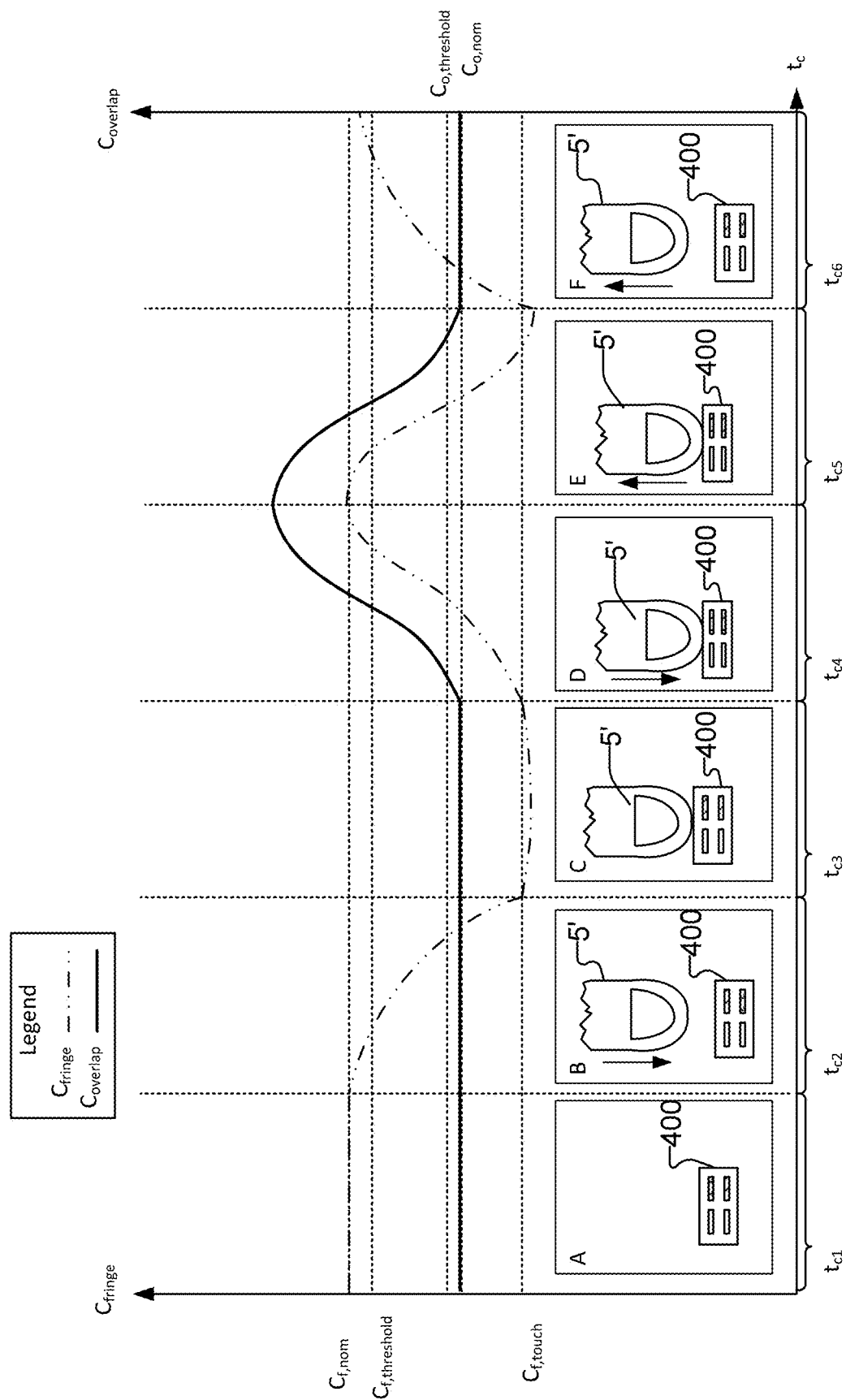
FIGS. 17 and 17A depict graphs of capacitance over time for a sensor in various Scenarios according to one embodiment of the invention.

FIG. 17 depicts a series of Scenarios, A through F, of a pointing element 5' (in the illustrated embodiment a finger) interacting with cluster sensor unit 400 and a graph showing both of $C_{fringe}$ (represented by the broken line) and $C_{overlap}$ (represented by the solid line) of cluster sensor unit 400 during each of Scenarios A through F.

Scenario A represents when pointing element 5' is not proximate to cluster sensor unit 400 and is not applying contact force to cluster sensor 400. Scenario A is represented as time period $t_{c1}$ on the FIG. 17 graph which plots estimated values of both of $C_{fringe}$ and $C_{overlap}$ as functions of time. As can be seen from the FIG. 17 graph, in Scenario A, the estimated value of $C_{fringe}$ is within a threshold range around the nominal fringe capacitance, $C_{f,nom}$ (i.e. does not fall below $C_{f,threshold}$). $C_{f,threshold}$ may be any suitable threshold. For example, in some embodiments, $C_{f,threshold}$ may be 3%, 2% or 1% lower than $C_{f,nom}$. Similarly, the estimated value of $C_{overlap}$ is within a threshold range around the nominal overlap capacitance $C_{o,nom}$ (i.e. does not exceed $C_{o,threshold}$). $C_{o,threshold}$ may be any suitable threshold. For example, in some embodiments, $C_{o,threshold}$ may be 3%, 2% or 1% lower than $C_{o,nom}$. Accordingly, a processor could be configured to generate and/or output one or more signals indicating that pointing element 5' is not proximate to cluster sensor 400 (e.g. Scenario A) based on $C_{fringe}$ and $C_{overlap}$ not varying below $C_{f,threshold}$ and above $C_{o,threshold}$ respectively.

Scenario B represents when pointing element 5' is approaching (e.g. is proximate to) cluster sensor unit 400, but is not applying contact force to cluster sensor 400. Scenario B is represented as time period $t_{c2}$ on the FIG. 17 graph. As can be seen from the FIG. 17 graph, the estimated value of $C_{fringe}$ decreases outside of a threshold range around the nominal fringe capacitance, $C_{f,nom}$ (i.e. $C_{fringe}$ decreases below $C_{f,threshold}$) as pointing element 5' approaches. Notably, as pointing element 5' approaches closer to cluster sensor 400, $C_{fringe}$ may tend to decrease at an increasing rate. In contrast, the estimated value of $C_{overlap}$ remains within a threshold range around the nominal overlap capacitance $C_{o,nom}$ (i.e. $C_{overlap}$ does not increase above $C_{o,threshold}$). This difference between the reactions of the capacitances, $C_{fringe}$ and $C_{overlap}$ to the Scenario B circumstance may be attributable to the fact that the FSFR is greater than the OSFR. More specifically, fringe sensor 410 has a greater proportion of distal flux ($\Phi_{distal,fringe}$) than the distal flux ($\Phi_{distal,overlap}$) of overlap sensor 450. As pointing element 5' approaches cluster sensor unit 400, some of this distal flux terminates (or starts depending on polarity) in pointing element 5', rather than the respective second electrodes 414, 454. Since fringe sensor 410 has a greater proportion of distal flux ($\Phi_{distal,fringe}$) than the distal flux ($\Phi_{distal,overlap}$) of overlap sensor 450, the fringe capacitance $C_{fringe}$ is relatively more sensitive to the proximity of pointing element 5' than the capacitance $C_{overlap}$ of overlap sensor 450 and the fringe capacitance $C_{fringe}$ of fringe sensor 410 decreases more dramatically as shown in Scenario B of FIG. 17. Accordingly, a processor could be configured to generate and/or output one or more signals indicating that pointing element 5' is approaching (e.g. is proximate to) cluster sensor 400 (e.g. Scenario B) based on $C_{fringe}$ decreasing below $C_{f,threshold}$ and $C_{overlap}$ remaining below $C_{o,threshold}$.

Scenario C represents when pointing element 5' is in contact with cluster sensor unit 400, but is not applying contact force to cluster sensor unit 400. Scenario C is represented as time period $t_{c3}$ on the FIG. 17 graph. As can be seen from the FIG. 17 graph, the estimated value of $C_{fringe}$ decreases by more than a touch or contact threshold amount $C_{f,touch}$ from the nominal fringe capacitance, $C_{f,nom}$ (i.e. $C_{fringe}$ decreases below $C_{f,touch}$). In contrast, the estimated value of $C_{overlap}$ remains within a threshold range around the nominal overlap capacitance $C_{o,nom}$ (i.e. $C_{overlap}$ does not increase above $C_{o,threshold}$). As with Scenario B described above, this relative difference between the reactions of the capacitances, $C_{fringe}$ and $C_{overlap}$ to the Scenario C circumstance may be attributable to the fact that the FSFR is greater than the OSFR. The difference between the reaction of the capacitance $C_{fringe}$ to Scenario B and Scenario C may be a difference of degree and may involve configurable thresholds $C_{f,threshold}$ and $C_{f,touch}$. Accordingly, a processor could be configured to generate and/or output one or more signals indicating that pointing element 5' is touching, but not applying force to cluster sensor 400 (e.g. Scenario C) based on $C_{fringe}$ decreasing below $C_{f,touch}$ and $C_{overlap}$ not varying above $C_{o,threshold}$. A processor could additionally or alternatively be configured to generate and/or output one or more signals indicating that pointing element 5' is touching but not applying force to cluster sensor 400 (e.g. Scenario C) based only on $C_{fringe}$ decreasing past $C_{f,touch}$). Unlike other deformable capacitive sensor implementations, in this approach no force is required to be applied to cluster sensor 400 to obtain the change in signal.

Scenario D represents when pointing element 5' is in contact with cluster sensor unit 400 and is applying increasing contact force to cluster sensor unit 400. Scenario D is represented as time period $t_{c4}$ on the FIG. 17 graph. As can be seen from the FIG. 17 graph, the estimated value of $C_{fringe}$ increases from $C_{f,touch}$. Also, the estimated value of $C_{overlap}$ increases above a threshold range around the nominal overlap capacitance $C_{o,nom}$ (i.e. $C_{overlap}$ increases above $C_{o,threshold}$). The fact that both capacitances $C_{fringe}$ and $C_{overlap}$ increase may be attributable to the fact that their respective electrodes 412, 414 and 452, 454 are deformed by the application of force to be closer to one another. In some embodiments, the relative increase in $C_{overlap}$ may be greater than the relative increase in $C_{fringe}$. This may be attributable to the fact that the OSFR is less than the FSFR. More specifically, overlap sensor 450 has a greater relative proportion of proximate flux ($\Phi_{proximate,overlap}$) than the proximate flux ($\Phi_{proximate,fringe}$) of fringe sensor 410. As pointing element 5' applies force to cluster sensor unit 400 and electrodes 412, 414 and 452, 454 get closer to one another, the capacitance due to this proximate flux may increase. Since overlap sensor 450 has a greater proportion of proximate flux ($\Phi_{proximate,overlap}$) than the proximate flux ($\Phi_{proximate,fringe}$) of fringe sensor 410, the overlap capacitance $C_{overlap}$ may be relatively more sensitive to the deformation caused by the force applied by pointing element 5' than the capacitance $C_{fringe}$ of fringe sensor 410 and the overlap capacitance $C_{overlap}$ of overlap sensor 450 may therefore increase more dramatically than the fringe capacitance $C_{fringe}$. Accordingly, a processor could be configured to generate and/or output one or more signals indicating that pointing element 5' is in contact with cluster sensor 400 and is applying contact force to cluster sensor 400 (e.g. Scenario D) based on $C_{fringe}$ increasing above $C_{f,touch}$ and $C_{overlap}$ increasing above $C_{o,threshold}$. A processor could additionally or alternatively be configured to generate and/or output one or more signals indicating that pointing element 5' is in contact with cluster sensor 400 and is applying contact force to cluster sensor 400 (e.g. Scenario D) based only on $C_{overlap}$ increasing above $C_{o,threshold}$. As can be seen from FIG. 17, the amount of pressure applied to cluster sensor 400 may be determined by measuring the amount of change of $C_{overlap}$ and/or $C_{fringe}$.

Scenario E represents when pointing element 5' is in contact with cluster sensor unit 400 and is reducing the contact force being applied to cluster sensor unit 400. Scenario E is represented as time period $t_{c5}$ on the FIG. 17 graph. At the conclusion of Scenario E, (i.e. at the conclusion of $t_{c5}$), the Scenario is substantially similar to that of Scenario C—i.e. there is contact of pointing element 5' to cluster sensor unit 400, but no force is applied by pointing element 5' on cluster sensor unit 400. As can be seen from the FIG. 17 graph, the estimated value of $C_{fringe}$ decreases in Scenario E back toward $C_{f,touch}$. Also, the estimated value of $C_{overlap}$ decreases back toward a threshold range around the nominal overlap capacitance $C_{o,nom}$ (i.e. decreases back toward $C_{o,threshold}$). Accordingly, a processor could be configured to generate and/or output one or more signals indicating that pointing element 5' is in contact with cluster sensor 400 and is decreasing the contact force on cluster sensor 400 (e.g. Scenario E) based on $C_{fringe}$ and $C_{overlap}$ both decreasing. The circumstance at the end of Scenario E (contact with zero force) is reached when $C_{fringe}$ decreases below $C_{f,touch}$ and $C_{overlap}$ decreases below $C_{o,threshold}$ and/or returns to a vicinity of $C_{o,nom}$. A processor could additionally or alternatively be configured to generate and/or output one or more signals indicating that pointing element 5' is in contact with cluster sensor 400 and has decreased the contact force on cluster sensor 400 to zero (e.g. at the end of Scenario E) based only on $C_{overlap}$ decreasing below $C_{o,threshold}$ and returning to $C_{o,nom}$. It is also possible that not all contact force is released from cluster sensor 400. In that case, $C_{fringe}$ will decrease but may not return below $C_{f,touch}$ and $C_{overlap}$ will decrease but may not return below $C_{o,threshold}$.

Scenario F represents when pointing element 5' is moving away from, but is still proximate to, cluster sensor unit 400 and is not applying contact force to cluster sensor unit 400. Scenario F is represented as time period $t_{c6}$ on the FIG. 17 graph. As can be seen from the FIG. 17 graph, the estimated value of $C_{fringe}$ increases toward a threshold range around the nominal fringe capacitance, $C_{f,nom}$ (i.e. increases toward $C_{f,threshold}$) as pointing element 5' moves away from cluster sensor unit 400. In contrast, the estimated value of $C_{overlap}$ remains within a threshold range around the nominal overlap capacitance $C_{o,nom}$ (i.e. does not increase above $C_{o,threshold}$). This difference between the reactions of the capacitances, $C_{fringe}$ and $C_{overlap}$ to the Scenario F circumstance is similar to the Scenario B circumstance described above and may be attributable to the fact that the FSFR is greater than the OSFR. More specifically, fringe sensor 410 has a greater relative proportion of distal flux ($\Phi_{distal,fringe}$) than the distal flux ($\Phi_{distal,overlap}$) of overlap sensor 450. As pointing element 5' moves away from cluster sensor unit 400, some distal flux which did terminate (or start depending on polarity) in pointing element 5', starts to terminate (or start) in the respective second electrodes 414, 454. Since fringe sensor 410 has a greater proportion of distal flux ($\Phi_{distal,fringe}$) than the distal flux ($\Phi_{distal,overlap}$) of overlap sensor 450, the fringe capacitance $C_{fringe}$ is relatively more sensitive to the proximity of pointing element 5' than the capacitance $C_{overlap}$ of overlap sensor 450 and the fringe capacitance $C_{fringe}$ of fringe sensor 410 increases more dramatically as shown in Scenario F of FIG. 17. Accordingly, a processor could be configured to generate and/or output one or more signals indicating that pointing element 5' is moving away from, but is still proximate to, cluster sensor 400 (e.g. Scenario F) based on $C_{fringe}$ increasing toward $C_{f,threshold}$ and $C_{overlap}$ remaining below $C_{o,threshold}$. Once $C_{fringe}$ increases above $C_{f,threshold}$ pointing element 5' will no longer be within proximity of cluster sensor unit 400, as in Scenario A.

Figure 17A:
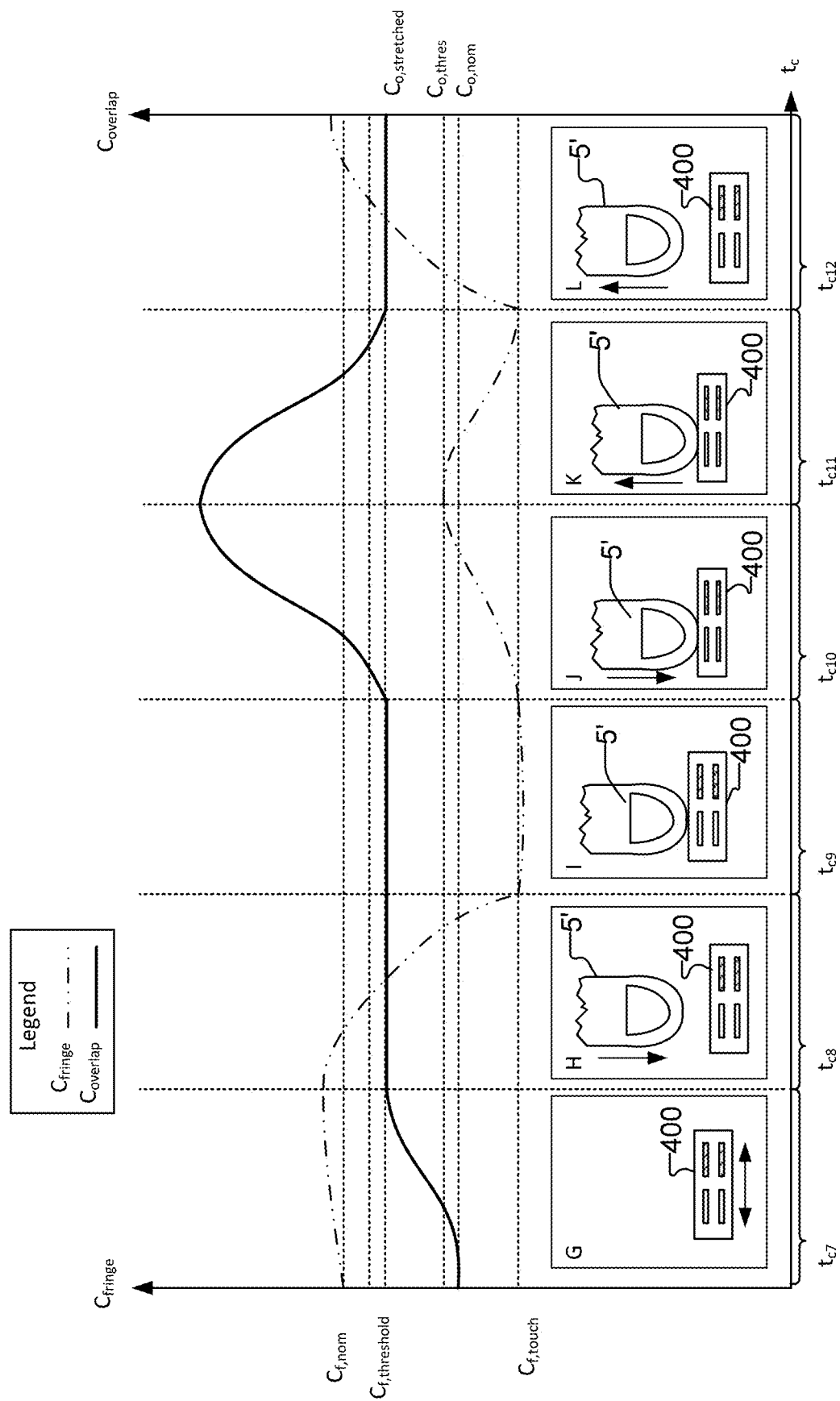

FIG. 17A depicts a series of Scenarios, G through L, of cluster sensor unit 400 being stretched in the X direction and/or Y direction while a pointing element 5' interacts with the stretched cluster sensor 400 and a graph showing both of $C_{fringe}$ and $C_{overlap}$ of cluster sensor unit 400 during each of Scenarios G through L.

Scenario G represents when cluster sensor unit 400 is being stretched in the X direction and/or Y direction without a pointing element 5' in the proximity of cluster sensor unit 400. Scenario G is represented as time period $t_{c7}$ on the FIG. 17A graph. As can be seen from the FIG. 17A graph, the estimated value of $C_{fringe}$ slightly increases from $C_{f,nom}$ (in some embodiments, this $C_{fringe}$ increase may be negligible). In contrast, the estimated value of $C_{overlap}$ increases above a threshold range around the nominal overlap capacitance $C_{o,nom}$ (i.e. increases above $C_{o,threshold}$) to a value $C_{o,stretched}$. This difference between the reactions of the capacitances, $C_{fringe}$ and $C_{overlap}$ to the Scenario G circumstance may be attributable to the fact that the FSFR is greater than the OSFR. More specifically, overlap sensor 450 has a greater proportion of proximate flux ($\Phi_{proximate,overlap}$) than the proximate flux ($\Phi_{proximate,fringe}$) of fringe sensor 410 due to the shape and/or relative locations of their respective electrodes. When the individual sensors are stretched, the increase in Z-direction overlapping surface area and corresponding increases in $\Phi_{proximate,overlap}$ and $C_{overlap}$ are greater for overlap sensor 450, than the increase in Z-direction overlapping surface area and corresponding increases in $\Phi_{proximate,fringe}$ and $C_{fringe}$ for fringe sensor 410. Accordingly, a processor could be configured to generate and/or output one or more signals indicating cluster sensor unit 400 is being stretched in the X direction and/or Y direction without a pointing element 5' in the proximity of cluster sensor unit 400 (e.g. Scenario G) based on $C_{fringe}$ increasing slightly above $C_{nom}$ and $C_{overlap}$ increasing above $C_{o,threshold}$ (e.g. to a vicinity of $C_{o,stretched}$). As cluster sensor unit 400 is stretched, the nominal capacitances, threshold capacitance, touch capacitance etc. of each of fringe sensor 410 and overlap sensor 450 may be changed (e.g. by a suitably configured processor) to reflect the stretched cluster sensor unit 400. As will be discussed below, in some embodiments, Scenario J may be difficult to distinguish from Scenario G if only the relative changes of $C_{fringe}$ and $C_{overlap}$ are considered (as compared to the absolute changes which require tracking prior and/or subsequent time periods, or the capacitances of neighbouring sensors in the case of an array of cluster sensors 400).

Scenario H represents when pointing element 5' is approaching (e.g. is proximate to) stretched cluster sensor unit 400, but is not touching or applying contact force to stretched cluster sensor unit 400. Scenario H is represented as time period $t_{c8}$ on the FIG. 17A graph. As can be seen from the FIG. 17A graph, the estimated value of $C_{fringe}$ decreases outside of a threshold range around the nominal fringe capacitance, $C_{f,nom}$ (i.e. decreased below $C_{f,threshold}$). In contrast, the estimated value of $C_{overlap}$ remains relatively constant at or near $C_{o,stretched}$. This difference between the reactions of the capacitances, $C_{fringe}$ and $C_{overlap}$ to the Scenario H circumstance may be similar to the Scenario B circumstance described above (except for the fact that the capacitances of the stretched cluster sensor unit 400) may be starting from different levels due to the stretching) and may be attributable to the fact that the FSFR is greater than the OSFR. Accordingly, a processor could be configured to generate and/or output one or more signals indicating that pointing element 5' is approaching (e.g. is proximate to) a stretched cluster sensor 400 (e.g. Scenario H) based on $C_{fringe}$ decreasing below $C_{f,threshold}$ and $C_{overlap}$ remaining at or near $C_{o,stretched}$.

Scenario I represents when pointing element 5' is in contact with stretched cluster sensor unit 400, but is not applying contact force to stretched cluster sensor unit 400. Scenario I is represented as time period $t_{c9}$ on the FIG. 17A graph. As can be seen from the FIG. 17A graph, the estimated value of $C_{fringe}$ decreases by more than a contact threshold amount from the nominal fringe capacitance, $C_{f,nom}$ (i.e. $C_{fringe}$ decreases below $C_{f,touch}$). In contrast, the estimated value of $C_{overlap}$ remains at or near $C_{o,stretched}$. This difference between the reactions of the capacitances, $C_{fringe}$ and $C_{overlap}$ to the Scenario I circumstance may be similar to the Scenario C circumstance described above (except for the fact that the capacitances of the stretched cluster sensor unit 400) may be starting from different levels due to the stretching) and may be attributable to the fact that the FSFR is greater than the OSFR. The difference between the reaction of the capacitance $C_{fringe}$ to Scenario H and Scenario I may be a difference of degree and may involve configurable thresholds $C_{f,threshold}$ and $C_{f,touch}$. Accordingly, a processor could be configured to generate and/or output one or more signals indicating that pointing element 5' is touching, but not applying force to, stretched cluster sensor unit 400 (e.g. Scenario I) based on $C_{fringe}$ decreasing below $C_{f,touch}$ and $C_{overlap}$ remaining at or near $C_{f,stretched}$. A processor could additionally or alternatively be configured to generate and/or output one or more signals indicating that pointing element 5' is touching but not applying force to stretched cluster sensor 400 (e.g. Scenario I) based only on $C_{fringe}$ decreasing below $C_{f,touch}$).

Scenario J represents when pointing element 5' is in contact with stretched cluster sensor unit 400 and is applying contact force to stretched cluster sensor unit 400. Scenario J is represented as time period $t_{c10}$ on the FIG. 17A graph. As can be seen from the FIG. 17A graph, the estimated value of $C_{fringe}$ increases from $C_{f,touch}$. Also, the estimated value of $C_{overlap}$ increases from $C_{o,stretched}$. The fact that both capacitances $C_{fringe}$ and $C_{overlap}$ increase may be attributable to the fact that their respective electrodes 412, 414 and 452, 454 are deformed by the application of force to be closer to one another. In some embodiments, the relative increase in $C_{overlap}$ may be greater than the relative increase in $C_{fringe}$. This may be attributable to the fact that the OSFR is less than the FSFR. More specifically, overlap sensor 450 has a greater relative proportion of proximate flux ($\Phi_{proximate,overlap}$) than the proximate flux ($\Phi_{proximate,fringe}$) of fringe sensor 410. As pointing element 5' applies force to cluster sensor unit 400 and electrodes 412, 414 and 452, 454 get closer to one another, the capacitance due to this proximate flux may increase. Since overlap sensor 450 has a greater proportion of proximate flux ($\Phi_{proximate,overlap}$) than the proximate flux ($\Phi_{proximate,fringe}$) of fringe sensor 410, the overlap capacitance $C_{overlap}$ may be relatively more sensitive to the deformation caused by the force applied by pointing element 5' than the capacitance $C_{fringe}$ of fringe sensor 410 and the overlap capacitance $C_{overlap}$ of overlap sensor 450 may increase more dramatically. Accordingly, a processor could be configured to generate and/or output one or more signals indicating that pointing element 5' is in contact with stretched cluster sensor 400 and is applying contact force to stretched cluster sensor 400 (e.g. Scenario J) based on $C_{fringe}$ increasing above $C_{f,touch}$ and $C_{overlap}$ increases (e.g. by a suitable threshold amount) from $C_{o,stretched}$. A processor could additionally or alternatively be configured to generate and/or output one or more signals indicating that pointing element 5' is in contact with stretched cluster sensor 100 and is applying contact force to stretched cluster sensor 400 (e.g. Scenario J) based only on $C_{overlap}$ increasing (e.g. by a suitable threshold amount) from $C_{o,stretched}$. As can be seen from FIG. 17A, the amount of pressure applied to stretched cluster sensor 400 may be determined by measuring the amount of change of $C_{overlap}$ and/or $C_{fringe}$. As alluded to above, Scenario J may be indistinguishable from Scenario G if only the relative changes of $C_{fringe}$ and $C_{overlap}$ are considered (as compared to the absolute changes which require tracking prior and/or subsequent time periods, or the capacitances of neighbouring sensors in the case of an array of cluster sensors 400). Alternative methods for distinguishing between Scenario G and Scenario J are discussed further herein.

Scenario K represents when pointing element 5' is in contact with stretched cluster sensor unit 400 and is reducing the contact force being applied to stretched cluster sensor unit 400. Scenario K is represented as time period $t_{c11}$ on the FIG. 17A graph. At the conclusion of Scenario K, (i.e. at the conclusion of $t_{c11}$), the Scenario is substantially similar to that of Scenario I—i.e. there is no contact of pointing element 5' to stretched cluster sensor unit 400, but no force is applied by pointing element 5' on stretched cluster sensor unit 400. As can be seen from the FIG. 17A graph, the estimated value of $C_{fringe}$ decreases in Scenario K back toward $C_{f,touch}$. Also, the estimated value of $C_{overlap}$ decreases back toward $C_{o,stretched}$. Accordingly, a processor could be configured to generate and/or output one or more signals indicating that pointing element 5' is in contact with stretched cluster sensor 400 and is decreasing the contact force being applied to stretched cluster sensor 400 (e.g. Scenario K) based on $C_{fringe}$ and $C_{overlap}$ both decreasing. The circumstance at the end of Scenario K (contact with zero force) is reached when $C_{fringe}$ decreases below $C_{f,touch}$ and $C_{overlap}$ decreases to a vicinity of $C_{o,stretched}$. A processor could additionally or alternatively be configured to generate and/or output one or more signals indicating that pointing element 5' is in contact with stretched cluster sensor 400 and has decreased the contact force being applied to stretched cluster sensor 400 to zero (e.g. at the end of Scenario K) based only on $C_{overlap}$ decreasing back toward $C_{o,stretched}$. It is also possible that not all contact force is released from cluster sensor 400. In that case, $C_{fringe}$ will decrease but may not return below $C_{f,touch}$ and $C_{overlap}$ will decrease but may not return to $C_{o,stretched}$.

Scenario L represents when pointing element 5' is moving away from, but is still proximate to stretched cluster sensor unit 400 and is not applying contact force to stretched cluster sensor 400. Scenario L is represented as time period $t_{c12}$ on the FIG. 17A graph. As can be seen from the FIG. 17A graph, the estimated value of $C_{fringe}$ increases toward a threshold range around the nominal fringe capacitance, $C_{f,nom}$ (i.e. increases toward and possibly even above $C_{f,threshold}$). In contrast, the estimated value of $C_{overlap}$ remains at or near (i.e. within a threshold range of) $C_{o,stretched}$. This difference between the reactions of the capacitances, $C_{fringe}$ and $C_{overlap}$ to the Scenario L circumstance is similar to the Scenario H circumstance described above and may be attributable to the fact that the FSFR is greater than the OSFR. More specifically, fringe sensor 410 has a greater relative proportion of distal flux ($\Phi_{distal,fringe}$) than the distal flux ($\Phi_{distal,overlap}$) of overlap sensor 450. As pointing element 5' moves away from stretched cluster sensor unit 400, some distal flux which did terminate (or start depending on polarity) in pointing element 5', starts to terminate (or start) in the respective second electrodes 414, 454. Since fringe sensor 410 has a greater proportion of distal flux ($\Phi_{distal,fringe}$) than the distal flux ($\Phi_{distal,overlap}$) of overlap sensor 450, the fringe capacitance $C_{fringe}$ is relatively more sensitive to the proximity of pointing element 5' than the capacitance $C_{overlap}$ of overlap sensor 450 and the fringe capacitance $C_{fringe}$ of fringe sensor 410 increases more dramatically as shown in Scenario L of FIG. 17A. Accordingly, a processor could be configured to generate and/or output one or more signals indicating that pointing element 5' is moving away from, but is still proximate to, stretched cluster sensor 400 (e.g. Scenario L) based on $C_{fringe}$ increasing toward (and possibly even above) $C_{f,threshold}$ and $C_{overlap}$ remaining at or near (i.e. within a threshold range of) $C_{o,stretched}$. Once $C_{fringe}$ increases above $C_{f,threshold}$, pointing element will no longer be within proximity of cluster sensor 400, as in Scenario G.

Figure 18:
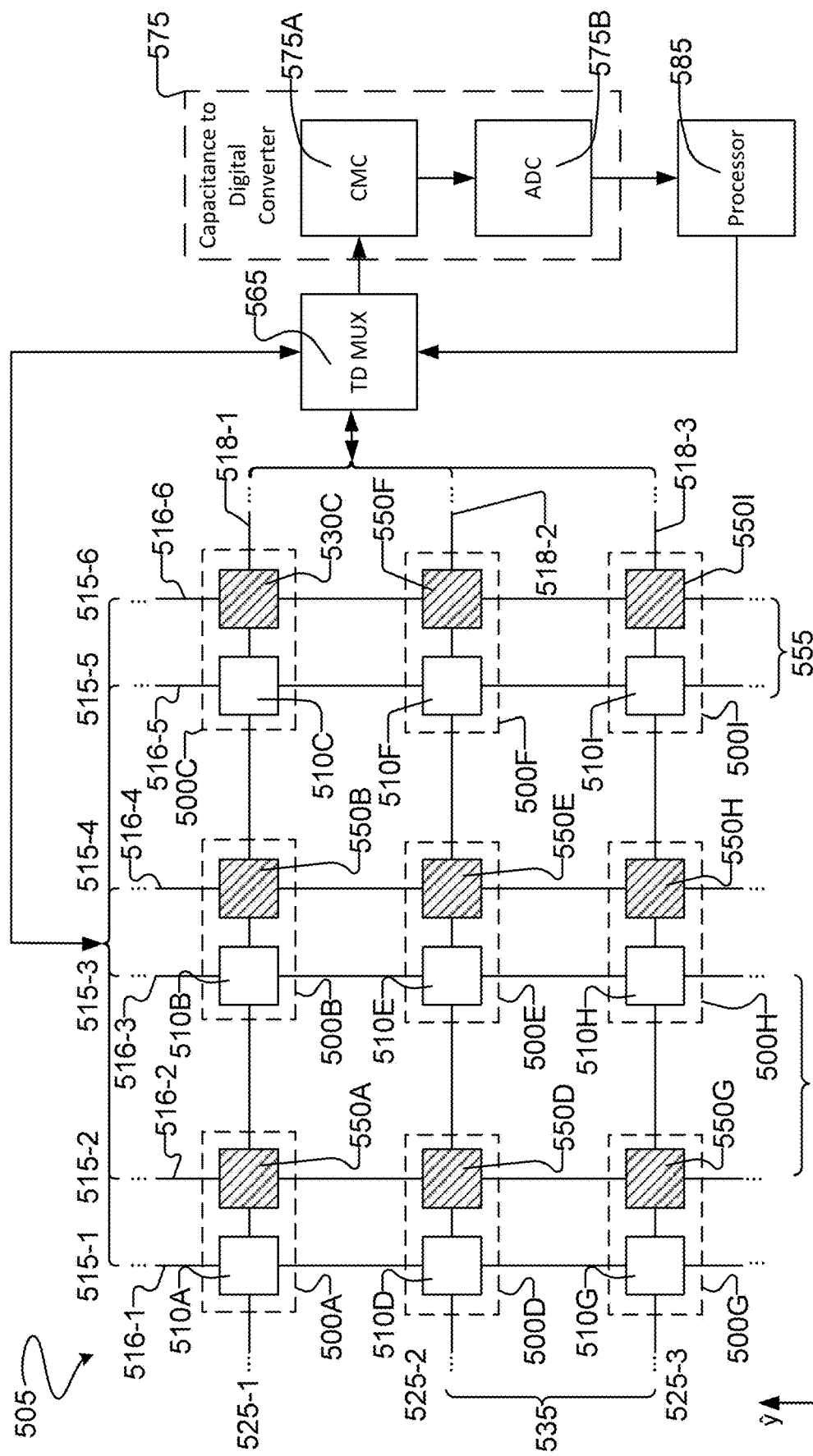
FIG. 18 depicts a schematic plan view of a sensor array according to one embodiment of the invention.

One aspect of the invention provides a sensor array for sensing the location of proximity, touch and/or pressure of a pointing element with respect to a sensing surface. In some embodiments, the sensor array is stretchable or otherwise deformable. FIG. 18 depicts a cluster sensor array 505 according to a particular embodiment comprising a plurality of cluster sensors 500A to 500I (collectively referred to as cluster sensors 500) organized in sensor columns 515-1 to 515-6 (collectively referred to as sensor columns 515) and sensor rows 525-1 to 525-3 (collectively referred to as sensor rows 525). In the illustrated embodiment of FIG. 18, each one of sensors 500 comprises a corresponding fringe sensor 510A-510I (collectively, fringe sensors 510) and a corresponding overlap sensor 550A-550I (collectively, overlap sensors 550) which are located along a corresponding one of sensor rows 525. Consequently, in the illustrated embodiment of FIG. 18, each cluster sensor unit 500 is located at an intersection of one of sensor rows 525 and a pair of sensor columns 515 (i.e. one column 515 for fringe sensors 510 and one column for overlap sensors 550). It will be appreciated that in other embodiments, array 505 and/or other individual cluster sensor units 500 could have other geometries. For example, the fringe sensor 510 and overlap sensor 550 of a cluster sensor unit 500 could be aligned along a corresponding sensor column 515 (in which case, each cluster sensor unit 500 could be located at the intersection of one column 525 and a pair of rows) or the fringe sensor 510 and overlap sensor 550 of a cluster sensor unit 500 could be offset in two dimensions from one another (in which case, each cluster sensor unit 500 could be located at the intersection of a pair of columns 525 and a pair of rows). Each of cluster sensors 500 may comprise a cluster sensor unit 400, cluster sensor unit 700, 800, 800-1, 900, 1050 or any other cluster sensor or cluster sensor unit described herein. For convenience, FIG. 18 only shows six sensor columns 515 and three sensor rows 525, but it should be understood that sensor array 505 may comprise any suitable number of sensor columns 515 and sensor rows 525 for a surface to be sensed.

As depicted in the FIG. 18 embodiment, the cluster sensors 500 (more particularly the first fringe electrodes of fringe sensors 510 and the first overlap electrodes of first overlap sensor 550) of a particular sensor row 525 are connected by a row trace 518. For example, in sensor row 525-1, cluster sensors 500A, 500B, 500C are ionically or electrically connected by row trace 518-1. All of the fringe sensors 510 of the cluster sensors 500 (more particularly the second fringe electrodes of fringe sensors 510 and the second overlap electrodes of first overlap sensor 550) of a particular sensor column are connected by a column trace 516 and all of the overlap sensors of the cluster sensors 500 of a particular sensor column are connected by a column trace 516. For example, fringe sensors 510A, 510D, and 510G (more particularly, the second fringe electrodes) of sensor column 515-1 are ionically or electrically connected by a column trace 516-1 and overlap sensors 550A, 550D, and 550G (more particularly, the second fringe electrodes) of sensor column 515-2 are ionically or electrically connected by a column trace 516-2.

In the illustrated FIG. 18 embodiment, each cluster sensor unit 500 is spaced apart from adjacent cluster sensor units 500 by a Y direction cluster spacing 535 and/or an X direction cluster spacing 545. For example, cluster sensor 500A is spaced apart from cluster sensor 500D by a Y direction cluster spacing 535, is spaced apart from cluster sensor 500B by an X direction cluster spacing 545 and is spaced apart from cluster sensor 500E by an X direction cluster spacing 545 and a Y direction cluster spacing 535. In some embodiments, X direction cluster spacing 545 and Y direction cluster spacing 535 are equal. For example, X direction cluster spacing 545 and Y direction spacing may be between 3 and 8 mm (e.g. 5 mm). In some embodiments, X direction cluster spacing 545 and Y direction cluster spacing 535 are not equal and/or X direction spacing and Y direction cluster spacing 535 are not constant across array 505.

In the illustrated FIG. 18 embodiment, each fringe sensor 510 and overlap sensor 550 of a particular cluster sensor 500 is spaced apart in the X direction by an X direction sensor spacing 555. As discussed above, X direction sensor spacing 555 may be any suitable spacing. In some embodiments, X direction sensor spacing 555 is chosen based on the size of the pointing element used in a particular application. In particular applications, such as where a fingertip is used as a pointing element, X direction spacing may be between 0.5 and 2 mm (e.g. 1 mm), for example.

In some embodiments, cluster sensor units 500 (and each fringe sensor 510 and overlap sensor 550 within a cluster sensor unit 500) of sensor array 505 are spaced apart by a dielectric 513. Dielectric 513 may comprise any suitable dielectric material. In some embodiments, dielectric 513 is deformable. For example, dielectric 513 may comprise a silicone material such as a silicon elastomer matrix or another material discussed herein. In some embodiments, each cluster sensor unit 500 (and each fringe sensor 510 and overlap sensor 550 within each cluster sensor unit 500) of sensor array 505 is surrounded by dielectric 513, as will be discussed further herein.

Each column trace 516 is connected to transmit to and/or receive signals from a processor 585. Each individual column trace 516 may be connected directly to processor 585 or may be connected via one or more time-division multiplexers 565. Similarly, each row trace 518 is connected to transmit to and/or receive signals from a processor 585. Each individual row trace 518 may be connected directly to processor 585 or may be connected via one or more time-division multiplexers 565. Column traces 516 and row traces 518 may be connected via the same or different time-division multiplexers 565. As will be appreciated from the discussion herein, suitable signal conditioning circuitry may be interposed between column traces 516 and processor 585 and/or between row traces 518 and processor 585. For clarity and simplicity of the drawing, such circuitry, which will be understood to those skilled in the art, is not shown in FIG. 18.

In the illustrated embodiment, signals from column traces 516 and row traces 518 are directed to capacitance measurement circuit (CMC) 575A prior to being received at processor 585. As will be described in more detail below, CMC 575A may be employed to determine a capacitance value for each fringe and overlap sensor 510, 550 based on the signals from column traces 516 and row traces 518. CMC 575A may be employed in conjunction with an analog to digital converter (ADC) 575B. ADC 575B and CMC 575A may be integrated in the form of a capacitance to digital converter 575 or ADC 575 may be implemented separately from CMC 575A. In some embodiments, a Delta-Sigma ADC is employed to convert a changing analog voltage signal on traces 516, 518 into a quantized digital signal by sampling the signal at a very high frequency and feeding the sampled data into a comparator. In some embodiments, the output of the Delta-Sigma ADC is then integrated to obtain a digital signal. Where ADC 575B and CMC 575A are combined, a constant voltage input may be employed while the feedback capacitor of the integrator is employed as the sense capacitor. Changes in the feedback capacitor of the integrator may cause the digital output to change while the input voltage is kept constant and/or changes in the input voltage may cause the digital output to change. Processor 585 may be connected and configured to control multiplexer 565 while capacitance to digital converter 575 transmits final data to processor 585, where digital values of the capacitances of fringe sensors 510 and overlap sensors 550 can be acquired and displayed.

In some embodiments, processor 585 is configured to individually sample each cluster sensor unit 500. Individual sampling of cluster sensor units 500 may occur sequentially. Sampling may occur at any desired rate. For example, for near real-time results, sampling may occur at between 2 to 4 times per second. A form of running averaging of the signal may be employed by processor 585 or some other suitable conditioning circuit to reduce effects of noise and drift in signals from cluster sensor units 500.

Processor 585 may be configured to sample an individual cluster sensor unit 500 in various ways. Processor 585 may be configured to sample each of fringe sensor 510A and overlap sensor 550A of cluster sensor 550A simultaneously or in series. For example, processor 585 may be configured to apply a voltage across column trace 516-1 and row trace 518-1 while either: allowing the remaining columns traces 516 (i.e. column traces 516-2 to 516-6) and the remaining row traces 518 (i.e. row traces 518-2 and 518-3) to float (i.e. not applying a voltage to the remaining columns and rows or not grounding the remaining columns and rows); or grounding the remaining column traces 516 and the remaining row traces 518. After the voltage is applied across column trace 516-1 and row trace 518-1, the capacitance of fringe sensor 510A can be distinguished from the capacitance of any other fringe sensor 510 or overlap sensor 550 at a particular time. To finish sampling cluster sensor 500A, processor 585 may be configured to apply a voltage across column trace 516-2 and row trace 518-1 while either: allowing the remaining columns traces 516 (i.e. column traces 516-1 and 516-3 to 516-6) and the remaining row traces 518 (i.e. row traces 518-2 and 518-3) to float; or grounding the remaining column traces 516 and the remaining row traces 518. After the voltage is applied across column trace 516-2 and row trace 518-1, the capacitance of overlap sensor 550A can be distinguished from the capacitance of any other fringe sensor 510 or overlap sensor 550 at a particular time. Subsequently, each remaining cluster sensor unit 500 (i.e. cluster sensor units 500B to 500I) may each be sampled in a similar way.

Figure 18A:
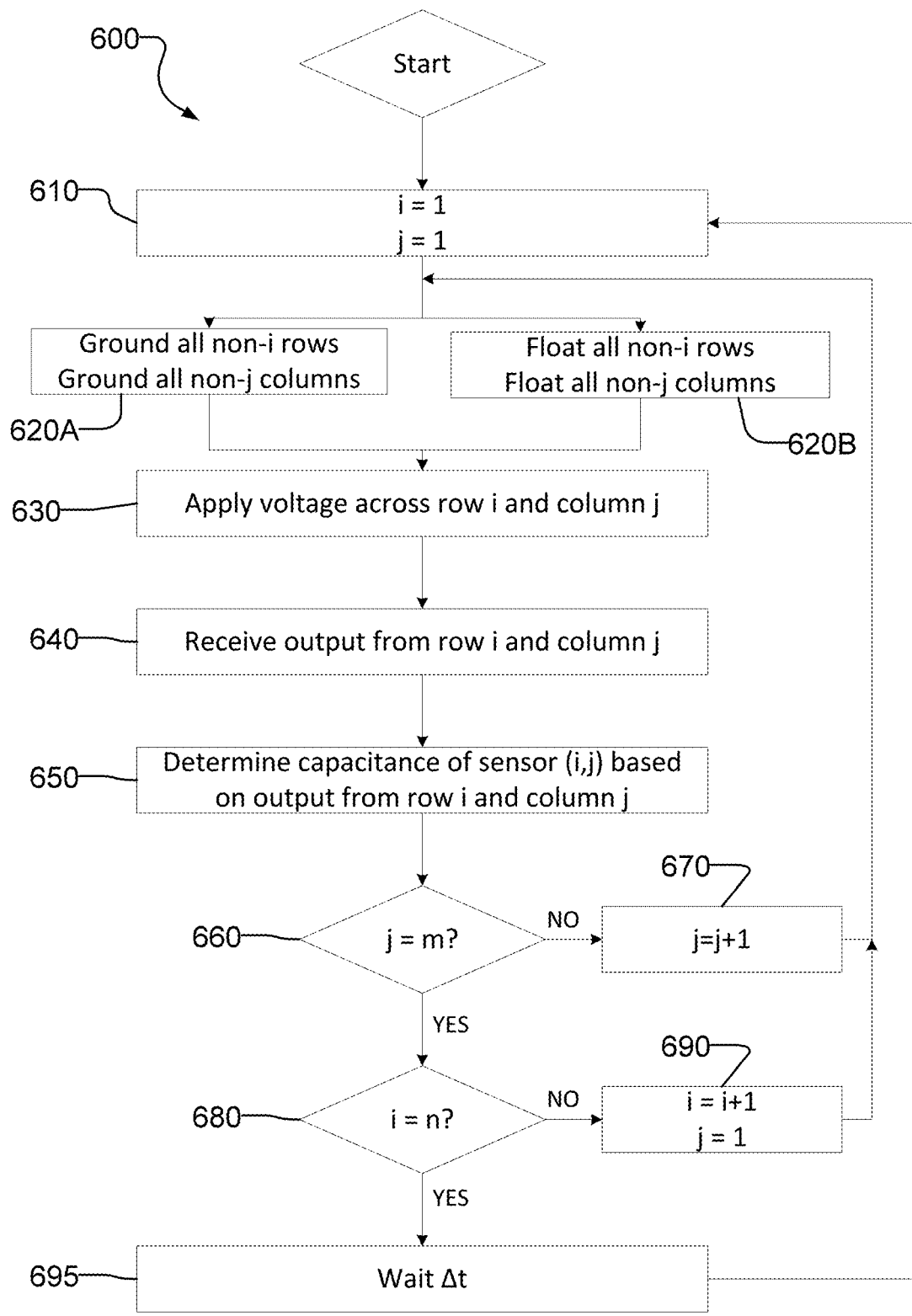
FIG. 18A depicts a method of determining capacitances for each sensor of a sensor array according to one embodiment of the invention.

FIG. 18A depicts one exemplary method 600 (which may be performed by processor 585) for sampling each fringe sensor 510 and each overlap sensor 550 of a sensor array 505 where sensor array 505 contains a number, n, of sensor rows 525 and a number, m, of sensor columns 515 and each sensor row 525 can be represented by a row index, i, from 1 to n and each sensor column 515 can be represented by a column index, j, from 1 to m. A particular sensor may then be represented by a coordinate (i, j). For example, fringe sensor 510A may be represented as sensor (1, 1), as it is located at the intersection of sensor row 525-1 and sensor column 515-1 and overlap sensor 550F may be represented as sensor (2, 6) as it is located at the intersection of sensor row 525-2 and sensor column 515-6.

Processor 585 may be configured to maintain a counter for keeping track of which sensor (i, j) is currently being sampled. Method 600 starts at block 610 by initializing the value of row index, i, to 1 and also initializing the counter value sensor index, j, to 1.

After block 610, method 600 may continue to either of blocks 620A or 620B. At block 620A, all non-i rows and all non-j columns are connected to ground. In other words, in the FIG. 18 embodiment, when the counter (i, j) is set to (1, 1), row traces 518-2, 518-3 and column traces 516-2, 516-3, 516-4, 516-5, 516-6 are connected to ground. Block 620A may be accomplished by suitably controlling multiplexer 565. Similarly, in block 620B, all non-i rows and all non-j columns are allowed to float. In other words, the non-i rows and the non-j columns are not grounded and there is no current or charge directed to them. Block 620B may be accomplished by suitable controlling multiplexer 565.

After either of blocks 620A or 620B, method 600 continues to block 630 which comprises applying a voltage across sensor row i and column row j. The voltage may be applied through row trace 518-*i* or column trace 516-*j*. In practice, this is equivalent to applying a voltage across the first and second electrodes of sensor (i, j) which may be used to measure the capacitance of sensor (i, j).

At block 640, processor 585 may receive output from sensor row i and sensor column j via row trace 518-*i* and column trace 516-*j*. The output from sensor row i and sensor column j may be used to determine the capacitance of sensor (i, j) at block 650 using, for example, capacitance to digital converter 575 as described herein.

After determining the capacitance of sensor (i, j), method 600 continues to block 660 where, if the column index, j, is not equal to m (i.e. method 600 is not at the last column of row i), column index, j, is incremented at block 670 and method 600 returns to block 620A or 620B. For example, if the capacitance of sensor (1, 1) (i.e. fringe sensor 310A) was just determined, block 660 would move method 600 on to measure the capacitance of sensor (1, 2) (i.e. overlap sensor 350A) at blocks 620A/B to 650.

If column index, j, is equal to m (i.e. method 600 is at the last column of row i), then method 600 moves on to block 680 where, if the row index, i, is not equal to n (i.e. method 600 is not at the last row i), row index, i, is incremented at block 670 and column index, j, is reinitialized to 1 before method 600 returns to block 620A or 620B. For example, if the capacitance of sensor (1, 6) (i.e. overlap sensor 550C) was just determined, block 680 and block 690 would move method 600 on to measure the capacitance of sensor (2, 1) (i.e. fringe sensor 510D).

If row index, i, is equal to n (i.e. method 600 is at the last row i), then method 600 moves on to block 695 where method 600 waits for a time, $\Delta t$, before returning to block 610 to commence again. Time, $\Delta t$, may be set based on a desired rate of sampling of cluster sensors 500 of sensor array 505. For example, time, $\Delta t$, may be set to a particular value if sensor array 505 is set to be sampled three times per second or a greater value if sensor array is set to be sampled 2 times per second. In some embodiments, sampling occurs continuously and time, $\Delta t$, is set to zero.

Figure 18B:
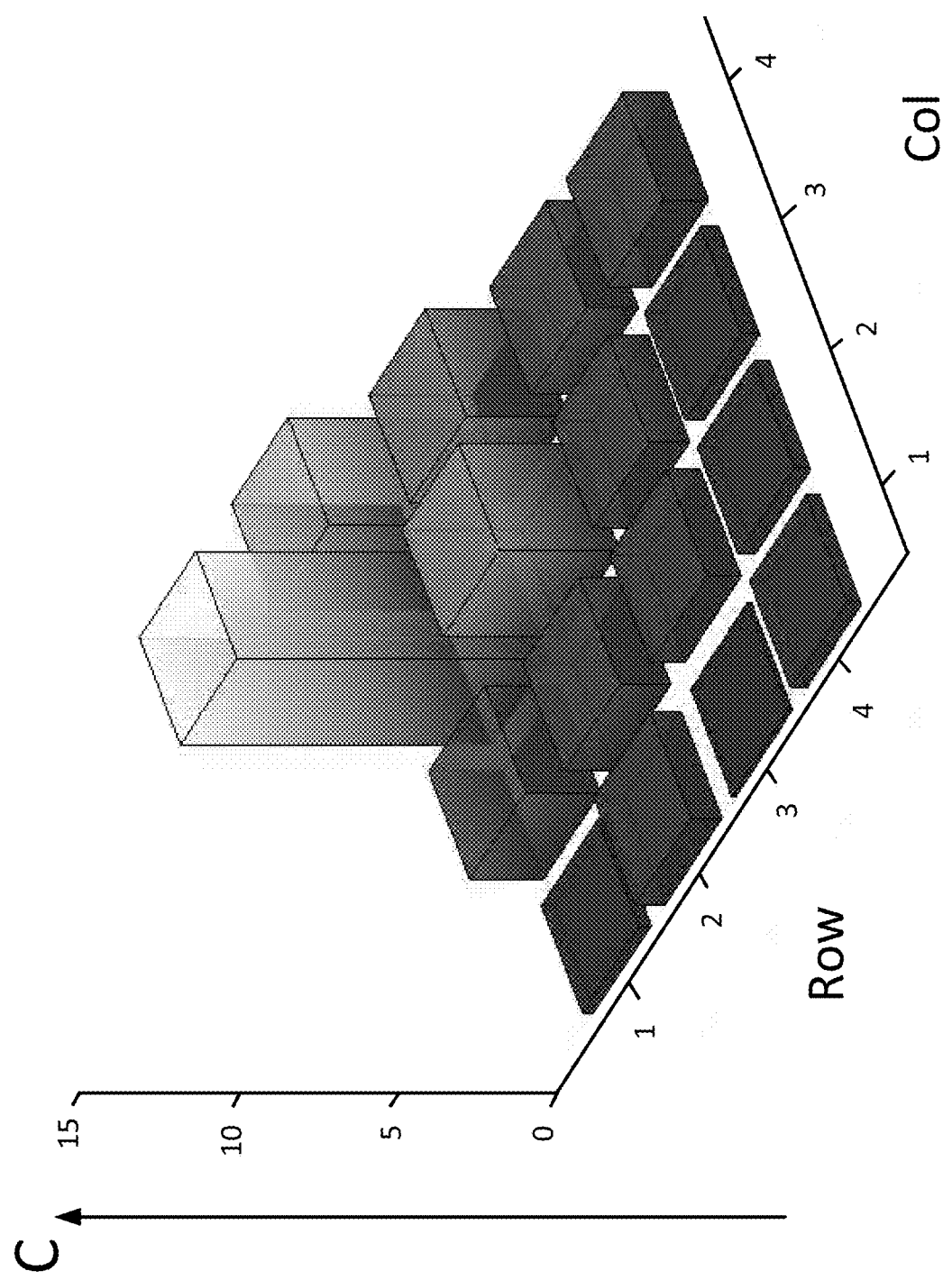
FIG. 18B depicts a map of capacitance changes for the sensors of a sensor array according to one embodiment of the invention.

In some embodiments, each combination of row and column electrodes is scanned and the capacitances of all sensors 510, 550 are determined to create a two dimensional map (or array) of capacitances indexed by sensor row and sensor column, such as is depicted in FIG. 18B. Processor 585 may be configured to monitor such a map (e.g. to monitor the capacitance of each fringe sensor 510 and each overlap sensor 550 of each cluster sensor unit 500) for changes in capacitance. The two-dimensional position of a pointing element can be detected based on the capacitance changes observed, as set out herein. For example, the FIG. 18B map may represent a change in capacitance of fringe sensors 510 as pointing element 5' touches sensor array 505.

In some embodiments, processor 585 may be configured to recognize Scenarios A to L for each cluster sensor unit 500 of sensor array 505. Scenarios A to L may be recognized as described above by monitoring the capacitance of each fringe sensor 510 and each overlap sensor 550 that make up the cluster sensor units 500. As mentioned above, additional information may be desirable for processor 585 to distinguish between Scenario G (stretching of a cluster sensor unit 500 from its nominal shape) and Scenario J (applying pressure to a cluster sensor 500, when cluster sensor unit 500 is stretched). In some embodiments, it is possible for processor 585 to discriminate between Scenarios G and J for a particular cluster sensor unit 500 by comparing the capacitances of neighbouring cluster sensor units 500 within sensor array 505. For example, if cluster sensor 500A shows a slight increase in capacitance of fringe sensor 510A and a significant increase in capacitance of overlap sensor 550A, this may represent either of Scenario G or Scenario J. To discriminate between Scenario G and Scenario J, processor 585 may consider the capacitances of neighbouring cluster sensor units 500B, 500D (or more). If the neighbouring cluster sensor units 500B, 500D exhibit similar changes in capacitance of fringe sensors 510B, 510D and overlap sensors 550B, 550D, then processor 585 may recognize that sensor array 505 is being stretched in the X direction and/or the Y direction. Alternatively, if only cluster sensor unit 500A exhibits the aforementioned changes in capacitance of fringe sensor 510A and overlap sensor 550A, then processor 585 may recognize that pressure is being applied in a vicinity of cluster sensor unit 500A.

Due to the proximity of neighbouring cluster sensor units 500, the capacitance of more than one cluster sensor unit 500 may be affected by a single pointing element (this can be seen in the FIG. 18B map, for example). For example, a pointing element that touches sensor array 505 between cluster sensor unit 500A and cluster sensor unit 500B may have an effect on the capacitances of both of cluster sensor unit 500A and cluster sensor unit 500B. The example map in FIG. 18B shows that a pointing element may principally impact the capacitances of one cluster sensor unit 500 and may have a subsidiary impact on the capacitances of neighboring cluster sensor units 500. This effect may be employed to locate a "center of activation" on the surface covered by sensor array 505 using further signal processing to enhance the spatial resolution, if desired.

Unlike other deformable capacitive sensor implementations, no force is required to obtain changes in the measured capacitances of cluster sensor units 500. The ability to sense proximity allows for non-contact gestures to be detected. Contact gestures such as the translational motion of a finger on the sensor surface (commonly referred to as a "swipe") can also be detected without the need to press firmly on the surface of sensor array 505, minimizing stiction the surface of sensor array 505. Sensor array 505 is able to detect gestures such as a swipe, where a pointing element, such as a finger in light contact with the surface of sensor array 505, is moved across sensor array 505. Sensor array 505 may also have multi-touch capability, in which the presence of one, two or more pointing elements are simultaneously or near-simultaneously detectable.

The inventors have determined, based on material based models, that sensor array 505 can be very large—approximately 50 m×50 m with a 20 cm grid (e.g. spacing between cluster sensor units 300 of 20 cm), if refreshed twice per second. Such a format might be used to detect the presence of, for example, feet or other similarly large pointing elements (in addition to or in the alternative to fingers or other similarly small pointing elements).

An attractive feature of any capacitive sensor technology is that its resolution scales in proportion to the dimensions of the electrodes. For a parallel plate capacitor whose dimensions are uniformly scaled up or down, the magnitude of the projected capacitance also scales linearly, as do the X, Y and Z-direction resolutions. Devices can be constructed to sense at much larger or smaller scales than millimeter levels, subject to limitations of fabrication methods, and instrumentation considerations. MEMS devices sense very low capacitances, suggesting that operation with micrometer resolution is possible if desired.

Figure 19:
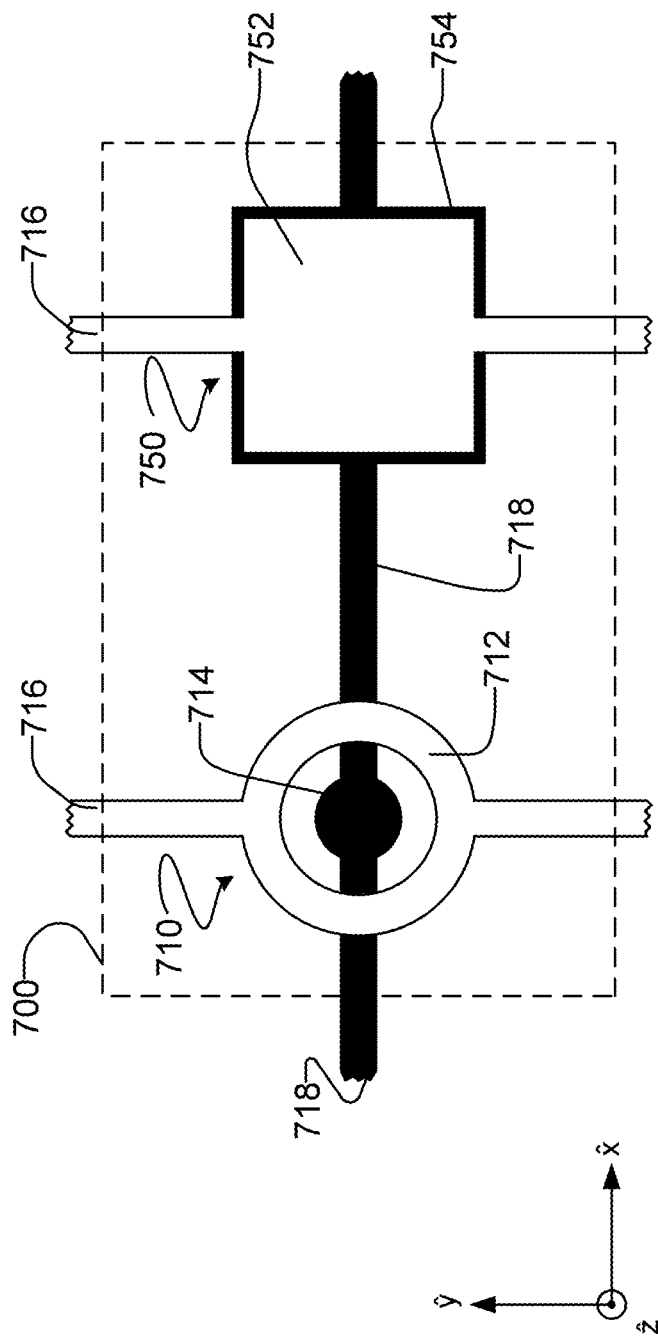
FIG. 19 depicts a schematic plan view of a sensor according to one embodiment of the invention.

FIG. 19 depicts one embodiment of a cluster sensor 700 according to one aspect of the invention. Cluster sensor 700 comprises a fringe sensor 710 and an overlap sensor 750. Cluster sensor 700 is similar in many respects to cluster sensor 400 describe herein. Fringe sensor 710 and overlap sensor 750 of cluster sensor 700 are described in more detail as follows.

Figure 21B:
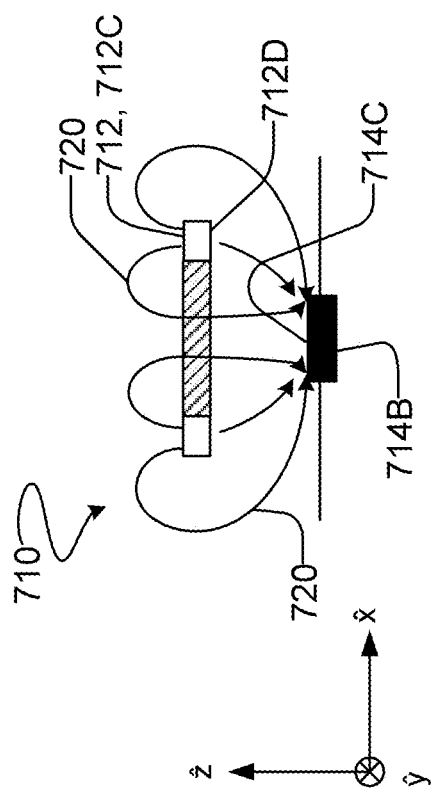
FIGS. 21A and 21B depicts schematic cross-sections of the FIG. 20 sensor along the line B-B of FIG. 20.
Figure 21A:
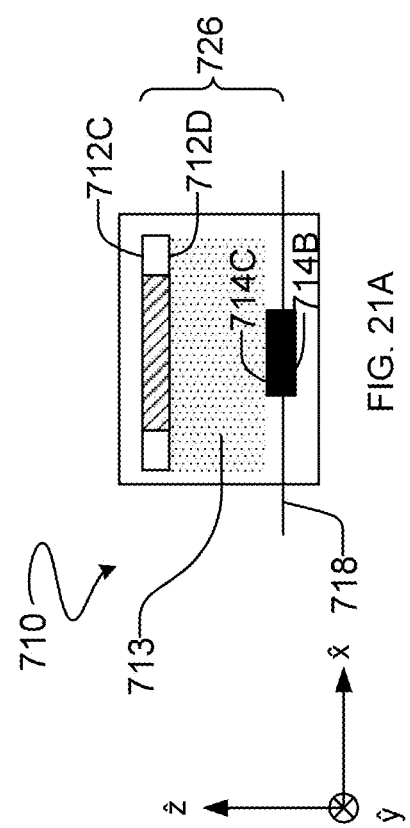
Figure 20:
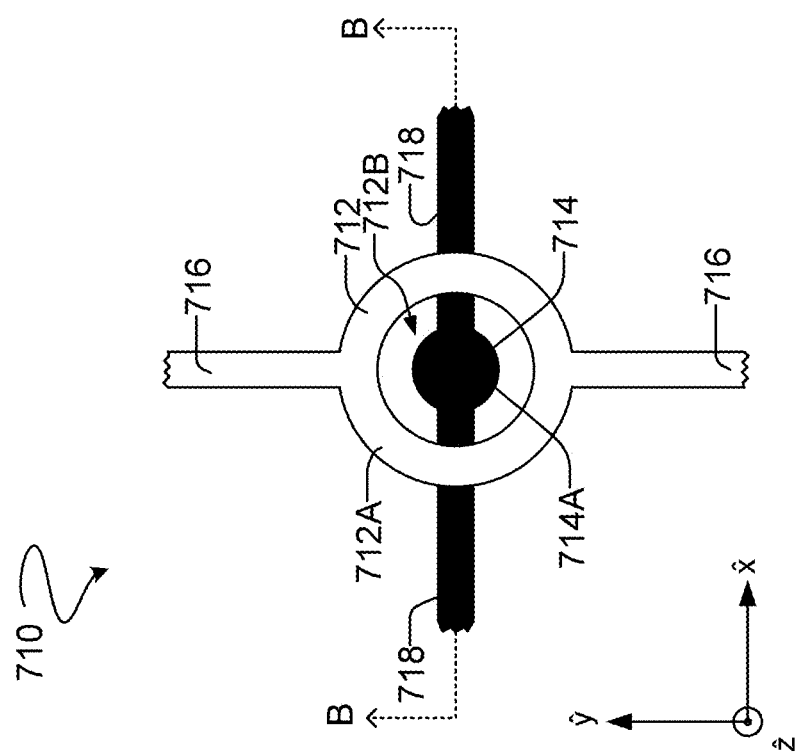
FIG. 20 depicts a schematic plan view of a sensor according to one embodiment of the invention.

FIGS. 20, 21A and 21B depict one embodiment of a fringe sensor 710 of the type used in the FIG. 19 cluster sensor 700. Fringe sensor 710 has a fringe capacitance, $C_{fringe}$. Fringe sensor 710 comprises a first fringe electrode 712 and a second fringe electrode 714. First fringe electrode 712 extends in the X direction and the Y direction. Second fringe electrode 714 also extends in the X direction and the Y direction. The first and second fringe electrodes are spaced apart in the Z direction by a Z direction spacing 726, as depicted in FIG. 21A.

As best seen from FIG. 20, first fringe electrode 712 of the illustrated embodiment has a generally annular XY-plane cross-sectional shape. As will be discussed below, this shape is not mandatory. Annulus 712A of first fringe electrode 712 defines a void 712B (also referred to as a cut-out 712B) within annulus 712A. Annulus 712A of the illustrated embodiment has an outer diameter, $d_{1,outer}$, and an inner diameter, $d_{1,inner}$. Second fringe electrode 714 has a generally circular XY-plane cross-sectional shape. Disc 714A of second fringe electrode 714 has an outer diameter, $d_{2,outer}$. In some embodiments, the outer diameter, $d_{2,outer}$ of second fringe electrode 714 is less than the inner diameter $d_{1,inner}$ of first fringe electrode 712, such as is depicted in FIG. 20. This is not necessary. In some embodiments $d_{1,inner}$ is equal to $d_{2,outer}$. Although spaced apart in the Z direction, annulus 712A and circle 714A may be concentric (i.e. a Z direction oriented line may pass through an XY-plane center of annulus 712A and an XY-plane center of circle 714A). This is not mandatory. In some embodiments, the XY-plane cross-sectional shapes of first and second fringe electrodes 712, 714 need not be circularly symmetric and may have other XY-plane cross-sectional shapes. For example, in some embodiments, the XY-plane cross-sectional shape of first fringe electrode 712 may comprise a rectangular annular shape (i.e. an annular shape having rectangular edges in the place of circular edges), an elliptical annular shape (i.e. an annular shape having elliptical edges in the place of circular edges), a polygonal annular shape (i.e. an annular shape having polygonal edges in the place of circular edges) and/or the like. Similarly, in some embodiments, the XY-plane cross-sectional shape of second fringe electrode 714 may be rectangular, elliptical, polygonal and/or the like. Further, it is not necessary that the shape of second fringe electrode 714 match the shape of first fringe electrode 712. For example, first fringe electrode 712 may have a rectangular annular shape in XY-plane cross-section and second fringe electrode 714 may have a circular shape in XY-plane cross-section.

As can be seen in FIG. 21A, first fringe electrode 712 comprises a first distal fringe surface 712C and a first proximate fringe surface 712D. In the illustrated view of FIG. 21A, first proximate fringe surface 712D faces in the negative-Z direction (i.e. generally towards second fringe electrode 714) while first distal fringe surface 712C faces in the positive-Z direction (i.e. generally away from second fringe electrode 714). Similarly, second fringe electrode 714 comprises a second distal fringe surface 714B and a second proximate fringe surface 714C. Second proximate fringe surface 714C faces in the positive-Z direction (i.e. generally towards first fringe electrode 712) while second distal fringe surface 714B faces in the negative-Z direction (i.e. generally away from first fringe electrode 712).

First fringe electrode 712 may be spaced apart from second fringe electrode 714 by a dielectric 713. Dielectric 713 may contact both of first proximate fringe surface 712D and second proximate fringe surface 714C and may occupy the volume therebetween. Dielectric 713 may be similar to and have any of the characteristics of dielectric 413 described herein. In some embodiments, dielectric 713 surrounds first and second fringe electrodes 712, 714, as is discussed further herein.

A circuit may be connected to first and second fringe traces 716, 718 (FIG. 20), such that a voltage may be applied across first and second fringe electrodes 712, 714 to produce a fringe sensor electric field, $\vec{E}_{fringe}$, in the vicinity of fringe sensor 710. FIG. 21B depicts fringe field lines 720 representative of the shape of fringe electric field, $\vec{E}_{fringe}$. One skilled in the art would understand that fringe field lines 720 are not drawn to scale and do not represent the entirety of the fringe sensor electric field, $\vec{E}_{fringe}$, but instead are merely provided to illustrate concepts discussed herein.

The electric field $\vec{E}_{fringe}$ associated with any fringe voltage applied between first and second fringe electrodes 712, 714 comprises a flux characteristic referred to herein as the distal fringe flux, $\Phi_{distal,fringe}$ which comprises the flux of the fringe electric field $\vec{E}_{fringe}$ into (or out of depending on polarity) first distal fringe surface 712C and/or into (or out of) a notional plane spaced infinitesimally apart from first distal fringe surface 712C in a direction away from second fringe electrode 714 (e.g. spaced infinitesimally apart from first distal fringe surface 712C in a positive Z direction). The electric field $\vec{E}_{fringe}$ associated with any fringe voltage applied between first and second fringe electrodes 712, 714 also comprises a flux characteristic referred to herein as the proximate fringe flux, $\Phi_{prox,fringe}$ which comprises the flux of the fringe electric field $\vec{E}_{fringe}$ into (or out of depending on polarity) first proximate fringe surface 712D and/or a notional plane spaced infinitesimally apart from first proximate fringe surface 712D in a direction toward second fringe electrode 714 (e.g. spaced infinitesimally apart from first proximate fringe surface 712D in a negative Z direction).

Like fringe sensor 410 described above, the electric field, $\vec{E}_{fringe}$ of fringe sensor 710, can be characterized by a fringe sensor flux ratio ("FSFR") defined by:

$$FSFR = \frac{\Phi_{distal,fringe}}{\Phi_{prox,fringe}}$$

As the FSFR increases, the sensitivity of fringe sensor 710 to the proximity of pointing element 5' (as opposed to pressure on fringe sensor 710 applied by pointing element 5') increases. Consequently, there is desire for the electrodes 712, 714 of fringe sensor 710 to be shaped to provide relatively high FSFR and, in particular, to provide a FSFR that is greater than the OSFR of overlap sensor 750 (FIG. 19) of cluster sensor 700.

Figure 22:
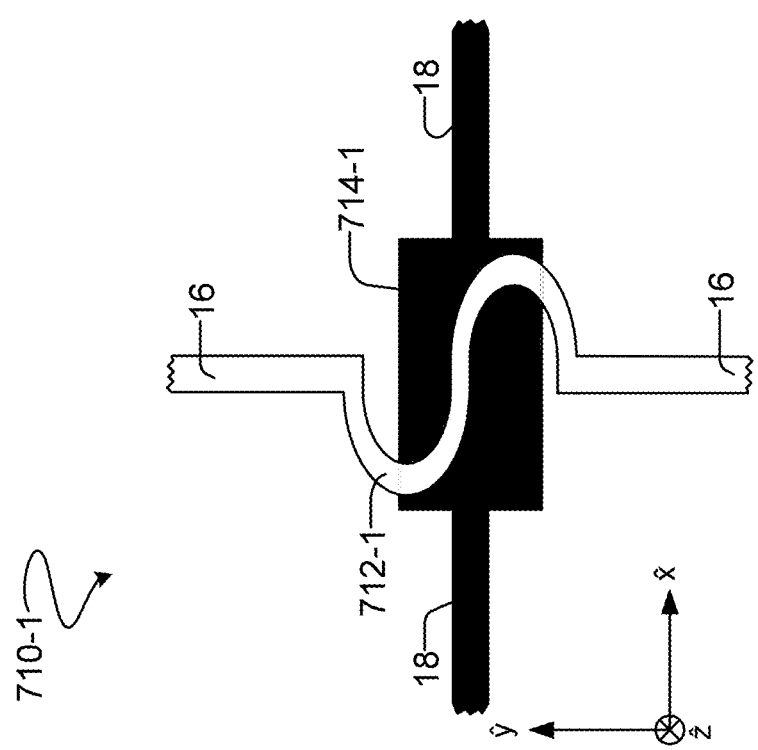
FIG. 22 depicts a schematic plan view of a sensor according to one embodiment of the invention.

First and second fringe electrodes 712, 714 may have other shapes while still achieving a desired (e.g. sufficiently high) FSFR of fringe sensor 10. FIG. 22 depicts a fringe sensor 710-1 having a first fringe electrode 712-1 that has an XY-plane cross-section that is "S" shaped. The "S" shape of first fringe electrode 712-1 increases the length of the edges (as compared to a square, rectangular or circular electrode) without overly increasing the overlap in the Z direction with second fringe electrode 714-1. As would be understandable to one of skill in the art, fringe electrodes 712, 714 may be provided with various other shapes to achieve a desired FSFR and the description herein should not be interpreted as being limited to either of the FIGS. 20 and 22 embodiments. For example, the "S" shape of FIG. 22 could be modified to include more or fewer curves than as depicted.

Figure 23F:
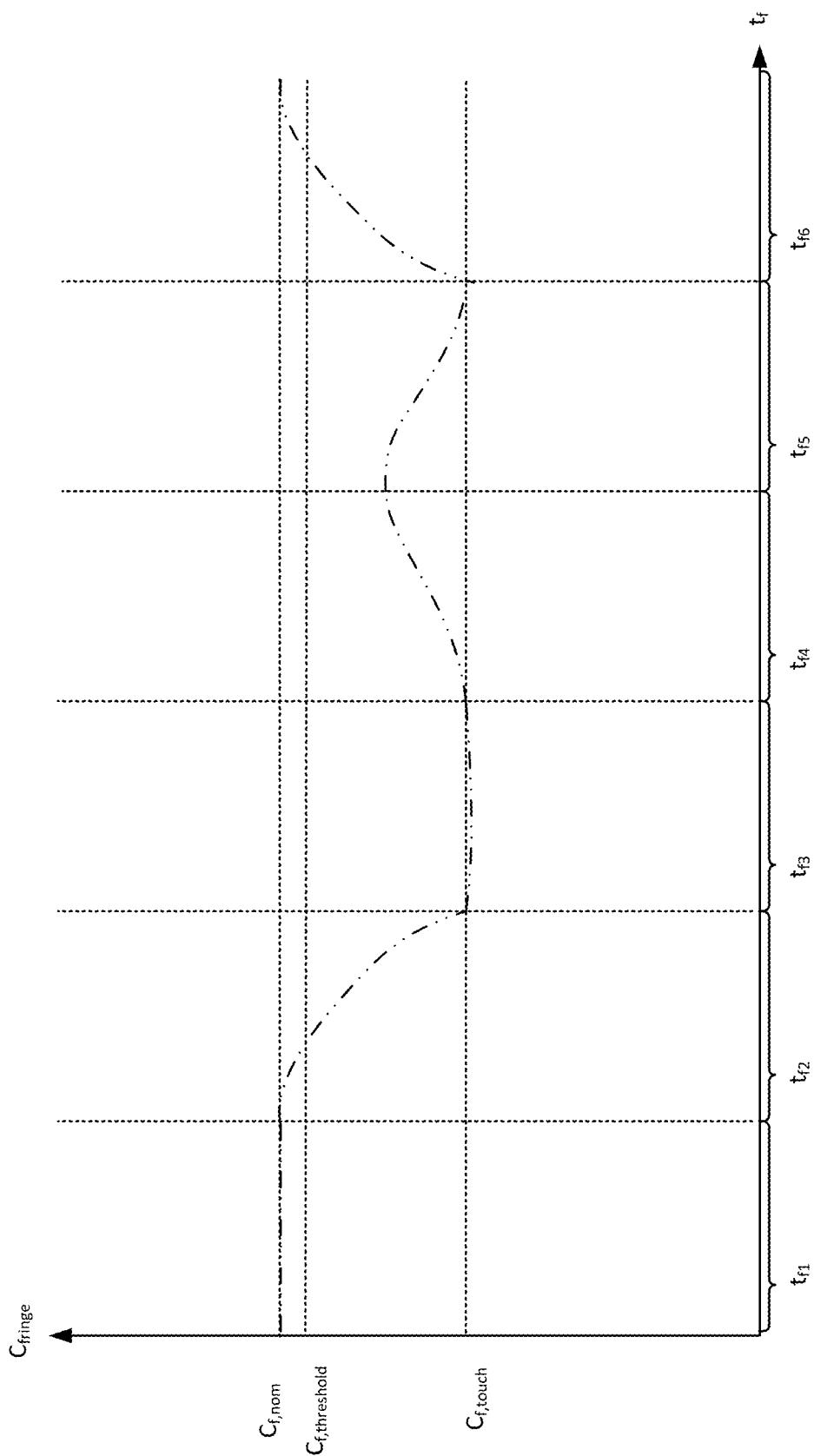
FIGS. 23F and 23L depict graphs of capacitance as a function of time for sensor interacting with a pointing element according to FIGS. 23A to 23E and 23G to 23K.

FIG. 23A represents fringe sensor 710 when pointing element 5' is not proximate to cluster sensor unit 700 and $C_{fringe}$ is within a threshold range of $C_{f,nom}$. Other than minor fluctuations in $C_{fringe}$ due to interference, error or the like, $C_{fringe}$ remains substantially constant within a threshold range around $C_{f,nom}$ and does not fall below $C_{f,threshold}$. $C_{f,threshold}$ may be any suitable threshold. For example, in some embodiments, $C_{f,threshold}$ may be 3%, 2% or 1% lower than $C_{f,nom}$. The FIG. 23A Scenario is represented by time, $t_{f1}$, in FIG. 23F.

FIG. 23B represents fringe sensor 710 as pointing element 5' approaches cluster sensor unit 700. The FIG. 23B Scenario is represented by time, $t_{f2}$, in FIG. 23F. As can be seen in FIG. 23F, $C_{fringe}$ decreases as pointing element 5' approaches fringe sensor 710. The decrease in $C_{fringe}$ occurs since pointing element 5' acts as a third electrode, which capacitively couples to fringe sensor 710, reducing the coupling between first and second fringe electrodes 712, 714. In particular, the portion of the electric field that previously emanated from distal fringe surface 712C and entered second fringe electrode 714 is decreased since at least some of this electric field emanating from distal fringe surface 712C enters pointing element 5' when pointing element 5' couples with fringe sensor 710. The coupling between first fringe electrode 712 and pointing element 5' is represented by field lines 720' emanating from distal fringe surface 712C and leading to pointing element 5'. As pointing element 5' approaches cluster sensor unit 700, some of the electric field from (or into depending on polarity) first distal fringe surface 712C of first electrode 712 terminates (or starts depending on polarity) in pointing element 5', rather than second electrode 714. As discussed above, fringe sensor 710 preferably has a high FSFR and correspondingly high distal flux ($\Phi_{distal,fringe}$), which makes fringe sensor 710 particularly sensitive to this effect caused by the proximity of pointing element 5'. In particular, the capacitance $C_{fringe}$ of fringe sensor 710 may be relatively more sensitive than the capacitance $C_{overlap}$ of its corresponding overlap sensor 750 to this effect caused by the proximity of pointing element 5' to cluster sensor 700.

In some embodiments, as pointing element 5' approaches (but does not touch) cluster sensor unit 700, the capacitance, $C_{fringe}$, may be reduced to a range between 3-10% of $C_{f,nom}$. In exemplary embodiments, the capacitance, $C_{fringe}$, is reduced by 5-7% of $C_{f,nom}$ as pointing element 5' approaches (but does not touch) fringe sensor 710. Notably, as pointing element 5' approaches closer to overlap sensor 750, $C_{fringe}$ may tend to decrease at an increasing rate. Accordingly, by measuring the capacitance, $C_{fringe}$, of fringe sensor 710, a suitably configured processor (see processor 585 of FIG. 18) could determine that pointing element 5' is approaching fringe sensor 710 by monitoring for a reduction of $C_{fringe}$ from $C_{f,nom}$ by an amount greater than $C_{f,threshold}$.

FIG. 23C represents fringe sensor 710 as pointing element 5' touches cluster sensor unit 700 without applying any pressure or force on cluster sensor unit 700. The FIG. 23C Scenario is represented by time, $t_{f3}$, in FIG. 23F. As can be seen in FIG. 23F, in the FIG. 23C Scenario, $C_{fringe}$ is further reduced to below a contact threshold $C_{f,touch}$. Again, this reduction is due to pointing element 5' acting as a third electrode, which capacitively couples to fringe sensor 710, thereby reducing the coupling) between first and second fringe electrodes 712, 714. In particular, the portion of the electric field that previously emanated from distal fringe surface 712C and entered second fringe electrode 714 is decreased since at least some of this electric field emanating from distal fringe surface 712C enters pointing element 5' when pointing element 5' couples with fringe sensor 710.

The difference between the reaction of the capacitance $C_{fringe}$ to the Scenario of FIG. 23B and the Scenario of FIG. 23C may be a difference of degree and may involve configurable thresholds $C_{f,threshold}$ and $C_{f,touch}$. $C_{f,touch}$ may represent a further reduction of $C_{fringe}$ as compared to the reduction of $C_{fringe}$ during time, $t_{f2}$. In some embodiments, $C_{f,touch}$ represents a reduction of an additional 5 to 10% of $C_{f,nom}$ (e.g. $C_{f,touch}$ is 10% to 20% lower than $C_{f,nom}$). Accordingly, it may be possible to determine if pointing element 5' is touching fringe sensor 710 by monitoring for a reduction of $C_{fringe}$ to $C_{f,touch}$. In some embodiments, $C_{f,touch}$ may be 10% lower than $C_{f,nom}$. In other embodiments, $C_{f,touch}$ may be 15% lower than $C_{nominal}$. In further embodiments still, $C_{f,touch}$ may be 20% lower than $C_{f,nom}$. $C_{f,touch}$ may be determined experimentally by measuring $C_{fringe}$ when pointing element 5' first touches fringe sensor 710.

FIG. 23D represents fringe sensor 710 as pointing element 5' is in contact with and applies increasing pressure or contact force to cluster sensor unit 700. In FIG. 23D, first fringe electrode 712 is spaced apart in the Z direction from second fringe electrode 714 by a spacing 726'. Because fringe sensor 710 is deformable and fabricated from deformable materials, spacing 726' is less than spacing 726 (FIG. 21A). In other words, by applying contact force to fringe sensor 710, pointing element 5' causes first and second fringe electrodes 712, 714 to be closer to one another. The FIG. 23D Scenario is represented by time, $t_{f4}$, in FIG. 23F. As can be seen from FIG. 23F, $C_{fringe}$ increases as the amount of contact force on fringe sensor 710 increases. This increase in $C_{fringe}$ can be attributed to a reduction in spacing 726 to spacing 726' since capacitance is inversely proportional to this spacing.

As the contact force applied by pointing element 5' is reduced, spacing 726' grows and begins to approach spacing 726. This Scenario is represented in FIG. 23F by time, $t_{f5}$. As can be seen from FIG. 23F, $C_{fringe}$ decreases as the amount of contact force on fringe sensor 710 decreases. This decrease in $C_{fringe}$ can be attributed to an increase in the distance between first and second fringe electrodes 712, 714, since capacitance is inversely proportional to this spacing.

FIG. 23E represents fringe sensor 710 as pointing element 5' is retracted from cluster sensor unit 700. The FIG. 23E Scenario is represented by time, $t_{f6}$, in FIG. 23F. As can be seen in FIG. 23F, $C_{fringe}$ may increase to a level above $C_{f,touch}$ as pointing element 5' is retracted. This increase in capacitance to a level above $C_{f,touch}$ may be due to a reduction in the coupling between pointing element 5' and fringe sensor 710, thereby allowing the coupling between first and second fringe electrodes 712, 714 to increase. In particular, the portion of the electric field that previously emanated from distal fringe surface 712C and entered second fringe electrode 714 is increased since less of the electric field emanating from distal fringe surface 712C enters pointing element 5' when coupling between fringe sensor 710 and pointing element 5' is reduced. If pointing element 5' is removed from the vicinity of fringe sensor 710 altogether, $C_{fringe}$ may return to $C_{f,nom}$, as represented by the end of time, $t_{f6}$, in FIG. 23F. Absent some other indicator (e.g. historical data, information from some other sensor and/or the like), it may be challenging to use the capacitance $C_{fringe}$ of fringe sensor 710 alone to reliably discriminate between the Scenarios of FIGS. 23D and 23E. However, as discussed above, the Scenario of FIGS. 23D and 23E can be discriminated using the capacitance $C_{overlap}$ of overlap sensor 750—see below discussion of FIGS. 26J and 26K, which describe the response of the capacitance $C_{overlap}$ of overlap sensor 750 in similar Scenarios to those of FIGS. 23D and 23E.

FIG. 23G represents when cluster sensor unit 700 is being stretched in the X and/or Y direction (stretched fringe sensor 710 may be referred to herein as fringe sensor 710'). With such stretching, the surface areas of the distal and proximate surfaces of the fringe electrodes increase. For example, in the case of the illustrated embodiment of FIGS. 20, 21A and 21B, the outer diameter of, $d_{1,outer}'$, of first fringe electrode 712' and the outer diameter, $d_{2,outer}'$, of second fringe electrode 714' are greater than the outer diameter of, $d_{1,outer}$, of first fringe electrode 712 and the outer diameter, $d_{2,outer}$, of second fringe electrode 714. The FIG. 23G Scenario is represented by time, $t_{f7}$, in FIG. 23L. As can be seen from FIG. 23L, as fringe sensor 710' is stretched, $C_{fringe}$ remains substantially constant at or near $C_{f,nom}$ or may increase slightly to $C_{f,stretched}$ (e.g., $C_{f,stretched}$ may represent a change of less than 3% of $C_{fringe}$ in some embodiments, although the percentage change may depend on additional factors such as the elasticity of first and second fringe electrodes 712, 714). In some embodiments, $C_{fringe}$ may remain substantially constant at or near $C_{f,nom}$ since first fringe electrode 712 does not overlap (or has negligible overlap) with second fringe electrode 714 in the Z direction. In some embodiments, stretching of fringe sensor 710 may increase the Z direction overlap between first fringe electrode 712 and second fringe electrode 714, thereby causing a small increase in $C_{fringe}$ to $C_{f,stretched}$. In some embodiments, the Z direction spacing between first fringe electrode 712 and second fringe electrode 714 may decrease, thereby causing a small increase in $C_{fringe}$ to $C_{f,stretched}$.

FIG. 23H represents stretched fringe sensor 710' as pointing element 5' begins to approach cluster sensor unit 700. The FIG. 23H Scenario is represented by time, $t_{f8}$, in FIG. 23L. As can be seen from FIG. 23L, $C_{fringe}$ decreases as pointing element 5' approaches fringe sensor 710'. In particular, $C_{fringe}$ decreases outside of a threshold range around the nominal fringe capacitance, $C_{f,nom}$ (i.e. decreases below $C_{f,threshold}$). As discussed above in connection with FIG. 23B, this decrease in $C_{fringe}$ occurs since pointing element 5' acts as a third electrode, which capacitively couples to fringe sensor 710', reducing the coupling between first and second fringe electrodes 712', 714'. In particular, the portion of the electric field that previously emanated from distal fringe surface 712C' and entered second fringe electrode 714 is decreased since at least some of this electric field emanating from distal fringe surface 712C' enters pointing element 5' when pointing element 5' couples with fringe sensor 710'. The coupling between first fringe electrode 712' and point element 5' is represented by field lines 720" emanating from distal fringe surface 712C' and leading to pointing element 5'. As pointing element 5' approaches stretched cluster sensor unit 700, some of the electric field emanating from (or into depending on polarity) first distal fringe surface 712C' of first electrode 712' terminates (or starts depending on polarity) in pointing element 5', rather than second electrode 714'. As discussed above, fringe sensor 710 preferably has a high FSFR and correspondingly high distal flux ($\Phi_{distal,fringe}$), which makes fringe sensor 710 particularly sensitive to this effect caused by the proximity of pointing element 5'. In particular, the capacitance $C_{fringe}$ of fringe sensor 710 may be relatively more sensitive than the capacitance $C_{overlap}$ of its corresponding overlap sensor 750 to this effect caused by the proximity of pointing element 5' to cluster sensor 700.

Figure 23L:
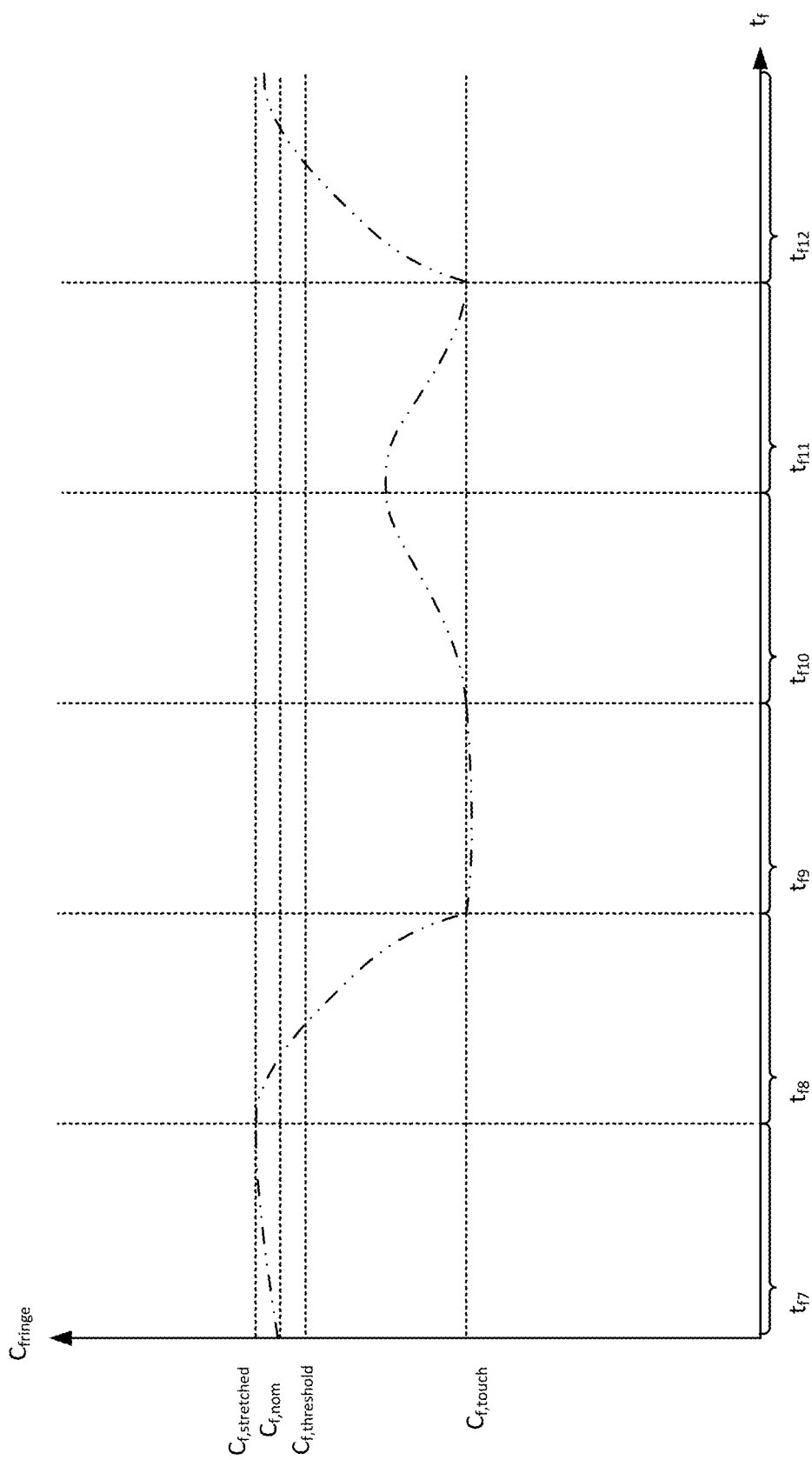

FIG. 23I represents stretched fringe sensor 710' as pointing element 5' touches stretched cluster sensor unit 700 without applying contact force on fringe sensor 710'. The FIG. 23I Scenario is represented by time, $t_{f9}$, in FIG. 23L. As can be seen in FIG. 23L, $C_{fringe}$ reaches $C_{f,touch}$. Again, this reduction is due to pointing element 5' acting as a third electrode, which capacitively couples to fringe sensor 710', thereby reducing the coupling between first and second fringe electrodes 712', 714'. In particular, the portion of the electric field that previously emanated from distal fringe surface 712C' and entered second fringe electrode 714 is decreased since at least some of this electric field emanating from distal fringe surface 712C' enters pointing element 5' when pointing element 5' couples with fringe sensor 710'. The difference between the reaction of the capacitance $C_{fringe}$ to the Scenario of FIG. 23H and the Scenario of FIG. 23I may be a difference of degree and may involve configurable thresholds $C_{f,threshold}$ and $C_{f,touch}$.

FIG. 23J represents stretched fringe sensor 710' as pointing element 5' applies contact force to stretched cluster sensor unit 700. In FIG. 23J, first fringe electrode 712' is spaced apart in the Z direction from second fringe electrode 714' by a spacing 726'. Because fringe sensor 710 is deformable and fabricated from deformable materials, spacing 726' is less than spacing 726. In other words, by applying contact forces to stretched fringe sensor 710', pointing element 5' causes first and second fringe electrodes 712', 714' to be closer to one another. The FIG. 23J Scenario is represented by time, $t_{f9}$, in FIG. 23F. As can be seen from FIG. 23F, $C_{fringe}$ increases as the amount of contact on fringe sensor 710 increases. This increase in $C_{fringe}$ can be attributed to a reduction in the distance between first and second fringe electrodes 712', 714', since capacitance is inversely proportional to this spacing.

As the contact force applied by pointing element 5' is reduced, spacing 726' grows and begins to approach spacing 726. This Scenario is represented in FIG. 23F as time, $t_{f,11}$. As can be seen from FIG. 23F, $C_{fringe}$ decreases as the amount of contact force on fringe sensor 710' decreases. This decrease in $C_{fringe}$ can be attributed to an increase in the distance between first and second fringe electrodes 712, 714, since capacitance is inversely proportional to this spacing.

FIG. 23K represents stretched fringe sensor 710' as pointing element 5' is retracted from stretched cluster sensor unit 700. The FIG. 23K Scenario is represented by time, $t_{f,12}$, in FIG. 23L. As can be seen in FIG. 23L, $C_{fringe}$ may increase as pointing element 5' is retracted. This increase in capacitance may be due to a reduction in the coupling between pointing element 5' and stretched fringe sensor 710', thereby allowing the coupling between first and second fringe electrodes 712', 714' to increase. In particular, the portion of the electric field that previously emanated from distal fringe surface 712C' and entered second fringe electrode 714 is increased since less of the electric field emanating from distal fringe surface 712C' enters pointing element 5' when coupling between fringe sensor 710' and pointing element 5' is reduced. If pointing element is removed from the vicinity of fringe sensor 710' altogether, $C_{fringe}$ may return to $C_{f,stretched}$, as represented by the end of time, $t_{f,12}$, in FIG. 23L.

FIGS. 24, 25A and 25B depict one exemplary embodiment of an overlap sensor 750 suitable for use with the FIG. 19 cluster sensor unit 700. Overlap sensor 750 has an overlap capacitance, $C_{overlap}$. Overlap sensor 750 comprises a first overlap electrode 752 and a second overlap electrode 754. First overlap electrode 752 extends in the X direction and the Y direction. Second overlap electrode 754 also extends in the X direction and the Y direction. First and second electrodes 752, 754 planes are spaced apart in the Z direction by a Z direction spacing 766, as depicted in FIG. 25A.

As best seen from FIG. 24, first overlap electrode 752 of the illustrated embodiment has an XY-plane cross-sectional shape like a rectangle (or more particularly, a square) having an X direction dimension $X_1$ and a Y direction dimension $Y_1$. $X_1$ may be equal to $Y_1$, although this is not required. Similarly, second overlap electrode 754 has an XY-plane cross-sectional shape like a rectangle (or more particularly, a square) having an X direction dimension $X_2$ and a Y direction dimension $Y_2$. $X_2$ may be equal to $Y_2$, although this is not required. In some embodiments, $X_1$ is equal to $X_2$ and $Y_1$ is equal to $Y_2$. To facilitate showing of second overlap electrode 754, FIGS. 18, 19 and 24 have been drawn such that $X_2$ is greater than $X_1$ and $Y_2$ is greater than $Y_1$. Although spaced apart in the Z direction, first overlap electrode 752 and second overlap electrode 754 may be concentric (i.e. a Z direction line may pass through an XY-plane center of first overlap electrode 752 and an XY-plane center of second overlap electrode 754). This is not mandatory. In some embodiments, the XY-plane cross-sectional shapes of first and second overlap electrodes 752, 754 need not be rectangular or square and may have other XY-plane cross-sectional shapes. For example, in some embodiments, the XY-plane cross-sectional shapes of first and second overlap electrodes 752, 754 may comprise a circular shape, an elliptical shape, a polygonal shape and/or the like. Further, it is not necessary that the shape of second overlap electrode 754 match the shape of first overlap electrode 752. For example, first overlap electrode 752 may have a rectangular shape in XY-plane cross-section and second overlap electrode 754 may have a circular shape in XY-plane cross-section.

As can be seen in FIGS. 25A and 25B, first overlap electrode 752 comprises a first distal overlap surface 752A and a first proximate overlap surface 752B. In the illustrated view of FIG. 25A, first proximate overlap surface 752B faces in the negative-Z direction (i.e. generally towards second overlap electrode 754) while first distal overlap surface 752A faces in the positive-Z direction (i.e. generally away from second overlap electrode 754). Similarly, second overlap electrode 714 comprises a second distal overlap surface 754B and a second proximate overlap surface 754A. Second proximate overlap surface 754A faces in the positive-Z direction (i.e. generally towards first overlap electrode 752) while second distal overlap surface 754B faces in the negative-Z direction (i.e. generally away from first overlap electrode 752).

First overlap electrode 752 may be spaced apart from second overlap electrode 754 by a dielectric 753. Dielectric 753 may contact both of first proximate overlap surface 752A and second proximate overlap surface 754A and may occupy the volume therebetween. Dielectric 753 may be similar to and have any of the characteristics of dielectric 413 described herein. In some embodiments, dielectric 753 surrounds first and second overlap electrodes 752, 754, as will be discussed further herein.

A circuit may be connected to first and second overlap traces 756, 758 (FIG. 24), such that a voltage may be applied across first and second overlap electrodes 752, 754 to produce an overlap sensor electric field, $\vec{E}_{overlap}$, $_{overlap}$, in the vicinity of overlap sensor 750. FIG. 25B depicts some overlap field lines 760 representative of the direction of overlap electric field, $\vec{E}_{overlap}$. $_{overlap}$. One skilled in the art would understand that overlap field lines 760 are not drawn to scale and do not represent the entirety of the overlap sensor electric field, $\vec{E}_{overlap}$, but instead are merely provided to illustrate concepts that are described herein.

The electric field $\vec{E}_{overlap}$ associated with any overlap voltage applied between first and second overlap electrodes 752, 754 comprises a flux characteristic referred to herein as the distal overlap flux, $\Phi_{distal,overlap}$ which comprises the flux of the overlap electric field $\vec{E}_{overlap}$ into (or out of depending on polarity) first distal overlap surface 752A and/or into (or out of) a notional plane spaced infinitesimally apart from first distal overlap surface 752A in a direction away from second overlap electrode 754 (e.g. spaced infinitesimally apart from first distal overlap surface 752A in a positive Z direction). The electric field $\vec{E}_{overlap}$ associated with any overlap voltage applied between first and second overlap electrodes 752, 754 also comprises a flux characteristic referred to herein as the proximate overlap flux, $\Phi_{prox,overlap}$ which comprises the flux of the overlap electric field $\vec{E}_{overlap}$ into (or out of depending on polarity) first proximate overlap surface 752B and/or a notional plane spaced infinitesimally apart from first proximate overlap surface 752B in a direction toward second overlap electrode 754 (e.g. spaced infinitesimally apart from first proximate overlap surface 752B in a negative Z direction).

Like overlap sensor 450 described above, the electric field, $\vec{E}_{overlap}$ of overlap sensor 750, can be characterized by an overlap sensor flux ratio ("OSFR"). The overlap sensor flux ratio may be defined by:

$$OSFR = \frac{\Phi_{distal,overlap}}{\Phi_{prox,overlap}}$$

As the OSFR decreases, the sensitivity of overlap sensor 750 to touching/pressure applied by pointing element 5' (as opposed to proximity of pointing element 5' to overlap sensor 750 without touching) increases. Consequently, there is desire for the electrodes 752, 754 of overlap sensor 750 to be shaped to provide relatively low OSFR and, in particular, to provide a OSFR that is less than the FSFR of fringe sensor 710 (FIG. 19) of cluster sensor 700.

Figure 26F:
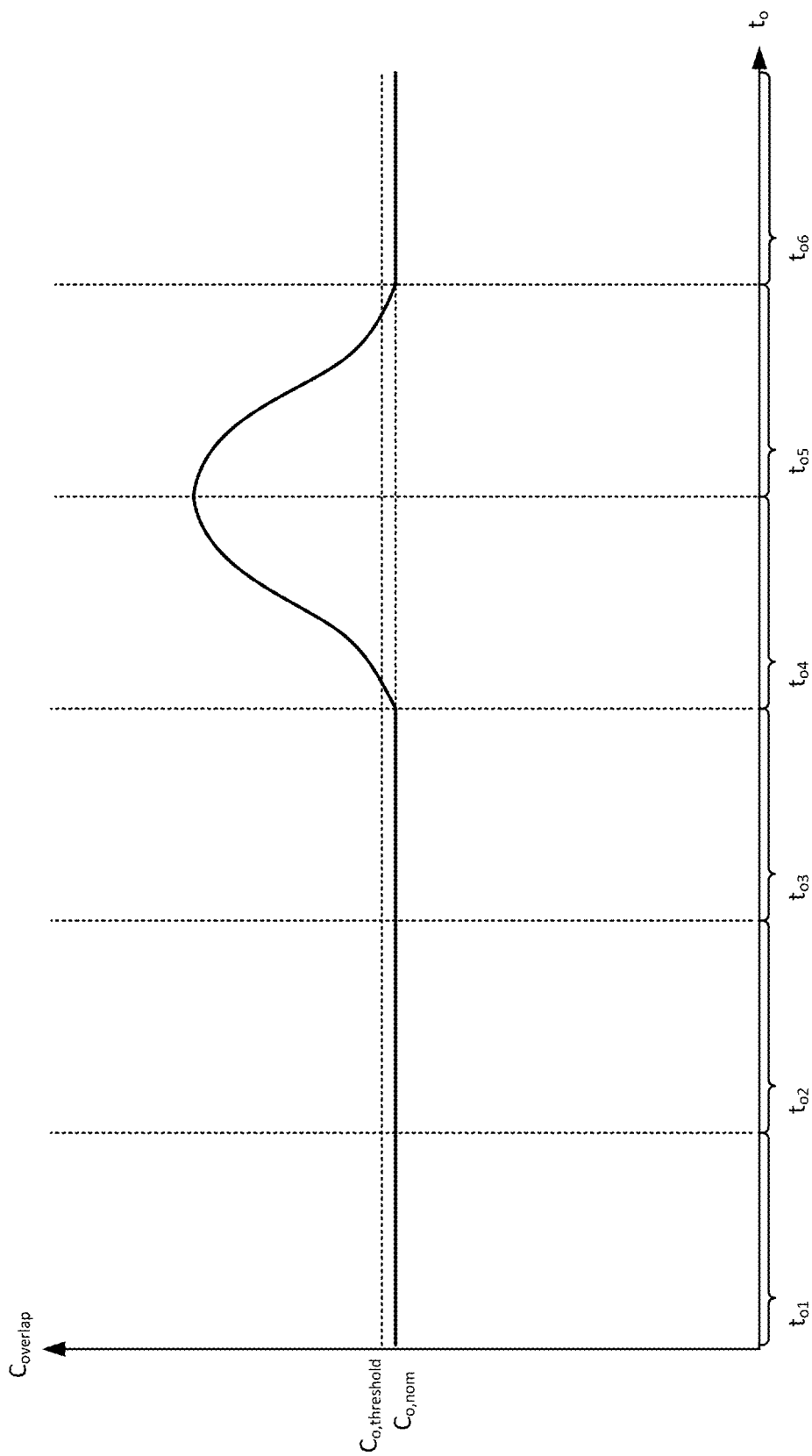
FIGS. 26F and 26L depict graphs of capacitance as a function of time for sensor interacting with a pointing element according to FIGS. 26A to 26E and 26G to 26K.

FIG. 26A represents overlap sensor 750 when pointing element 5' is not proximate to cluster sensor unit 700 and $C_{overlap}$ is within a threshold range of $C_{o,nom}$. Other than minor fluctuations in $C_{overlap}$ due to interference, error or the like, $C_{overlap}$ remains substantially constant within a threshold range around $C_{o,nom}$ during steady state. During the FIG. 26A Scenario, $C_{overlap}$ does not increase above $C_{o,threshold}$. $C_{o,threshold}$ may be any suitable threshold. For example, in some embodiments, $C_{o,threshold}$ may be 3%, 2% or 1% lower than $C_{o,nom}$. The FIG. 26A Scenario is represented by time, $t_{o1}$, in FIG. 26F.

FIG. 26B represents overlap sensor 750 as pointing element 5' begins to approach cluster sensor unit 700. The FIG. 26B Scenario is represented by time, $t_{o2}$, in FIG. 26F. As can be seen in FIG. 26F, $C_{overlap}$ does not vary above $C_{o,threshold}$ during $t_{o2}$. Unlike $C_{fringe}$ discussed above, $C_{overlap}$ remains relatively constant as pointing element 5' approaches overlap sensor 750, since overlap sensor 750 has a relatively low OSFR. In particular, overlap sensor 750 has relatively low distal flux ($\Phi_{distal,overlap}$) as compared to its proximate flux ($\Phi_{prox,overlap}$). While some of the electric field of overlap sensor 750 may be diverted from overlap capacitor 750 by the presence of pointing element 5 (e.g. overlap sensor couples to pointing element 5'), the proportion of distal flux ($\Phi_{distal,overlap}$), as compared to proximate flux ($\Phi_{prox,overlap}$), of overlap sensor 750 is so small that the overall capacitance $C_{overlap}$ of overlap sensor 750 is relatively unaffected by the proximity of pointing element 5'.

FIG. 26C represents overlap sensor 750 as pointing element 5' touches cluster sensor unit 700 without applying any pressure or force on cluster sensor unit 700. The FIG. 26C Scenario is represented by time, $t_{o3}$, in FIG. 26F. As can be seen in FIG. 26F, $C_{overlap}$ does not vary more than a threshold amount from $C_{o,nom}$ during the FIG. 26C Scenario, and in particular does not rise above $C_{o,threshold}$ during the FIG. 26C Scenario. $C_{overlap}$ remains relatively constant as pointing element 5' touches cluster sensor 700 (without applying any contact force thereon), since overlap sensor 750 has a relatively low OSFR and, consequently, is relatively unaffected by the proximity and even zero force contact of pointing element 5', as discussed above. In practice, $t_{o3}$ would be a relatively short time period, since it is not practical to touch something without applying any contact force on it. Absent some other indicator (e.g. historical data, information from some other sensor and/or the like), it may be challenging to use the capacitance $C_{overlap}$ of overlap sensor 750 alone to reliably discriminate between the Scenarios of FIGS. 26A, 26B and 26C. However, as discussed above, the Scenario of FIGS. 26A, 26B and 26C can be discriminated using the capacitance $C_{fringe}$ of fringe sensor 710—see above discussion of FIGS. 23A, 23B and 23C, which describe the response of the capacitance $C_{fringe}$ of fringe sensor 710 in similar Scenarios to those of FIGS. 26A, 26B, 26C.

FIG. 26D represents overlap sensor 750 as pointing element 5' is in contact with and applies increasing pressure or contact force to cluster sensor unit 700 in the negative Z direction. In FIG. 26D, first overlap electrode 752 is spaced apart in the Z direction from second overlap electrode 754 by a spacing 766'. Because overlap sensor 750 is deformable and fabricated from deformable materials, spacing 766' is less than spacing 766 (see FIG. 25A). In other words, by applying contact force to overlap sensor 750, pointing element 5' causes first and second overlap electrodes 752, 754 to be closer to one another. The FIG. 26D Scenario is represented by time, $t_{o4}$, in FIG. 26F. As can be seen from FIG. 26F, $C_{overlap}$ increases as the amount of contact force on overlap sensor 750 increases. This increase in $C_{overlap}$ can be attributed to a reduction in the distance between first and second overlap electrodes 752, 754, since capacitance is inversely proportional to this spacing. Accordingly, by measuring the capacitance, $C_{overlap}$, of overlap sensor 750, a suitably configured processor (see processor 585 of FIG. 18) could detect contact force being applied to overlap sensor 750 by pointing element 5' by monitoring for an increase of $C_{overlap}$ from $C_{o,nom}$ by an amount greater than $C_{o,threshold}$. Such a processor could also detect increasing contact force being applied to overlap sensor 750 by pointing element 5' by observing increasing overlap capacitance $C_{overlap}$.

As the contact force applied by pointing element 5' in the negative Z direction is reduced, spacing 766' grows and begins to approach spacing 766. This Scenario is represented by time, $t_{o5}$, in FIG. 26F. As can be seen from FIG. 26F, $C_{overlap}$ decreases as the amount of contact force on overlap sensor 750 decreases. This decrease in $C_{overlap}$ can be attributed to an increase in the distance between first and second contact electrodes 752, 754, since capacitance is inversely proportional to this spacing. Accordingly, by measuring the capacitance, $C_{overlap}$, of overlap sensor 750, a suitably configured processor (see processor 585 of FIG. 18) could detect a decrease in contact force on overlap sensor 750 by pointing element 5'.

At the conclusion of $t_{o5}$ in the illustrated example Scenarios of FIG. 26F, pointing element 5' again returns to the situation where pointing element 5' is in contact with cluster sensor unit 700, but is not applying contact force to cluster sensor unit 700. This circumstance is similar to the circumstance during $t_{o3}$. In particular, $C_{overlap}$ may fall below $C_{o,threshold}$. When the contact force applied by pointing element 5' becomes zero, $C_{overlap}$ returns to within a threshold vicinity of $C_{o,nom}$.

FIG. 26E represents overlap sensor 750 as pointing element 5' is retracted (moves away) from cluster sensor unit 700. The FIG. 26E Scenario is represented by time, $t_{o6}$, in FIG. 26F. As can be seen in FIG. 26F, $C_{overlap}$ remains within a threshold vicinity of $C_{o,nom}$ during $t_{o6}$. $C_{overlap}$ remains relatively constant as pointing element 5' moves away from overlap sensor 750, since overlap sensor 750 has a relatively low OSFR. In particular, overlap sensor 750 has relatively low distal flux ($\Phi_{distal,overlap}$) as compared to its proximate flux ($\Phi_{prox,overlap}$). While some of the electric field of overlap sensor 750 may be exchanged between overlap capacitor 750 and pointing element 5', the proportion of distal flux ($\Phi_{distal,overlap}$), as compared to proximate flux ($\Phi_{prox,overlap}$), of overlap sensor 750 is so small that the overall capacitance $C_{overlap}$ of overlap sensor 750 is relatively unaffected by the proximity of pointing element 5'.

FIG. 26G represents overlap sensor 750 when cluster sensor unit 700 is being stretched in the X and/or Y direction (stretched overlap sensor 750 may be referred to herein as overlap sensor 750'). With such stretching, the surface areas of the distal and proximate surfaces of the overlap electrodes increase. For example, in the case of the illustrated embodiment of 24, 25A and 25B, the X direction dimension, $X_1'$, of first overlap electrode 752' and the X direction dimension, $X_2'$, of second overlap electrode 754' are greater than the X direction dimension, $X_1$, of first overlap electrode 752 and the X direction dimension, $X_2$, of second overlap electrode 754. The FIG. 26G Scenario is represented by time, $t_{o7}$, in FIG. 26L (where $t_{o1}$ represents sensor 750 as in the FIG. 26A Scenario). As can be seen from FIG. 26L, $C_{overlap}$ increases to $C_{o,stretched}$ as the amount of stretch of overlap sensor 750' increases. This increase in $C_{overlap}$ can be attributed to an increase in the overlapping surface areas of proximate overlap surface 752B' and proximate overlap surface 754A', since the capacitance, $C_{overlap}$, of overlap sensor 750' is directly proportional to the overlapping surface areas of proximate overlap surface 752B' and proximate overlap surface 754A'. In some embodiments, the Z direction spacing between first overlap electrode 752 and second overlap electrode 754 may decrease, thereby contributing in the increase of $C_{overlap}$. Accordingly, by measuring $C_{overlap}$, a suitably configured processor (see processor 585 of FIG. 18) can detect an increase in stretch of overlap sensor 750, 750' by detecting an increase of $C_{overlap}$ to a level $C_{o,stretched}$ that is greater than $C_{o,threshold}$. Stretch may be discriminated from contact force, since the capacitance, $C_{fringe}$, of fringe sensor 710 does not increase substantially during stretching (see description of FIG. 23G above). Stretch may also be discriminated from contact force when a plurality of overlap sensors 750 are employed (as part of cluster sensor units 700 or alone) since multiple overlap sensors 750 will experience stretch and exhibit an increase of $C_{overlap}$ to a level $C_{o,stretched}$ that is greater than $C_{o,threshold}$ while contact force would lead to fewer (e.g. one) overlap sensor 750 exhibiting an increase in capacitance, $C_{overlap}$.

Figure 26L:
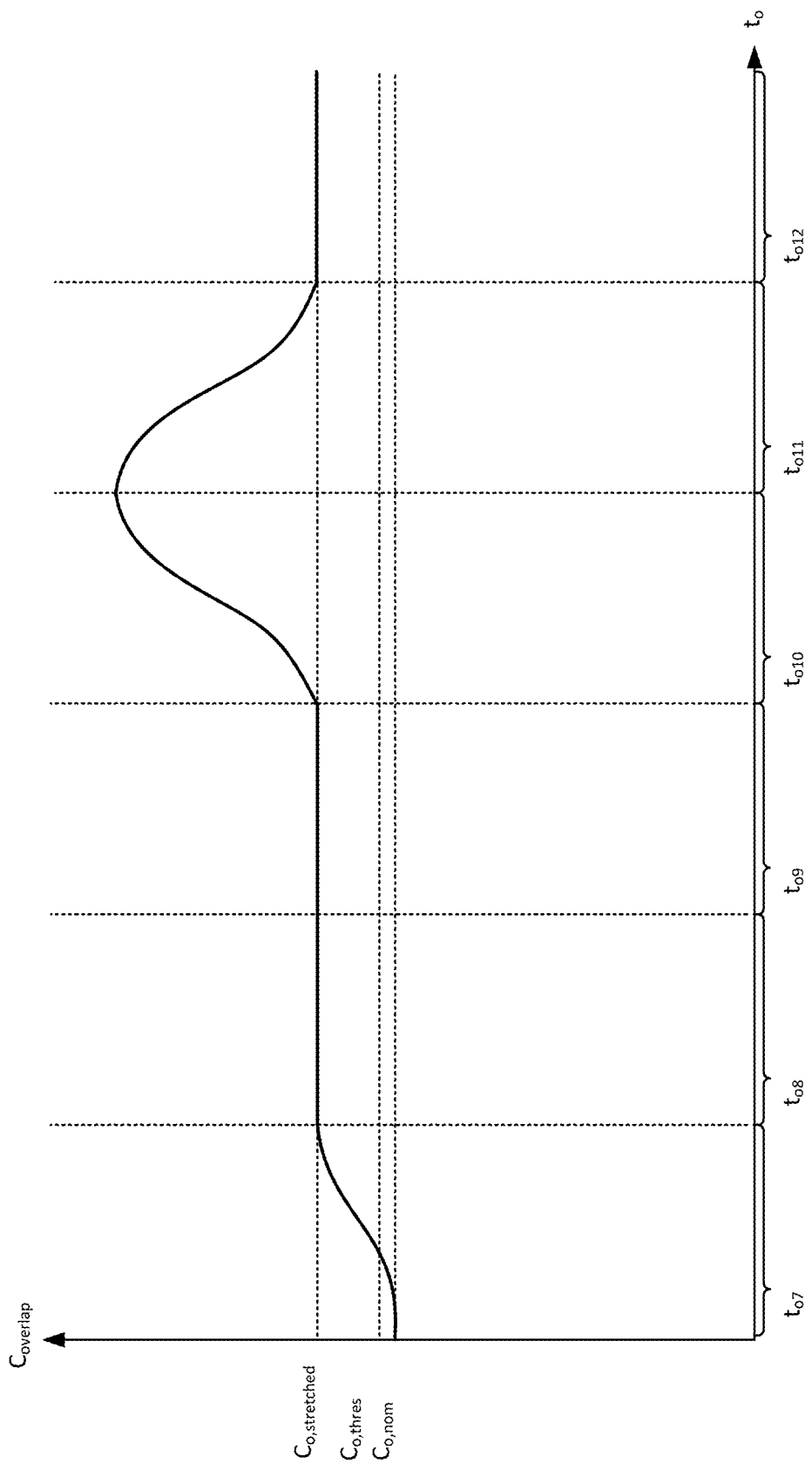

FIG. 26H represents stretched overlap sensor 750' as pointing element 5' approaches stretched overlap sensor 750'. The FIG. 26H Scenario is represented by time, $t_{o8}$, in FIG. 26L. As can be seen in FIG. 26L, $C_{overlap}$ remains relatively constant within a threshold vicinity of $C_{o,stretched}$ as pointing element 5' approaches stretched overlap sensor 750'. Unlike $C_{fringe}$ discussed above, $C_{overlap}$ remains relatively constant as pointing element 5' approaches stretched overlap sensor 750', since stretched overlap sensor 750' has a relatively low OSFR. In particular, stretched overlap sensor 50' has relatively low distal flux ($\Phi_{distal,overlap}$) as compared to its proximate flux ($\Phi_{prox,overlap}$). While some of the electric field of overlap sensor 750 may be diverted from stretched overlap sensor 750' by the presence of pointing element 5', the proportion of distal flux ($\Phi_{distal,overlap}$), as compared to proximate flux ($\Phi_{prox,overlap}$), of stretched overlap sensor 750' is so small that the overall capacitance $C_{overlap}$ of stretched overlap sensor 750' is relatively unaffected by the proximity of pointing element 5'.

FIG. 26I represents stretched overlap sensor 750' as pointing element 5' touches stretched cluster sensor unit 700 without applying any pressure or contact force on stretched cluster sensor unit 700. The FIG. 26I Scenario is represented by time, $t_{o9}$, in FIG. 26L. As can be seen in FIG. 26L, $C_{overlap}$ remains relatively constant within a threshold vicinity of $C_{o,stretched}$ during the FIG. 26I Scenario, where pointing element 5' contact cluster sensor unit 700 without applying any contact force thereon. $C_{overlap}$ remains relatively constant as pointing element 5' touches cluster sensor 700 (without applying any contact force or pressure thereon), since overlap sensor 750 has a relatively low OSFR and, consequently, is relatively unaffected by the proximity and even zero force contact of pointing element 5', as discussed above. In practice, $t_{o9}$ would be a relatively short time period, since it is not practical to touch something without applying any contact force on it.

FIG. 26J represents stretched overlap sensor 750' as pointing element 5' is in contact with and applies pressure or contact force to stretched cluster sensor unit 700. In FIG. 26J, first overlap electrode 752' is spaced apart in the Z direction from second overlap electrode 754' by a spacing 766". Because overlap sensor 750 is deformable and fabricated from deformable materials, spacing 766" is less than spacing 766 (see FIG. 25A). In other words, by applying contact force to stretched overlap sensor 750', pointing element 5' causes first and second overlap electrodes 752', 754' to be closer to one another. The FIG. 26J Scenario is represented by time, $t_{o10}$, in FIG. 26L. As can be seen from FIG. 26L, $C_{overlap}$ increases as the amount of contact force on stretched overlap sensor 750' increases. This increase in $C_{overlap}$ can be attributed to a reduction in the distance between first and second overlap electrodes 752', 754', since capacitance is inversely proportional to this spacing. Accordingly, by measuring the capacitance, $C_{overlap}$, of stretched overlap sensor 750', a suitably configured processor (see processor 585 of FIG. 18) could detect contact force being applied to stretched overlap sensor 750' by pointing element 5' by monitoring for an increase of $C_{overlap}$ from $C_{o,stretched}$ by an amount greater than a suitable threshold. Such a processor could also detect increasing contact force being applied to stretched overlap sensor 750' by pointing element 5' by observing increasing overlap capacitance $C_{overlap}$.

As the contact force applied by pointing element 5' is reduced, spacing 766' grows and begins to approach spacing 766. This Scenario is represented by time, $t_{o11}$, in FIG. 26L. As can be seen from FIG. 26L, $C_{overlap}$ decreases as the amount of contact force on stretched overlap sensor 750' decreases. This decrease in $C_{overlap}$ can be attributed to an increase in the distance between first and second overlap electrodes 752', 754', since capacitance is inversely proportional to this spacing. Accordingly, by measuring the capacitance, $C_{overlap}$, of stretched overlap sensor 750', a suitably configured processor (see processor 585 of FIG. 18) could detect a decrease in contact force on stretched overlap sensor 750' by pointing element 5'.

At the conclusion of $t_{o11}$ in the illustrated example Scenarios of FIG. 26L, pointing element 5' again returns to the situation where pointing element 5' is in contact with stretched cluster sensor unit 700, but is not applying contact force to stretched cluster sensor unit 700. This circumstance is similar to the circumstance during $t_{o9}$. When the contact force applied by pointing element 5' becomes zero, $C_{overlap}$ returns to within a threshold vicinity of $C_{o,stretched}$.

FIG. 26K represents stretched overlap sensor 750' as pointing element 5' is retracted from stretched cluster sensor unit 700. The FIG. 26K Scenario is represented in FIG. 26L as time, $t_{o12}$. As can be seen from FIG. 26L, $C_{overlap}$ remains relatively constant within a threshold vicinity of $C_{o,stretched}$. $C_{overlap}$ remains relatively constant as pointing element 5 moves away from overlap sensor 750, since overlap sensor 750 has a relatively low OSFR. In particular, overlap sensor 750 has relatively low distal flux ($\Phi_{distal,overlap}$) as compared to its proximate flux ($\Phi_{prox,overlap}$). While some of the electric field of overlap sensor 750 may be exchanged between overlap capacitor 750 and pointing element 5', the proportion of distal flux ($\Phi_{distal,overlap}$), as compared to proximate flux ($\Phi_{prox,overlap}$), of overlap sensor 750 is so small that the overall capacitance $C_{overlap}$ of overlap sensor 750 is relatively unaffected by the proximity of pointing element 5'.

Figure 27A:
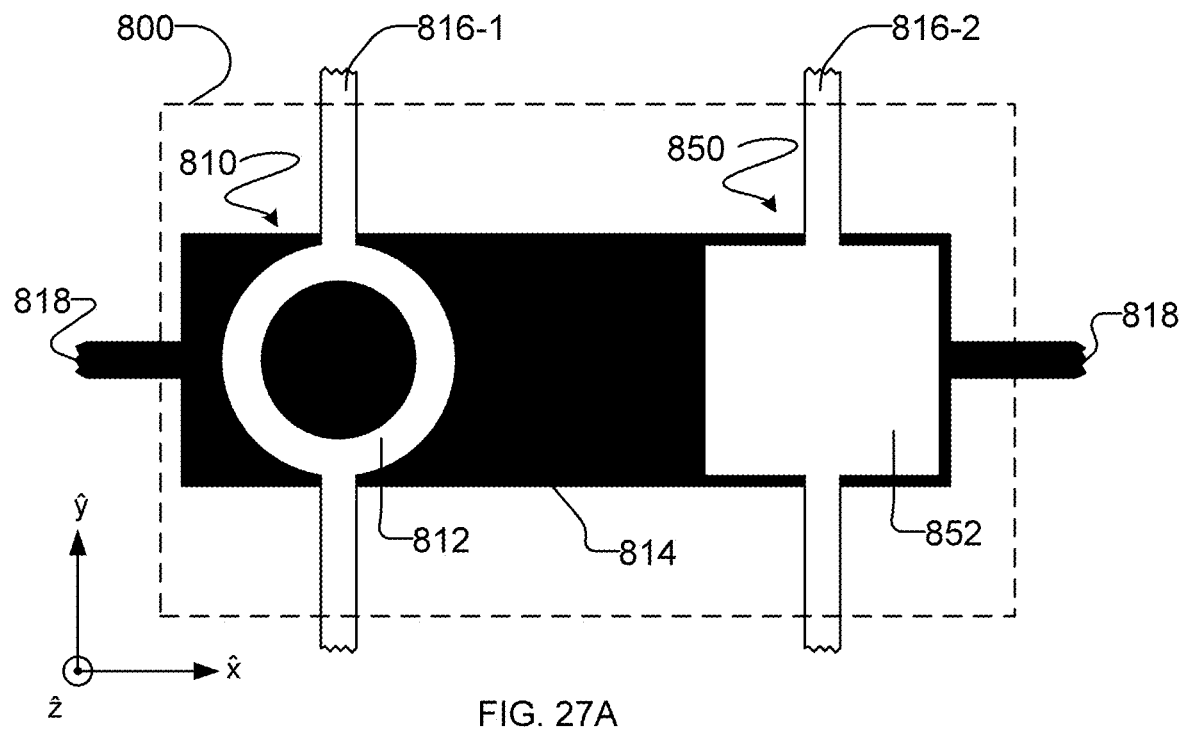
FIGS. 27A through 27C depict schematic plan views of sensors according to particular embodiments of the invention.

FIG. 27A depicts a cluster sensor 800 according to an exemplary embodiment of the invention. Cluster sensor 800 comprises a fringe sensor 810 and an overlap sensor 850. Cluster sensor 800 is substantially similar to cluster sensor 700, except that first fringe electrode 812 and first overlap electrode 852 share a second electrode 814 instead of having separate second fringe and second overlap electrodes as in cluster sensor 700.

Second electrode 814 may comprise any suitable shape in the XY plane. Second electrode 814 is spaced apart from first fringe electrode 812 and first overlap electrode 852 in the Z direction. In the illustrated embodiment, second electrode 814 is rectangular in shape. This is not necessary. Second electrode 814 may comprise a circular shape, an elliptical shape, a polygonal shape or an arbitrary shape which provides a suitably high FSFR for fringe sensor 810 and a suitably low OSFR for overlap sensor 850.

To measure the capacitance of fringe sensor 810, a voltage is applied across first fringe electrode 812 and second electrode 814, while column trace 816-2 is grounded or allowed to float. Similarly, to measure the capacitance of overlap sensor 850, a voltage is applied across first overlap electrode 852 and second electrode 814, while column trace 816-1 is grounded or allowed to float.

Cluster sensor 800 may be employed to determine a proximity, or pressure applied by pointing element 5' in substantially the same way as cluster sensors 400, 700 discussed above. That is, Scenarios A through L depicted in FIGS. 17 and 17A will have similar effects on the capacitances of fringe sensor 810 and overlap sensor 850 as would be the case for fringe sensor 410, 710 etc. and overlap sensor 450, 750, etc. as described herein.

Figure 27B:
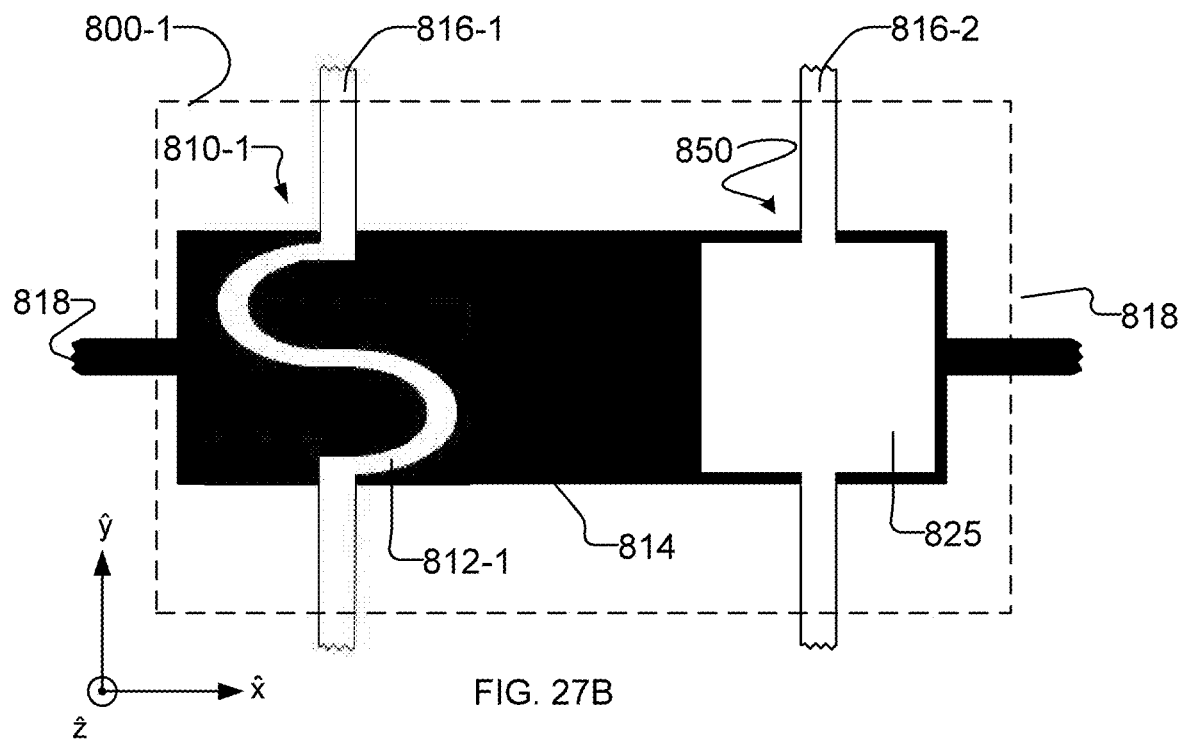

FIG. 27B depicts a cluster sensor 800-1 according to an exemplary embodiment of the invention. Cluster sensor 800 comprises a fringe sensor 810-1 and an overlap sensor 850. Cluster sensor 800-1 is substantially similar to cluster sensor 800, except that first fringe electrode 812-1 has a different XY plane shape than first fringe electrode 812. In particular, first fringe electrode 812-1 is substantially similar to first fringe electrode 712-1 (FIG. 22).

Cluster sensor 800-1 may be employed to determine a proximity, or pressure applied by pointing element 5' in substantially the same way as cluster sensors 400, 700 discussed above. That is, Scenarios A through L depicted in FIGS. 17 and 17A will have similar effects on the capacitances of fringe sensor 810-1 and overlap sensor 850 as would be the case for fringe sensor 410, 710 etc. and overlap sensor 450, 750, etc. as described herein.

Figure 27C:
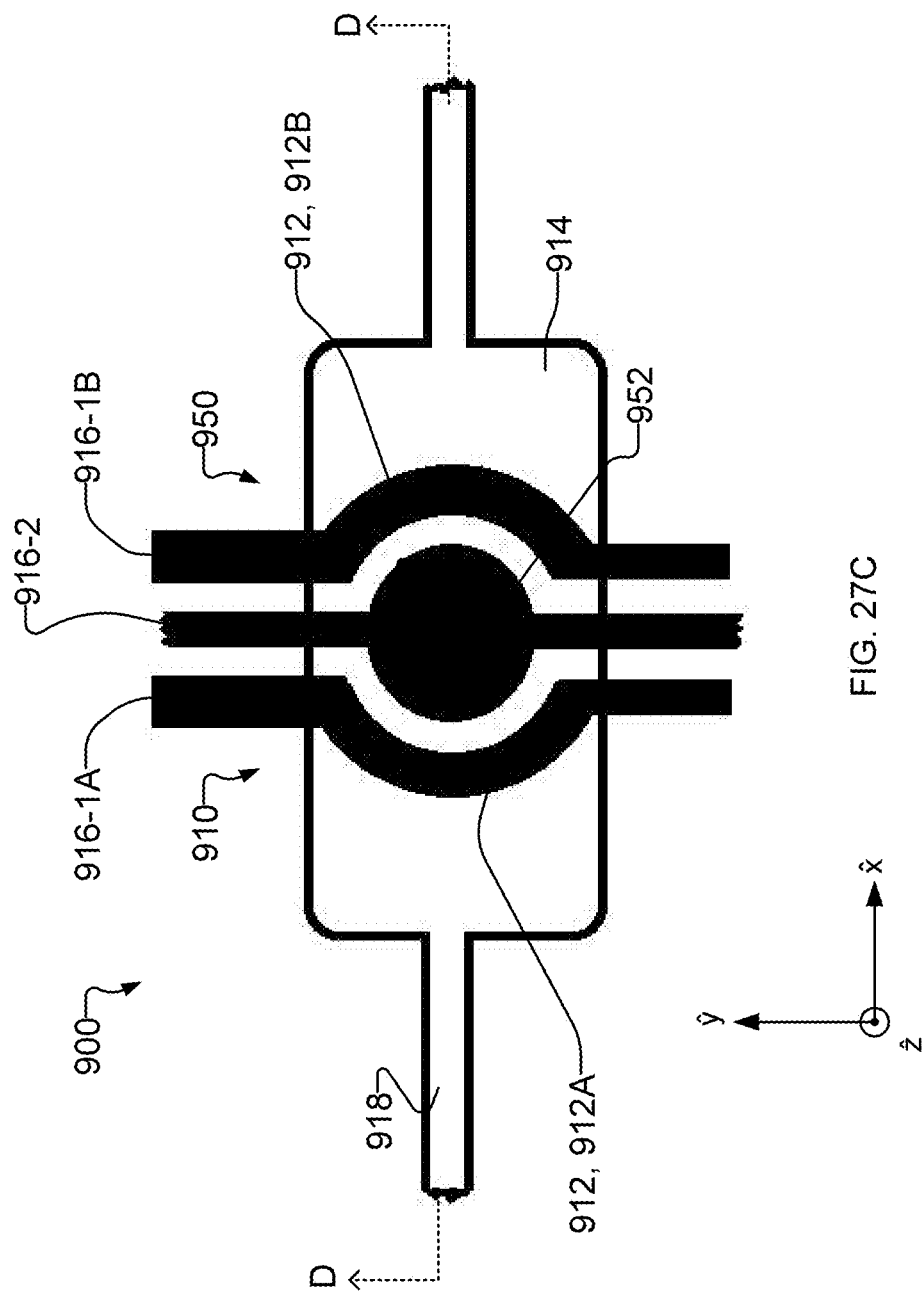

FIG. 27C depicts a cluster sensor 900 according to an exemplary embodiment of the invention. Cluster sensor 900 is similar in many respect to cluster sensor 800, except that instead of first fringe electrode 912 being spaced apart in the X direction from first overlap electrode 952 as are first fringe electrode 812 and first overlap electrode 852, first overlap electrode 952 is interposed within a space defined by spaced apart parts 912A, 912B of first fringe electrode 912, as depicted in FIG. 27C. Interposing first overlap electrode 952 within a space defined by parts 912A, 912B of first fringe electrode 912 may help to minimize the size (in the XY plane) of cluster sensor 900 relative to cluster sensor 400, 700, 800, etc.

As can be seen from FIG. 27C, first fringe electrode 912 is split into a first part 912A and a second part 912B. First and second parts 912A, 912B of first fringe electrode 912 may be connected by way of traces 916-1A, 916-1B. Traces 916-1A, 916-1B may be connected to one another (not shown in the illustrated view of FIG. 27C) by connectors that go over trace 916-2 of first overlap electrode 952 in the positive-Z direction (e.g. out of the page in FIG. 27C) or under trace 916-2 in the negative-Z direction (e.g. into the page in FIG. 27C), although this is not depicted. Accordingly, traces 916-1A, 916-1B act as a single trace and first and second parts 912A, 912B of first fringe electrode 912 act as a single first fringe electrode 912.

To measure the capacitance of fringe sensor 910, a voltage is applied across first fringe electrode 912 (via traces 916-1A, 916-1B) and second electrode 914 (via trace 918) while column trace 916-2 is grounded or allowed to float. Similarly, to measure the capacitance of overlap sensor 950, a voltage is applied across first overlap electrode 952 (via trace 916-2) and second electrode 914 (via trace 918) while traces 916-1A, 916-1B are grounded or allowed to float. This may be accomplished, for example, by using a suitably configured multiplexer.

In some embodiments, first fringe electrode 912 may interfere with the electric field of overlap sensor 950 and cause the capacitance of overlap sensor 950 to increase. To minimize the interference of first fringe electrode 912 on the capacitance of overlap sensor 950, first fringe electrode 912 may be grounded or otherwise set to the same voltage as second electrode 914 while measuring the capacitance, $C_{overlap}$, of overlap sensor 950.

Cluster sensor 900 may be employed to determine a proximity of, or pressure applied by pointing element 5' in substantially the same way as cluster sensors 400, 700 discussed above. That is, Scenarios A through L depicted in FIGS. 17 and 17A will have similar effects on the capacitances of fringe sensor 910 and overlap sensor 950 as compared to fringe sensor 410, 710 etc. and overlap sensor 450, 750, etc. described herein.

FIGS. 28A and 28B depict a sensor 1050 according to one exemplary aspect of the invention. Sensor 1050 may be employed for detecting and distinguishing between increasing and decreasing proximity of a pointing element, touch by a pointing element, change in contact force applied by a pointing element, stretching of sensor 1050, increasing and decreasing proximity of a pointing element while stretching sensor 1050, and touch and pressure applied by a pointing element while stretching sensor 1050.

As can be seen from FIG. 28B, sensor 1050 of the illustrated embodiment is similar in many respects to overlap sensor 750, as described herein, except that sensor 1050 comprises one or more gas bubbles 1015 arranged between first electrode 1052 and second electrode 1054. Gas bubble 1015 may comprise any suitable gas which has a higher compressibility than dielectric 1013, such as oxygen, carbon dioxide, air (some combination of nitrogen, oxygen, carbon dioxide, water vapor or the like), etc. In some embodiments, gas bubble 1015 is replaced with a volume of a non-gaseous dielectric material having a different compressibility than dielectric material 1013. In other embodiments, gas bubble 1015 is replaced by a plurality of gas bubbles spread through dielectric 1013 (e.g. dielectric 1013 comprises a porous material).

Like overlap sensor 750, first and second electrodes 1052, 1054 of the illustrated FIG. 28B embodiment each extend in an XY plane and are spaced apart in the Z direction by a spacing 1066. Although depicted as being rectangular/square, first and second electrodes 1052, 1054 may have any suitable XY plane cross sectional shape such as those described in connection with the electrodes of overlap sensor 750 (or any other sensor described herein). Like overlap sensor 750, first and second electrodes 1052, 1054 may be spaced apart and/or surrounded by a dielectric material 1013. Dielectric material 1013 may be similar to or the same as any dielectric material described herein such as dielectric material 713.

Unlike overlap sensor 750, first electrode 1052 is depicted as having an equal X dimension width as trace 1056 and second electrode 1054 is depicted as having an equal Y direction width as trace 1058. Although this may simplify manufacturing of sensor 1050, this is not required.

Like overlap sensor 750, sensor 1050 has a capacitance, C, and exhibits an electric field, $\vec{E}$. Electric field, $\vec{E}$ may exhibit properties similar to those of the electric fields of the fringe sensors and the overlap sensors described herein. For example, electric field, $\vec{E}$, may exhibit a distal flux, $\Phi_{distal}$ which comprises the flux of the electric field $\vec{E}$ into (or out of depending on polarity) first distal surface 1052A and/or into (or out of) a notional plane spaced infinitesimally apart from first distal surface 1052A in a direction away from second electrode 1054 (e.g. spaced infinitesimally apart from first distal surface 1052A in a positive Z direction). The electric field $\vec{E}$ associated with any voltage applied between first and second overlap electrodes 1052, 1054 also comprises a flux characteristic referred to herein as the proximate flux, $\Phi_{prox}$ which comprises the flux of the electric field $\vec{E}$ into (or out of depending on polarity) first proximate surface 1052B and/or a notional plane spaced infinitesimally apart from first proximate surface 1052B in a direction toward second electrode 1054 (e.g. spaced infinitesimally apart from first proximate surface 1052B in a negative Z direction).

By altering the ratio of distal flux, $\Phi_{distal}$ to proximate flux, $\Phi_{prox}$, it may be possible to alter the relative sensitivity of sensor 1050 to proximity of a pointing element 5' and pressure by a pointing element 5'. For example, by raising the amount distal flux, $\Phi_{distal}$, relative to the amount of proximate flux, $\Phi_{prox}$, sensor 1050 becomes relatively more sensitive to proximity. Conversely, by lowering the amount distal flux, $\Phi_{distal}$, relative to the amount of proximate flux, $\Phi_{prox}$, sensor 1050 becomes relatively more sensitive to pressure, as discussed above.

Figure 28C:
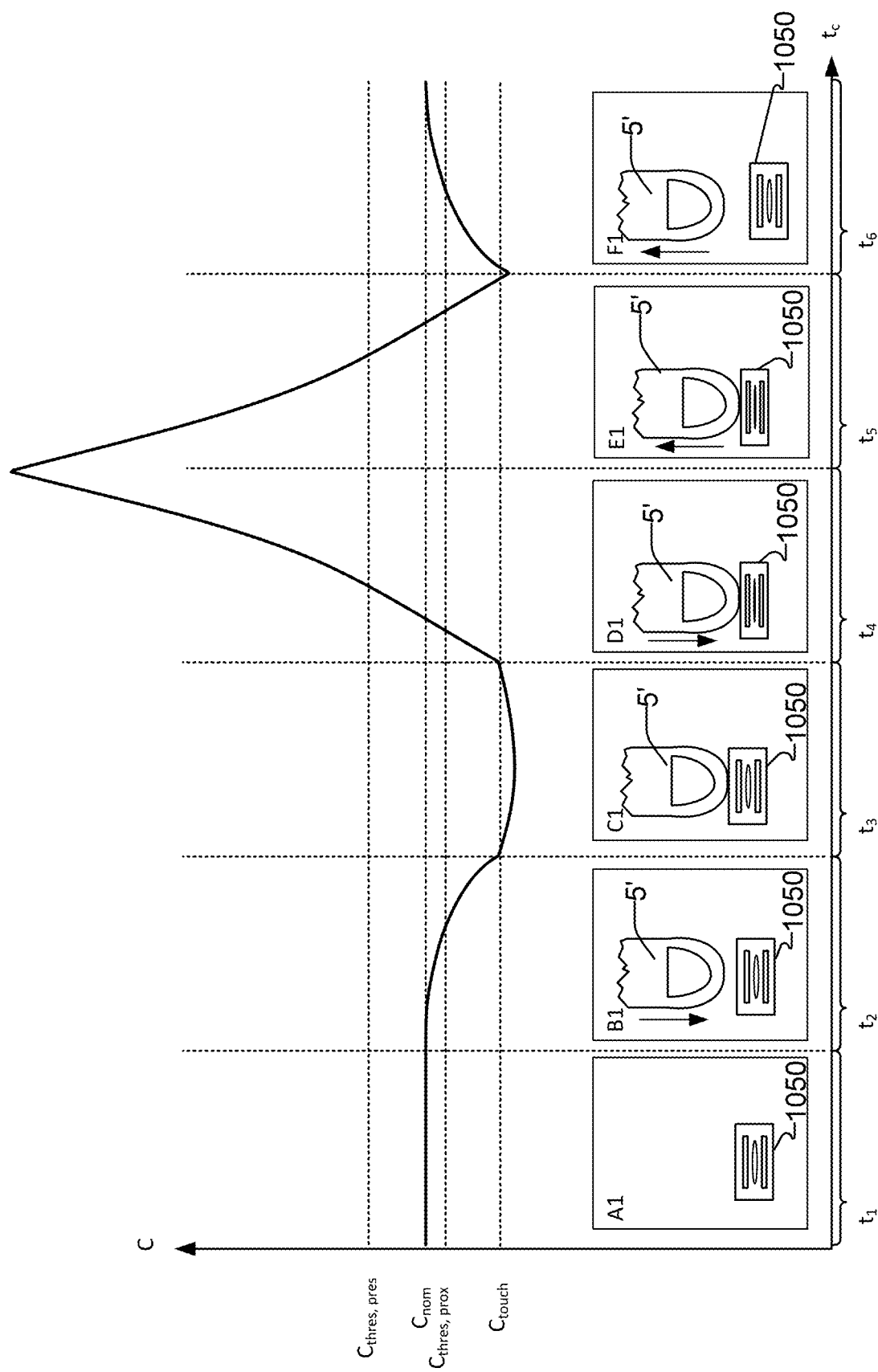
FIGS. 28C and 28D depict graphs of capacitance over time for a sensor in various Scenarios according to one embodiment of the invention.

FIG. 28C depicts Scenarios A1 through F1 and a graph representing the capacitance, C, of sensor 1050 during Scenarios A1 through F1.

Scenario A1 represents when pointing element 5' is not proximate to sensor 1050 and is not applying contact force to sensor 1050. Scenario A1 is represented as time period $t_1$ on the FIG. 28C graph which plots estimated values of sensor 1050 capacitance, C, as a function of time. As can be seen from the FIG. 28C graph, in Scenario A1, the estimated value of sensor 1050 capacitance, C, is within a threshold range around the nominal capacitance, $C_{nom}$ (i.e. does not fall below $C_{thres,prox}$). Accordingly, a processor could be configured to generate and/or output one or more signals indicating that pointing element 5' is not proximate to sensor 1050 (e.g. Scenario A1) based on sensor 1050 capacitance, C, not varying below $C_{thres,prox}$.

Scenario B1 represents when pointing element 5' is approaching (e.g. is proximate to) sensor 1050, but is not applying contact force to sensor 1050. Scenario B1 is represented as time period $t_2$ on the FIG. 28C graph. As can be seen from the FIG. 28C graph, the estimated value of sensor 1050 capacitance, C, decreases outside of a threshold range around the nominal capacitance, $C_{nom}$ (i.e. decreases below $C_{thres,prox}$) as pointing element 5' approaches. The decrease in sensor 1050 capacitance, C, occurs since pointing element 5' acts as a third electrode, which capacitively couples to sensor 1050, reducing the capacitive coupling between first and second electrodes 1052, 1054. Accordingly, a processor could be configured to generate and/or output one or more signals indicating that pointing element 5' is approaching (e.g. is proximate to) sensor 1050 (e.g. Scenario B1) based on sensor 1050 capacitance, C, decreasing below $C_{thres,prox}$. As will become clear with the description below, the capacitance C of sensor 1050 is also decreasing (and may fall below $C_{thres,prox}$) in Scenario E1 (where contact force of pointing element 5' is being reduced). The Scenario of B1 and E1 can be discriminated from one another based on the magnitude of sensor 1050 capacitance, C, or the rate of decrease of the capacitance C of sensor 1050. Specifically, the magnitude of sensor 1050 capacitance, C, at the transition between time, $t_4$, and time, $t_5$, will be significantly greater than the $C_{nom}$, as depicted in FIG. 28C, because of the presence of gas bubble 1015 in sensor 1050, as explained in more detail below. Similarly, the rate of decrease of the capacitance C of sensor 1050 may be greater in Scenario E1, because of the presence of gas bubble 1015 in sensor 1050, as explained in more detail below. A processor may be configured to make this distinction based the differences between the magnitudes of capacitance C of sensor 1050 and/or the rate at which capacitance C of sensor 1050 is changing. Further, a processor may use additional indicators (e.g. historical data, information from some other sensor and/or the like) to help make this distinction.

Scenario C1 represents when pointing element 5' is in contact with sensor 1050, but is not applying contact force to sensor 1050. Scenario C1 is represented as time period $t_3$ on the FIG. 28C graph. As can be seen from the FIG. 28C graph, the estimated value of sensor 1050 capacitance, C, decreases from the nominal capacitance, $C_{nom}$ to below a contact threshold $C_{touch}$. Again, this reduction is due to pointing element 5' acting as a third electrode, which capacitively couples to sensor 1050, thereby reducing the coupling between first and second electrodes 1052, 1054. The difference between the reaction of the capacitance C to Scenario B1 and Scenario C1 may be a difference of degree and may involve configurable thresholds $C_{thres,prox}$ and $C_{touch}$. Accordingly, a processor could be configured to generate and/or output one or more signals indicating that pointing element 5' is touching, but not applying force to sensor 1050 (e.g. Scenario C1) based on sensor 1050 capacitance, C, decreasing below $C_{touch}$.

Scenario D1 represents when pointing element 5' is in contact with sensor 1050 and is applying contact force to sensor 1050. Scenario D1 is represented as time period $t_4$ on the FIG. 28C graph. As can be seen from the FIG. 28C graph, the estimated value of sensor 1050 capacitance, C, increases as the contact force applied to sensor 1050 by pointing element 5' increases. Notably, sensor 1050 capacitance, C, increases substantially above $C_{nom}$ and above a threshold capacitance for pressure, $C_{thres,pres}$ with minimal pressure. In practice, it may be difficult to apply pressure to sensor 1050 without sensor 1050 capacitance, C, increasing above $C_{nom}$ and above a threshold capacitance for pressure, $C_{thres,pres}$. This increase in sensor 1050 capacitance, C, can be attributed, at least in part, to deformation of sensor 1050 and specifically a reduction in spacing 1066, since capacitance is inversely proportional to this spacing 1066. The increase in sensor 1050 capacitance, C, can also be attributed, at least in part, due to a change of the relative permittivity of the dielectric material between first electrode 1052 and second electrode 1054, because gas bubble 1015 is squeezed and/or compressed more than dielectric 1013. The relative permittivity of the dielectric material between first electrode 1052 and second electrode 1054 is based on the relative permittivity of each of dielectric material 1013 and gas bubble 1015 and is proportional to the ratio of the volume of dielectric material 1013 to the volume of gas bubble 1015 present between first and second electrodes 1052, 1054. Since gas bubble 1015 is squeezed and/or compressed more than dielectric 1013, as pressure on sensor 1050 increases, the ratio of volume of dielectric material 1013 to volume of gas bubble 1015 also increases, thereby causing the relative permittivity between first and second electrodes 1052, 1054 to increase (since gas bubble 1015 may have a lower permittivity than dielectric 1013) and in turn causing the capacitance of sensor 1050, C, to increase. Accordingly, a processor could be configured to generate and/or output one or more signals indicating that pointing element 5' is in contact with sensor 1050 and is applying contact force to sensor 1050 (e.g. Scenario D1) based on sensor 1050 capacitance, C, increasing above $C_{thres,pres}$. Accordingly, a processor may be configured to discriminate between Scenario D1 and Scenario F1 (described below as representing pointing element 5' moving away from sensor 1050) based on sensor 1050 capacitance, C, increasing above $C_{thres,pres}$ in Scenario D1 but not in Scenario F1. A processor may also be configured to discriminate between Scenario D1 and Scenario F1 based on the rate of change of sensor 1050 capacitance, C, or additional indicators (e.g. historical data, information from some other sensor and/or the like) to help make this distinction.

Scenario E1 represents when pointing element 5' is in contact with sensor 1050 and is decreasing contact force from sensor 1050. Scenario E1 is represented as time period $t_5$ on the FIG. 28C graph. At the conclusion of Scenario E1, (i.e. at the conclusion of $t_5$), the Scenario is substantially similar to that of Scenario C1—i.e. there is contact of pointing element 5' to sensor 1050, but no force is applied by pointing element 5' on sensor 1050. As can be seen from the FIG. 28C graph, the estimated value of sensor 1050 capacitance, C, decreases in Scenario E1 back toward $C_{touch}$. The rate of change of sensor 1050 capacitance, C, is similar (although opposite) to that in Scenario D1 since the same factors are contributing to the change in capacitance, C. Accordingly, a processor could be configured to generate and/or output one or more signals indicating that pointing element 5 is in contact with sensor 1050 and is decreasing the contact force on sensor 1050 (e.g. Scenario E1) based on sensor 1050 capacitance, C, decreasing below $C_{thres,pres}$. A processor can therefore be configured to distinguish between Scenarios E1 and B1 since sensor 1050 capacitance, C is not above $C_{thres,pres}$ in Scenario B1. A processor may also be configured to discriminate between Scenario D1 and Scenario F1 based on the rate of change of sensor 1050 capacitance, C, or additional indicators (e.g. historical data, information from some other sensor and/or the like) to help make this distinction. The circumstance at the end of Scenario E1 (contact with zero force) is reached when sensor 1050 capacitance, C, decreases below $C_{touch}$.

Scenario F1 represents when pointing element 5' is moving away from, but is still proximate to, sensor 1050 and is not applying contact force to sensor 1050. Scenario F1 is represented as time period $t_6$ on the FIG. 28C graph. As can be seen from the FIG. 28C graph, the estimated value of sensor 1050 capacitance, C, increases toward a threshold range around the nominal capacitance, $C_{nom}$ (i.e. increases toward $C_{thres,prox}$) as pointing element 5' moves away from sensor 1050. Accordingly, a processor could be configured to generate and/or output one or more signals indicating that pointing element 5' is moving away from, but is still proximate to, sensor 1050 (e.g. Scenario F1) based on sensor 1050 capacitance, C, increasing toward $C_{thres,prox}$ while remaining at less than $C_{thres,pres}$. In Scenario F1, when pointing element 5' is no longer within proximity of sensor 1050, sensor 1050 capacitance, C, will increases above $C_{thres,prox}$, as in Scenario A1.

Figure 28D:
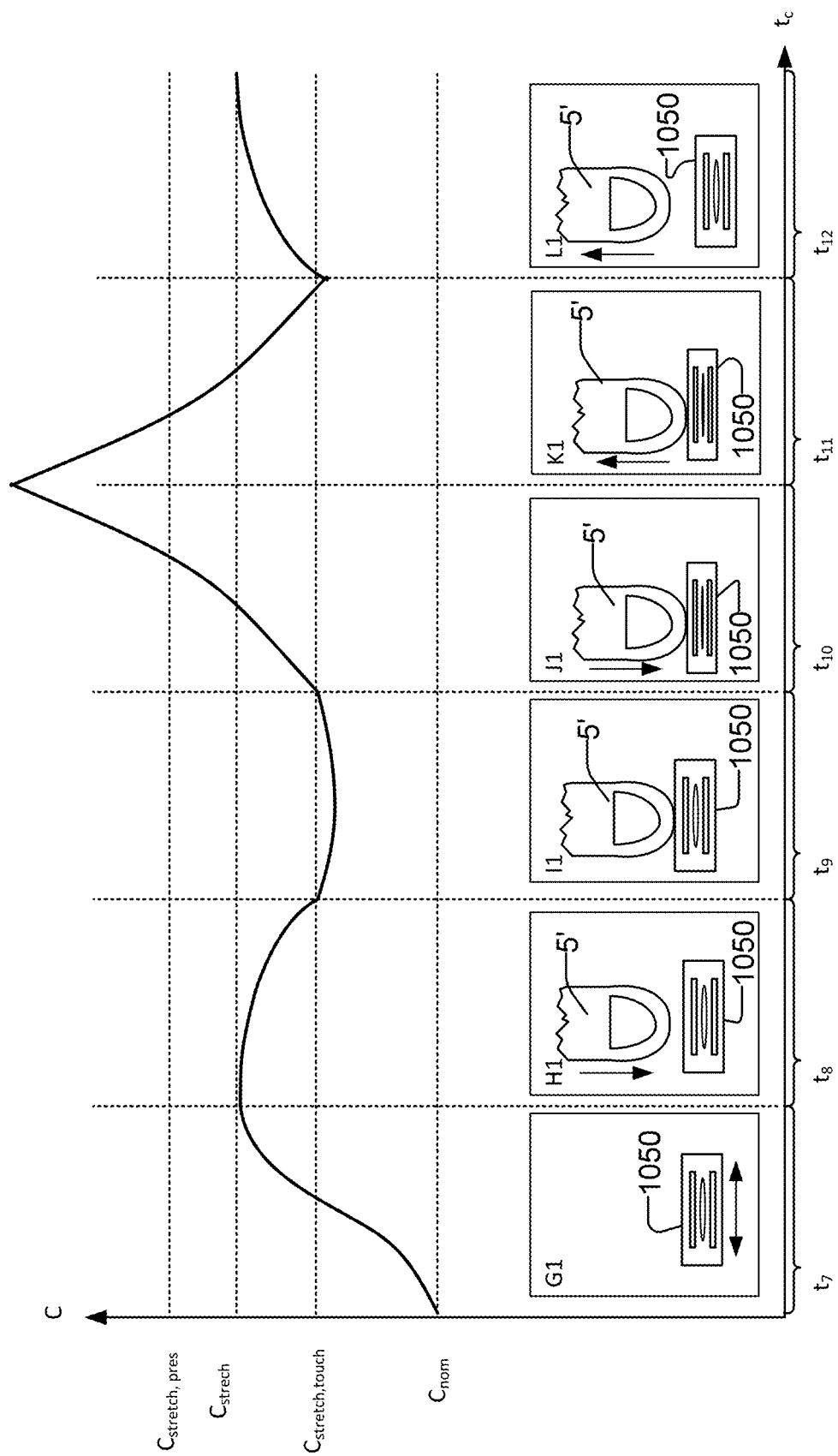

FIG. 28D depicts a series of Scenarios, G1 through L1, of sensor 1050 being stretched in the X direction and/or Y direction while a pointing element 5' interacts with the stretched sensor 1050 and a graph showing the changes to sensor 1050 capacitance, C, during each of Scenarios G1 through L1.

Scenario G1 represents when sensor 1050 is being stretched in the X direction and/or Y direction without a pointing element 5' in proximity of sensor 1050. Scenario G1 is represented as time period $t_7$ on the FIG. 28D graph. As can be seen from the FIG. 28D graph, the estimated value of sensor 1050 capacitance, C, increases above a threshold range around the nominal capacitance $C_{nom}$ (i.e. increases above $C_{thres,stretch}$) to a level $C_{stretch}$. The increase of sensor 1050 capacitance, C, may be attributed to an increase in the overlapping surface areas of first and second electrodes 1052, 1054, since capacitance is directly proportional to the overlapping surface areas. The increase of sensor 1050 capacitance, C, may also be attributed to a reduction in spacing 1066 as sensor 1050 is stretched. The increase of sensor 1050 capacitance, C, may also be attributed to a change in the volume of gas bubble 1015 relative to the volume of dielectric 1013 between first and second electrodes 1052, 1054, which would affect the combined dielectric effect of dielectric 1013 and gas bubble 1015 between first and second electrodes 1052, 1054, as discussed above.

Referring back to FIG. 28C, it can be seen that the increase of sensor 1050 capacitance, C, during time $t_4$ (representing Scenario D1) is similar in shape and magnitude to the increase of sensor 1050 capacitance, C, during time $t_7$ (representing Scenario G1). In some embodiments, Scenarios D1 and G1 are distinguished by comparing sensor 1050 capacitance, C, to the capacitance of one or more additional sensors 1050 in an array of sensors 1050. If a number of adjacent sensors 1050 in an array are experiencing the same change in capacitance as is represented by time $t_7$ in FIG. 28D, a processor may be configured to determine that sensors 1050 are being stretched. Conversely, if only the one sensor 1050 or a small number of immediately adjacent sensors 1050 in an array exhibit this change in capacitance, C, the processor may be configured to determine that pressure is being applied as in Scenario D1.

Once sensor 1050 is stretched, such as in Scenario G1 of FIG. 28D, sensor 1050 capacitance, C, behaves in substantially the same way as when sensor 1050 is not stretched except that the values of sensor 1050 capacitance, C, are all raised by the difference between $C_{stretch}$ and $C_{nom}$, as depicted in FIG. 28D. For example, capacitance, C, decreases when pointing element 5' approaches sensor 1050, decreases past $C_{stretch,touch}$ when pointing element 5' touches sensor 1050, increases past $C_{stretch,pres}$ as pointing element 5' applies pressure to sensor 1050, decreases past $C_{stretch,pres}$ as the pressure is removed from sensor 1050 and returns to $C_{stretch}$ when the pointing element 5' is moved away from sensor 1050, as is depicted in Scenarios H1 to L1 of FIG. 28D which correspond generally to Scenarios B1 to F1 of FIG. 28C.

Another aspect of the invention provides a method for fabricating a sensor or a sensor array. The sensor or sensor array may comprise any of the sensor arrays described herein (such as fringe sensor 710, overlap sensor 750, cluster sensors 700, 800, 800-1, sensor 1050 etc. and sensor arrays 505, etc.)

As depicted in FIGS. 29A to J, method 1100 comprises three main steps: molding, bonding and polymerizing. In some embodiments, method 1100 comprises molding and polymerizing and entire sensors are molded as a single (e.g. monolithic) piece.

As discussed above, sensors 710, 750, etc. and sensor arrays 505 may each be substantially contained within a dielectric material 513, 713, 913, 1013 etc. (each and/or all referred to as dielectric material 1140 for the purpose of describing method 1100). Molding comprises shaping dielectric material 1140 to form channels for receiving the electrode material(s) 1145. Dielectric material 1140 is shaped using a first electrode mold 1150, a second electrode mold 1160 and a spacer mold 1170. FIGS. 29A, B, D, E, G and H depict plan and perspective views of molds 1150, 1160 and 1170 for forming a single fringe electrode 710. Molds 1150, 1160, 1170 may be constructed from aluminum or another suitable material. It should be understood by those of skill in the art that molds 1150, 1160, 1170 can be suitably modified for the geometry of any of the sensor or sensor arrays described or discussed herein.

FIGS. 29A and B depict an exemplary first electrode mold 1150. As can be seen from FIG. 29A, first electrode mold 1150 comprises a first electrode mold negative space 1152 having a Z direction depth 1152A for receiving dielectric material 1140 and a first electrode positive space 1154 having a Z direction height 1154A for forming a channel for eventually receiving electrode material 1145. The Z direction depth 1152A of first electrode mold negative space 1152 may be greater than the Z direction height 1154A of first electrode positive space 1154 such that dielectric material 1140 will fill over first electrode mold positive space 1154. In some embodiments, the Z direction depth of first electrode negative space 1152A is between 500 and 900 µm (e.g. 800 µm) and the Z direction height of first electrode positive space 1154A is between 200 and 600 µm (e.g. 400 µm). Dielectric material 1140 may be cured within first electrode mold 1150 to produce a first layer 1156. For example, dielectric material 840 may be cured in an oven for 0.5 to 1.5 hours at a temperature between 60° C. and 100° C. First layer 1156 comprises cured dielectric material 1140 that defines a first electrode groove 1158A which is the negative shape of first fringe electrode 712 and cuts into first layer surface 1158B, as depicted in FIG. 29C.

FIGS. 29D and E depict an exemplary second electrode mold 1160. As can be seen from FIG. 29D, second electrode mold 1160 comprises a second electrode mold negative space 1162 having a Z direction depth 1162A for receiving dielectric material 1140 and a second electrode positive space 1164 having a Z direction height 1164A for forming a channel for eventually receiving electrode material 1145. The Z direction depth 1162A of second electrode mold negative space 1162 may be greater than the Z direction height 1164A of second electrode positive space 1164 such that dielectric material 1140 will fill over second electrode mold positive space 1164. Dielectric material 1140 may be cured within second electrode mold 1160 to produce a second layer 1166. For example, dielectric material 1140 may be cured in an oven for 0.5 to 1.5 hours at a temperature between 60° C. and 100° C. Second layer 1166 comprises cured dielectric material 1140 that defines a second electrode groove 1168A which is the negative shape of second fringe electrode 714 and cuts into second layer surface 1168B, as depicted in FIG. 29F.

FIGS. 29G and H depicts an exemplary spacer mold 1170. As can be seen from FIG. 29G, spacer mold 1170 comprises a spacer mold negative space 1172 having a Z direction depth 1172A for receiving dielectric material 1140. Dielectric material 1140 may be cured within spacer mold 1170 to produce a spacer layer 1176. For example, dielectric material 1140 may be cured in an oven for 0.5 to 1.5 hours at a temperature between 60° C. and 100° C. Spacer layer 1176 comprises cured dielectric material 1140 for spacing apart first electrode layer 1156 from second electrode layer 1166, as depicted in FIG. 29I. Spacer layer 1176 comprises a first spacer surface 1178A which extends in the X and Y directions and a second spacer surface 1178B which extends in the X and Y directions and is opposite to first spacer surface 1178A.

In another embodiment, spacer layer 1176 is obtained by spin coating an uncured PDMS layer on a silicon wafer. The dielectric material 1140 may then be cured in an oven for 0.5 to 1.5 hours at a temperature between 60° C. and 100° C.

Dielectric material 1140 may comprise any suitable dielectric. For example, dielectric material 1140 may comprise silicone elastomer polydimethylsiloxane (PDMS), or a platinum-catalyzed silicone. In some embodiments, dielectric material 1140 comprises a substantially transparent material having a transmittance in the range of greater than 90%. In some embodiments, the PDMS (e.g. Sylgard™ 184 silicone elastomer) is mixed in a 10 (base): 1 (cross-linker) ratio and then degassed to get rid of air bubbles.

After the molding step is complete and first layer 1156, second layer 1166 and spacer 1176 are cured, a bonding step may be performed. The bonding step comprises bonding first layer surface 1158B to first spacer surface 1178A and bonding second layer surface 1168B to second spacer surface 1178B to thereby form a sensor body 1180, as depicted in FIG. 29J. Any suitable form of bonding may be employed. For example, plasma bonding may be employed (e.g. a Harrick Plasma Cleaner (PDC-001) may be employed by exposing the surfaces to be bonded to oxygen plasma at a pressure of 600 mTorr for 110 seconds) to bond first layer 1156 and second layer 1166 to spacer layer 1176. In another embodiment, first layer 1156, second layer 1166 and spacer layer 1176 are bonded using partially cured PDMS and ultraviolet curable adhesive.

As can be seen from FIG. 29J, sensor body 1180 comprises a first sensor body channel 1182 defined by first spacer surface 1178A and first electrode groove 1158A, and a second sensor body channel 1184 defined by second spacer surface 1178B and second electrode groove 1168A. As can be seen from FIG. 29J, first sensor body channel 1182 extends in the X direction while second sensor body channel 1184 extends in the Y direction.

After sensor body 1180 is formed and bonding step is complete, a polymerization step may be performed. Electrode material 1145 is injected into first sensor body channel 1182 and into second sensor body channel 1184. After injection the electrode material 1145 is polymerized. Any suitable polymerization technique as is known in the art may be employed. For example, either of at least a UV initiated or thermal initiated polymerization technique could be used.

Electrode material 1145 may comprise any suitable material. In some embodiments, electrode material 1145 comprises an ionically conductive gel, such as polyacrylamide. Such ionically conductive gels are highly deformable and transparent. In some embodiments, electrode material may comprise a monomer mixture with a salt, such as sodium chloride or a polyacrylamide hydrogel. In another embodiment, lithium chloride is employed within electrode material 1145 to reduce evaporation of water through dielectric material 1140. In other embodiments, a glycerol sodium chloride solution may be employed in place of the hydrogel to reduce evaporation. In some embodiments, electrode material 1145 comprises metal mesh, silver nanowires, carbon nanotubes, conducting polymers (e.g. PEDOT:PSS), ionically conducting hydrogels (e.g. polyacrylamide), or the like. Gel-based ionic conductor pairs can propagate signals with a high effective diffusion rate.

In some embodiments, electrode material 1145 comprises a polyacrylamide as follows. A solution containing 2.2 M acrylamide (AAm) and 2.74 M NaCl is prepared. 1.5 wt % ammonium persulfate (AP) may be added as an initiator and 0.06 wt % of the cross-linker N,N-methylenebisacrylamde (MBAA) may be dissolved, with respect to the weight of the AAm monomer. The mixture is then degassed. 1.0 wt % of N,N,N',N'-tetramethylethylenediamine (TEMED) is added as the accelerator to cause rapid polymerization. The stoichiometry of AP and TEMED has been developed for specifically timed polymerization. Upon the addition of the accelerator, the mixture may be injected into channels 1182, 1184 within one minute to allow the mixture to polymerize as it flows through channels 1182, 1184. The process is timed such that the polymerization is complete as the channel is filled. Finally, silver plated copper wires 250 µm in diameter may be inserted into the openings of the channels and the channels may then be sealed using silicone epoxy (Sil-Poxy from Smooth-On).

In some embodiments, the transmittance of visible light wavelengths each or any of sensors 710, 750, 400, 700 etc. in air is greater than 80%. In some embodiments, the transmittance may be greater than 90%. Sources of light attenuation include: reflective losses at the air-sensor interfaces due to refractive index mismatch (in some embodiments, this is estimated to account for 6% out of the 10% loss) and the electrode-dielectric interfaces such as the hydrogel-PDMS interfaces in some embodiments (this is estimated to account for less than 1% loss). The remaining 4% loss may be a result of surface imperfections. Both surface scattering and reflections may be reduced by adding anti-reflection coatings and using molds with an optical finish. When a sensor (e.g. sensor 710, 750, 400, 700 etc.) is placed on a surface of relatively high index, such as on an LCD display the reflection losses and surface scattering effects may be significantly reduced (e.g. by close to half).

A potential application of the transparent sensor array is to place it on a stretchable display to enable touch and gesture-based interactions even during bending and stretching. If the device is also made sensitive to stretch, image distortion could be corrected. In general, the compliance and transparency offer the promise of applying the sensor arrays to virtually any surface.

In some embodiments, in addition to detecting and distinguishing between increasing and decreasing proximity of a pointing element, touch by a pointing element, pressure applied by a pointing element, stretching (and/or other deformation) of the sensor, and any of the above while stretching and/or otherwise deforming the sensor, any of the sensors described or depicted herein may be employed (e.g. in conjunction with a processor such as processor 585, for example) to quantitatively determine or estimate the proximity of a pointing element, the pressure applied by a pointing element to the sensor, the amount of stretch and/or other deformation of the sensor and combinations thereof. Such quantitative determinations or estimations may be based at least in part on the magnitude of the capacitance (e.g. fringe capacitance $C_{fringe}$, and/or overlap capacitance $C_{overlap}$) of the sensor. The relationship between capacitance and such quantitative determinations or estimations may be derived experimentally or otherwise. In some embodiments, such quantitative determinations or estimations may be relative (e.g. may describe a change in proximity of a pointing element, a change in pressure applied by a pointing element and/or a change in stretch or deformation of the sensor) while in other embodiments, such quantitative determinations or estimations may be absolute values.

One aspect of the invention provides a sensor unit for detecting, and discerning between, proximity of a pointing element to the sensor unit and contact force applied by the pointing element to the sensor unit. The sensor unit comprises a capacitive fringe sensor having a fringe capacitance ($C_{fringe}$). The capacitive fringe sensor comprises first and second fringe electrodes spaced apart from one another. The first fringe electrode comprises a first distal fringe surface facing in a Z direction generally away from the second fringe electrode and a first proximate fringe surface facing in a negative-Z direction generally toward the second fringe electrode. The sensor unit comprises a capacitive overlap sensor having an overlap capacitance ($C_{overlap}$). The capacitive overlap sensor comprises first and second overlap electrodes spaced apart from one another. The first overlap electrode comprises a first distal overlap surface facing in the Z direction generally away from the second overlap electrode and a first proximate overlap surface facing generally in the negative-Z direction toward the second overlap electrode. The sensor unit comprises a circuit connected to apply a fringe voltage between the first and second fringe electrodes to thereby cause a fringe electric field ($E_{fringe}$) in a vicinity of the fringe sensor. The circuit is connected to apply an overlap voltage between the first and second overlap electrodes to thereby cause an overlap electric field ($E_{overlap}$) in a vicinity of the overlap sensor. The first and second fringe electrodes are at least one of shaped and located to shape the fringe electric field ($E_{fringe}$) to have a distal fringe flux ($\Phi_{distal,fringe}$) of the fringe electric field into or out of the first distal fringe surface in the positive-Z direction or negative-Z direction and a proximate fringe flux ($\Phi_{prox,fringe}$) of the fringe electric field into or out of the first proximate fringe surface in the positive-Z direction or negative-Z direction. The first and second overlap electrodes are at least one of shaped and located to shape the overlap electric field ($E_{overlap}$) to have a distal overlap flux ($\Phi_{distal,overlap}$) of the overlap electric field into or out of the first distal overlap surface in the positive-Z direction or negative-Z direction and a proximate overlap flux ($\Phi_{prox,overlap}$) of the overlap electric field into or out of the first proximate overlap surface in the positive-Z direction or negative-Z direction. A fringe-sensor flux ratio $$FSFR = \frac{\Phi_{distal,fringe}}{\Phi_{prox,fringe}}$$

or the sensor unit is greater than an overlap-sensor flux ratio $$OSFR = \frac{\Phi_{distal,overlap}}{\Phi_{prox,overlap}}$$

of the sensor unit to thereby make the fringe capacitance ($C_{fringe}$) relatively more sensitive to proximity of the pointing element than the overlap capacitance ($C_{overlap}$) and the overlap capacitance ($C_{overlap}$) relatively more sensitive to contact force applied to the sensor unit by the pointing element than the fringe capacitance ($C_{fringe}$).

In some embodiments, the sensor unit comprises a capacitance-measurement circuit connected to generate a fringe-sensor signal representative of the fringe capacitance ($C_{fringe}$) and an overlap-sensor signal representative of the overlap capacitance ($C_{overlap}$).

In addition to the exemplary aspects and embodiments described above, further aspects and embodiments will become apparent by reference to the drawings and by study of the following detailed descriptions. In some embodiments, the sensor unit comprises a processor connected to receive the fringe-sensor signal and the overlap-sensor signal and configured to determine estimated values for the fringe capacitance ($C_{fringe}$) and the overlap capacitance ($C_{overlap}$).

In some embodiments, the circuit is connected to apply the fringe voltage and the overlap voltage at nominal voltage levels and wherein the processor is configured to determine the estimated values for the fringe capacitance ($C_{fringe}$) and the overlap capacitance ($C_{overlap}$) to be a nominal fringe capacitance level ($C_{f,nom}$) and a nominal overlap capacitance level ($C_{o,nom}$) respectively when the pointing element is not proximate to the sensor unit and is not applying contact force to the sensor unit.

In some embodiments, the processor is configured to at least one of generate and output one or more signals indicating that the pointing element is not proximate to the sensor unit and is not applying contact force to the sensor unit when the estimated value of the fringe capacitance ($C_{fringe}$) is within a threshold range around the nominal fringe capacitance level ($C_{f,nom}$) and the estimated value of the overlap capacitance ($C_{overlap}$) is within a threshold range around the nominal overlap capacitance level ($C_{o,nom}$).

In some embodiments, the processor is configured to at least one of generate and output one or more signals indicating that the pointing element is proximate to the sensor unit but is not applying contact force to the sensor unit when the estimated value of the fringe capacitance ($C_{fringe}$) is below the nominal fringe capacitance level ($C_{f,nom}$) by more than a proximity threshold amount and the estimated value of the overlap capacitance ($C_{overlap}$) is within a threshold range around the nominal overlap capacitance level ($C_{o,nom}$).

In some embodiments, the processor is configured to at least one of generate and output one or more signals indicating that the pointing element is in contact with the sensor unit when the estimated value of the fringe capacitance ($C_{fringe}$) is below the nominal fringe capacitance level ($C_{f,nom}$) by more than a contact threshold amount.

In some embodiments, the processor is configured to at least one of generate and output one or more signals indicating that the pointing element is applying contact force to the sensor unit when the estimated value of the overlap capacitance ($C_{overlap}$) is above the nominal overlap capacitance level ($C_{o,nom}$) by more than a contact threshold amount.

In some embodiments, the processor is configured to at least one of generate and output one or more signals indicating that the pointing element is proximate to the sensor unit and moving toward the sensor unit when the estimated value of the fringe capacitance ($C_{fringe}$) is below the nominal fringe capacitance level ($C_{f,nom}$) by more than a proximity threshold amount for a period of time and the estimated value of the fringe capacitance ($C_{fringe}$) is decreasing over the period of time and the estimated value of the overlap capacitance ($C_{overlap}$) is within a threshold range around the nominal overlap capacitance level ($C_{o,nom}$).

In some embodiments, the processor is configured to at least one of generate and output one or more signals indicating that the pointing element is proximate to the sensor unit and moving away from the sensor unit when the estimated value of the fringe capacitance ($C_{fringe}$) is below the nominal fringe capacitance level ($C_{f,nom}$) by more than a proximity threshold amount for a period of time and the estimated value of the fringe capacitance ($C_{fringe}$) is increasing over the period of time and the estimated value of the overlap capacitance ($C_{overlap}$) is within a threshold range around the nominal overlap capacitance level ($C_{o,nom}$).

In some embodiments, the first and second fringe electrodes and the first and second overlap electrodes are substantially transparent at visible light wavelengths. In some embodiments, the first and second fringe electrodes and the first and second overlap electrodes have transmissivities of over 90% at visible light wavelengths.

In some embodiments, the first fringe electrode and the first overlap electrode are fabricated from ionically conductive hydrogel. In some embodiments, the first fringe electrode and the first overlap electrode are fabricated from at least one of: a metal mesh; silver nanowires, carbon nanotubes and one or more conducting polymers. In some embodiments, at least one of the first and second overlap electrodes is elastically deformable. In some embodiments, at least one of the first and second fringe electrodes is elastically deformable.

In some embodiments, the second fringe electrode and the second overlap electrode comprise a single electrode. In some embodiments, the first overlap electrode is interposed within a space defined by first fringe electrode in a first electrode plane orthogonal to the Z direction.

In some embodiments, the first fringe electrode comprises a cut-out extending in a first fringe electrode plane orthogonal to the Z direction. In some embodiments, the cut-out is substantially circular in the first fringe electrode plane and wherein the cut-out has a diameter $d_{inner}$. In some embodiments, the second fringe electrode is substantially circular in a second fringe electrode plane orthogonal to the Z direction and wherein the second fringe electrode has a diameter $d_{outer}$. In some embodiments, $d_{inner}$ is greater than $d_{outer}$.

In some embodiments, the first fringe electrode is substantially S-shaped in a first fringe plane orthogonal to the Z direction. In some embodiments, the first overlap electrode is substantially rectangular in a first overlap plane orthogonal to the Z direction and the second overlap electrode is substantially rectangular in a second overlap plane orthogonal to the Z direction. In some embodiments, the first overlap electrode overlaps the second overlap electrode in the Z direction.

Another aspect of the invention provides a method for detecting, and discerning between, proximity of a pointing element to a sensor unit and contact force applied to the sensor unit by the pointing element. The method comprises providing a sensor unit. The sensor unit comprises a capacitive fringe sensor having a fringe capacitance ($C_{fringe}$) and comprising first and second deformable fringe electrodes spaced apart from one another. The first fringe electrode comprises a first distal fringe surface facing in a Z direction generally away from the second fringe electrode and a first proximate fringe surface facing in a negative-Z direction generally toward the second fringe electrode. The sensor unit comprises a capacitive overlap sensor having an overlap capacitance ($C_{overlap}$) and comprising first and second deformable overlap electrodes spaced apart from one another. The first overlap electrode comprises a first distal overlap surface facing in the Z direction generally away from the second overlap electrode and a first proximate overlap surface facing generally in the negative-Z direction toward the second overlap electrode. The method comprises applying a fringe voltage between the first and second fringe electrodes and thereby creating a fringe electric field ($E_{fringe}$) in a vicinity of the fringe sensor. The method comprises applying an overlap voltage between the first and second overlap electrodes and thereby creating an overlap electric field ($E_{overlap}$) in a vicinity of the overlap sensor. The fringe electric field ($E_{fringe}$) has a distal fringe flux ($\Phi_{distal,fringe}$) of the fringe electric field into or out of the first distal fringe surface in the Z direction and a proximate fringe flux ($\Phi_{prox,fringe}$) of the fringe electric field into or out of the first proximate fringe surface in the negative-Z direction. The overlap electric field ($E_{overlap}$) has a distal overlap flux ($\Phi_{distal,overlap}$) of the overlap electric field into or out of the first distal overlap surface in the positive Z direction or negative direction and a proximate overlap flux ($\Phi_{prox,overlap}$) of the overlap electric field into or out of the first proximate overlap surface in the negative-Z direction or positive Z direction. A fringe-sensor flux ratio $$FSFR = \frac{\Phi_{distal,fringe}}{\Phi_{prox,fringe}}$$

of the sensor unit is greater than an overlap-sensor flux ratio $$OSFR = \frac{\Phi_{distal,overlap}}{\Phi_{prox,overlap}}$$

of the sensor unit to thereby make the fringe capacitance ($C_{fringe}$) relatively more sensitive to proximity of the pointing element than the overlap capacitance ($C_{overlap}$) and the overlap capacitance ($C_{overlap}$) relatively more sensitive to contact force applied to the sensor unit by the pointing element than the fringe capacitance ($C_{fringe}$). The method comprises estimating values of the fringe capacitance ($C_{fringe}$) and the overlap capacitance ($C_{overlap}$). The method comprises detecting, and discerning between, proximity of the pointing element to the sensor unit and contact force applied to the sensor unit by the pointing element based on the estimated values of the fringe capacitance ($C_{fringe}$) and the overlap capacitance ($C_{overlap}$).

In some embodiments, the method comprises connecting a circuit to apply the fringe voltage and the overlap voltage at nominal voltage levels and determining the estimated values for the fringe capacitance ($C_{fringe}$) and the overlap capacitance ($C_{overlap}$) to be a nominal fringe capacitance level ($C_{f,nom}$) and a nominal overlap capacitance level ($C_{o,nom}$) respectively when the pointing element is not proximate to the sensor unit and is not applying contact force to the sensor unit.

In some embodiments, the method comprises at least one of generating and outputting one or more signals indicating that the pointing element is not proximate to the sensor unit and is not applying contact force to the sensor unit when the estimated value of the fringe capacitance ($C_{fringe}$) is within a threshold range around the nominal fringe capacitance level ($C_{f,nom}$) and the estimated value of the overlap capacitance ($C_{overlap}$) is within a threshold range around the nominal overlap capacitance level ($C_{o,nom}$). In some embodiments, the method comprises at least one of generating and outputting one or more signals indicating that the pointing element is proximate to the sensor unit but is not applying contact force to the sensor unit when the estimated value of the fringe capacitance ($C_{fringe}$) is below the nominal fringe capacitance level ($C_{f,nom}$) by more than a proximity threshold amount and the estimated value of the overlap capacitance ($C_{overlap}$) is within a threshold range around the nominal overlap capacitance level ($C_{o,nom}$). In some embodiments, the method comprises at least one of generating and outputting one or more signals indicating that the pointing element is in contact with the sensor unit when the estimated value of the fringe capacitance ($C_{fringe}$) is below the nominal fringe capacitance level ($C_{f,nom}$) by more than a contact threshold amount and the estimated value of the overlap capacitance ($C_{overlap}$) is within a threshold range around the nominal overlap capacitance level ($C_{o,nom}$). In some embodiments, the method comprises at least one of generating and outputting one or more signals indicating that the pointing element is applying contact force to the sensor unit when the estimated value of the overlap capacitance ($C_{overlap}$) is above the nominal overlap capacitance level ($C_{o,nom}$) by more than a contact threshold amount. In some embodiments, the method comprises at least one of generating and outputting one or more signals indicating that the pointing element is proximate to the sensor unit and moving toward the sensor unit when the estimated value of the fringe capacitance ($C_{fringe}$) is below the nominal fringe capacitance level ($C_{f,nom}$) by more than a proximity threshold amount for a period of time and the estimated value of the fringe capacitance ($C_{fringe}$) is decreasing over the period of time. In some embodiments, the method comprises at least one of generating and outputting one or more signals indicating that the pointing element is proximate to the sensor unit and moving away from the sensor unit when the estimated value of the fringe capacitance ($C_{fringe}$) is below the nominal fringe capacitance level ($C_{f,nom}$) by more than a proximity threshold amount for a period of time and the estimated value of the fringe capacitance ($C_{fringe}$) is increasing over the period of time.

In some embodiments, the method comprises estimating values of the fringe capacitance ($C_{fringe}$) comprises grounding the overlap sensor. In some embodiments, the method comprises estimating values of the overlap capacitance ($C_{overlap}$) comprises grounding the fringe sensor. In some embodiments, the method comprises estimating values of the fringe capacitance ($C_{fringe}$) comprises floating the overlap sensor. In some embodiments, the method comprises estimating values of the overlap capacitance ($C_{overlap}$) comprises floating the fringe sensor.

Another aspect of the invention provides a sensor unit for detecting, and discerning between, proximity of a pointing element to the sensor unit and contact force applied by the pointing element to the sensor unit. The sensor unit comprises a capacitive sensor having a capacitance (C) and comprising first and second electrodes spaced apart from one another and a dielectric located between the first and second electrodes. The dielectric comprises one or more gas bubbles in a deformable dielectric material wherein the gas bubble has a higher compressibility than a compressibility of the deformable dielectric material. The sensor unit comprises a capacitance-measurement circuit connected to apply a voltage between the first and second electrodes to thereby generate a capacitance signal representative of the capacitance (C).

In some embodiments, the application of contact force to the sensor unit causes deformation of the first electrode toward the second electrode and a corresponding increase in the capacitance (C) and the capacitance signal due to decreasing space between the first and second electrodes.

In some embodiments, the application of contact force to the sensor unit changes a relative permittivity of the dielectric.

In some embodiments, the application of contact force to the sensor unit causes deformation of the dielectric which in turn causes the deformable dielectric material to occupy a relatively higher percentage of a volume of the space between the first and second electrodes as compared to when there is no contact force applied to the sensor unit.

Another aspect of the invention provides a sensor array. The sensor array comprises a plurality of Y direction oriented sensor columns, each sensor column comprising a plurality of sensors generally aligned with one another in the Y direction and each sensor column oriented such that the plurality of sensors form a plurality of X direction oriented sensor rows, each sensor row comprising a subset of the plurality of sensors generally aligned with one another in an X direction. Each of the plurality of sensors comprises any of the sensor units described herein.

In some embodiments, a processor is connected to each of the plurality of sensors and is configured to estimate the capacitance of each of the plurality of sensors. In some embodiments, the processor is configured to at least one of generate and output one or more signals indicating that the sensor array is being stretched in the X direction when at least two neighbouring sensors of the plurality of sensors exhibit a substantially equal increase in estimated capacitance.

While a number of exemplary aspects and embodiments have been discussed above, those of skill in the art will recognize certain modifications, permutations, additions and sub-combinations thereof.

Embodiments of the invention may be implemented using specifically designed hardware, configurable hardware, programmable data processors (e.g. processor 385 and/or any other processors described herein) configured by the provision of software (which may optionally comprise "firmware") capable of executing on the data processors, special purpose computers or data processors that are specifically programmed, configured, or constructed to perform one or more steps in a method and/or to provide the functionality as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods and/or provide functionality as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

While processes or blocks of some methods are presented herein in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, PDAs, media players, and other devices suitable for the purposes described herein. Those skilled in the relevant art will appreciate that aspects of the system can be practised with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, network PCs, mini-computers, mainframe computers, and the like.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. While a number of exemplary aspects and embodiments have been discussed above, those of skill in the art will recognize certain modifications, permutations, additions and sub-combinations thereof. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments. For example:

In the embodiments described herein, arrays of sensors are described as being generally planar and two-dimensional. This is not necessary. In some embodiments, sensor arrays may be provided on surfaces having other shapes and may be used to locate bending, stretching and/or the proximity and/or contact of pointing elements upon such surfaces.

It is therefore intended that the following appended claims and claims hereafter introduced are interpreted to include all such modifications, permutations, additions and sub-combinations as are consistent with the broadest interpretation of the specification as a whole.

What is claimed is:

1. A sensor unit for detecting bending of the sensor unit, the sensor unit comprising:
   a capacitive upper sensor having an upper capacitance ($C_{upper}$) and comprising first and second deformable upper electrodes spaced apart from one another in a Z direction, the first and second upper electrodes respectively having first and second upper shapes;
   a capacitive lower sensor having a lower capacitance ($C_{lower}$), spaced apart from the upper sensor in a Z direction and comprising first and second deformable lower electrodes spaced apart from one another in the Z direction, the first and second lower electrodes respectively having first and second lower shapes; and
   wherein, for a bend of the sensor unit in a first direction about a Y-axis orthogonal to the Z direction, the first and second upper shapes change such that the upper capacitance ($C_{upper}$) decreases and the lower shapes change such that the lower capacitance ($C_{lower}$) increases, and, for a bend of the sensor unit in a second direction about the Y-axis and opposed to the first direction, the first and second upper shapes change such that the upper capacitance ($C_{upper}$) increases and the lower shapes change such that the lower capacitance ($C_{lower}$) decreases.

2. The sensor unit according to claim 1 comprising a circuit connected to apply an upper voltage between the first and second upper electrodes to thereby cause an upper electric field ($E_{upper}$) in a vicinity of the upper sensor and connected to apply a lower voltage between the first and second lower electrodes to thereby cause a lower electric field ($E_{lower}$) in a vicinity of the lower sensor.

3. The sensor unit according to claim 2 comprising a capacitance-measurement circuit connected to generate an upper sensor signal representative of the upper sensor capacitance ($C_{upper}$) and a lower sensor signal representative of the lower sensor capacitance ($C_{lower}$).

4. The sensor unit according to claim 3 comprising a processor connected to receive the upper sensor signal and the lower sensor signal and configured to determine estimated values for the upper sensor capacitance ($C_{upper}$) and the lower sensor capacitance ($C_{lower}$) therefrom.

5. The sensor unit according to claim 4 wherein the circuit is connected to apply the upper voltage and the lower voltage at nominal voltage levels and wherein the processor is configured to determine the estimated values for the upper sensor capacitance ($C_{upper}$) and the lower capacitance ($C_{lower}$) to be a nominal upper sensor capacitance level ($C_{u,nom}$) and a nominal lower sensor capacitance level ($C_{l,nom}$) respectively when the sensor unit is not bent.

6. The sensor unit according to claim 5 wherein the processor is configured to at least one of generate and output one or more signals indicating a bend of the sensor unit in the first direction about the Y-axis when the estimated value of the upper sensor capacitance ($C_{upper}$) decreases below a threshold range around the nominal upper sensor capacitance level ($C_{u,nom}$) and the estimated value of the lower sensor capacitance ($C_{lower}$) increases above a threshold range around the nominal lower sensor capacitance level ($C_{l,nom}$).

7. The sensor unit according to claim 5 wherein the processor is configured to at least one of generate and output one or more signals indicating a bend of the sensor unit in the second direction about the Y-axis when the estimated value of the upper sensor capacitance ($C_{upper}$) increases above a threshold range around the nominal upper sensor capacitance level ($C_{u,nom}$) and the estimated value of the lower sensor capacitance ($C_{lower}$) decreases below a threshold range around the nominal lower sensor capacitance level ($C_{l,nom}$).

8. The sensor unit according to claim 1 wherein the sensor unit comprises a neutral bending plane and wherein the upper sensor and the lower sensor are on opposite sides of the neutral bending plane.

9. The sensor unit according to claim 8 wherein the upper sensor is spaced apart from the neutral bending plane in the Z direction by an upper sensor neutral spacing and the lower sensor is spaced apart from the neutral bending plane in the Z direction by a lower sensor neutral spacing and the upper sensor neutral spacing is substantially equal to the lower sensor neutral spacing.

10. The sensor unit according to claim 8 wherein the upper sensor is spaced apart from the neutral bending plane in the Z direction by an upper sensor neutral spacing and the lower sensor is spaced apart from the neutral bending plane in the Z direction by a lower sensor neutral spacing and the upper sensor neutral spacing is substantially unequal to the lower sensor neutral spacing.

11. The sensor unit according to claim 1 wherein the first and second upper electrodes and the first and lower electrodes are substantially transparent at visible light wavelengths.

12. The sensor unit according to claim 1 wherein the first and second upper electrodes and the first and lower electrodes have transmissivities of over 90% at visible light wavelengths.

13. The sensor unit according to claim 1 wherein the first and second upper electrodes and the first and second lower electrodes are fabricated from ionically conductive hydrogel.

14. The sensor unit according to claim 1 wherein the first and second upper electrodes and the first and second lower electrodes are fabricated from at least one of: a metal mesh; silver nanowires, carbon nanotubes and one or more conducting polymers.

15. The sensor unit according to claim 1 wherein at least one of the first and second lower electrodes is elastically deformable.

16. The sensor unit according to claim 1 wherein at least one of the first and second upper electrodes is elastically deformable.

17. The sensor unit according to claim 1 wherein the first and second upper shapes changing comprises the first and second upper electrodes changing in cross-sectional area in a plane orthogonal to the Z direction.

18. The sensor unit according to claim 1 wherein the first and second lower shapes changing comprises the first and second lower electrodes changing in size in a plane orthogonal to the Z direction.

19. A sensor unit for detecting bending of the sensor unit, the sensor unit comprising:
   a capacitive sensor having a capacitance (C) and comprising first and second deformable electrodes spaced apart from one another in a Z direction, the first and second upper electrodes respectively having first and second shapes;
   wherein, for a bend of the sensor unit in a first direction about a Y-axis orthogonal to the Z direction, at least one of the first and second shapes change such that the capacitance (C) increases, and, for a bend of the sensor unit in a second direction about the Y-axis and opposed to the first direction, at least one of the first and second shapes change such that the capacitance (C) decreases.

20. A sensor array comprising
a plurality of Y direction oriented sensor unit columns, each sensor unit column comprising a plurality of sensor units generally aligned with one another in the Y direction and each sensor unit column oriented such that the plurality of sensor units form a plurality of X direction oriented sensor unit rows, each sensor unit row comprising a subset of the plurality of sensor units generally aligned with one another in an X direction; and wherein each of the plurality of sensor units comprises a sensor unit comprising:
  a capacitive upper sensor having an upper capacitance ($C_{upper}$) and comprising first and second deformable upper electrodes spaced apart from one another in a Z direction, the first and second upper electrodes respectively having first and second upper shapes;
  a capacitive lower sensor having a lower capacitance ($C_{lower}$), spaced apart from the upper sensor in a Z direction and comprising first and second deformable lower electrodes spaced apart from one another in the Z direction, the first and second lower electrodes respectively having first and second lower shapes; and
  wherein, for a bend of the sensor unit in a first direction about a Y-axis orthogonal to the Z direction, the first and second upper shapes change such that the upper capacitance ($C_{upper}$) decreases and the lower shapes change such that the lower capacitance ($C_{lower}$) increases, and, for a bend of the sensor unit in a second direction about the Y-axis and opposed to the first direction, the first and second upper shapes change such that the upper capacitance ($C_{upper}$) increases and the lower shapes change such that the lower capacitance ($C_{lower}$) decreases.

21. A method for fabricating a sensor unit, the method comprising:
  embedding a capacitive upper sensor within a dielectric material of the sensor unit at a first location spaced apart from a neutral bending plane of the sensor unit in a positive-Z direction; and
  embedding a capacitive lower sensor within the dielectric material of the sensor unit at a second location spaced apart from the neutral bending plane of the sensor unit in a negative-Z direction.

22. The method according to claim 21 wherein the capacitive upper sensor comprises first and second deformable upper electrodes spaced apart from one another in the positive-Z direction and the capacitive lower sensor comprises first and second deformable lower electrodes spaced apart from one another in the negative-Z direction.

* * * * *